US008947531B2

(12) United States Patent
Fischer et al.

(10) Patent No.: US 8,947,531 B2
(45) Date of Patent: Feb. 3, 2015

(54) VEHICLE DIAGNOSTICS BASED ON INFORMATION COMMUNICATED BETWEEN VEHICLES

(75) Inventors: Jacob Fischer, Oshkosh, WI (US); Dale Frampton, Appleton, WI (US); Gary Schmiedel, Oshkosh, WI (US); Christopher K. Yakes, Oshkosh, WI (US); Alberto Broggi, Parma (IT)

(73) Assignee: Oshkosh Corporation, Oshkosh, WI (US)

( * ) Notice: Subject to any disclaimer, the term of this patent is extended or adjusted under 35 U.S.C. 154(b) by 1607 days.

(21) Appl. No.: 12/122,355

(22) Filed: May 16, 2008

(65) Prior Publication Data

US 2009/0079839 A1 Mar. 26, 2009

Related U.S. Application Data

(63) Continuation-in-part of application No. 11/562,824, filed on Nov. 22, 2006, now Pat. No. 8,139,109.

(60) Provisional application No. 60/805,197, filed on Jun. 19, 2006.

(51) Int. Cl.
*H04N 7/18* (2006.01)
*G05D 1/00* (2006.01)
(Continued)

(52) U.S. Cl.
CPC ............... *G01S 7/003* (2013.01); *G01S 17/023* (2013.01); *G05D 1/0295* (2013.01); *H04N 5/247* (2013.01); *H04N 13/0044* (2013.01); *H04N 13/0242* (2013.01); *H04N 13/0246* (2013.01); *G05D 1/024* (2013.01); *G05D 1/0251* (2013.01); *G05D 1/027* (2013.01); *G05D 1/0272* (2013.01);
(Continued)

(58) Field of Classification Search
USPC .................................. 348/148, 61; 701/2, 29
See application file for complete search history.

(56) References Cited

U.S. PATENT DOCUMENTS

| 1,951,089 A | 3/1934 | Fielder |
|---|---|---|
| 3,524,069 A | 8/1970 | Stepanov et al. |

(Continued)

FOREIGN PATENT DOCUMENTS

| DE | 18 16 183 | 6/1970 |
|---|---|---|
| DE | 41 11 865 A1 | 10/1991 |

(Continued)

OTHER PUBLICATIONS

International Search Report and Written Opinion for International Application No. PCT/US2009/043980, mail date Dec. 29, 2009, 10 pages.

(Continued)

*Primary Examiner* — Joshua Joo
(74) *Attorney, Agent, or Firm* — Foley & Lardner LLP

(57) ABSTRACT

A system and method for controlling a convoy of vehicles. The convoy of vehicles including a leader vehicle in communication with a plurality of autonomous follower vehicles. The leader vehicle is configured to receive a first autonomous follower vehicle data and compare the first autonomous follower vehicle data to at least one of a leader vehicle data, a second autonomous follower vehicle data and/or a threshold value. The first autonomous follower vehicle data, the leader vehicle data, the second autonomous follower vehicle data and the threshold value relate to a vehicle performance characteristic.

16 Claims, 26 Drawing Sheets

(51) Int. Cl.
*G01S 7/00* (2006.01)
*G01S 17/02* (2006.01)
*G05D 1/02* (2006.01)
*H04N 5/247* (2006.01)
*H04N 13/00* (2006.01)
*H04N 13/02* (2006.01)

(52) U.S. Cl.
CPC ............ *G05D1/0274* (2013.01); *G05D 1/0278* (2013.01); *G05D 2201/0209* (2013.01)
USPC .................................. 348/148; 701/2; 701/24

(56) References Cited

U.S. PATENT DOCUMENTS

| | | | |
|---|---|---|---|
| 3,690,559 A | 9/1972 | Rudloff |
| 3,729,106 A | 4/1973 | Barbieri |
| 3,764,867 A | 10/1973 | Smi |
| 3,799,284 A | 3/1974 | Hend |
| 3,865,209 A | 2/1975 | Aihara et al. |
| 3,966,067 A | 6/1976 | Reese |
| 4,021,704 A | 5/1977 | Norbeck |
| 4,041,470 A | 8/1977 | Slane et al. |
| 4,088,934 A | 5/1978 | D'Atre et al. |
| 4,097,925 A | 6/1978 | Butler, Jr. |
| 4,113,045 A | 9/1978 | Downing, Jr. |
| 4,162,714 A | 7/1979 | Correll |
| 4,180,803 A | 12/1979 | Wesemeyer et al. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,355,385 A | 10/1982 | Hampshire et al. |
| 4,423,362 A | 12/1983 | Konrad et al. |
| 4,423,794 A | 1/1984 | Beck |
| 4,444,285 A | 4/1984 | Stewart et al. |
| 4,453,880 A | 6/1984 | Leisse |
| 4,461,988 A | 7/1984 | Plunkett |
| 4,516,121 A | 5/1985 | Moriyama et al. |
| 4,533,011 A | 8/1985 | Heidemeyer et al. |
| 4,542,802 A | 9/1985 | Garvey et al. |
| 4,562,894 A | 1/1986 | Yang |
| 4,596,192 A | 6/1986 | Foerster |
| 4,639,609 A | 1/1987 | Floyd et al. |
| 4,646,232 A | 2/1987 | Chang et al. |
| 4,676,545 A | 6/1987 | Bonfilio et al. |
| 4,702,333 A | 10/1987 | Lippert |
| 4,719,361 A | 1/1988 | Brubaker |
| 4,744,218 A | 5/1988 | Edwards et al. |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,809,803 A | 3/1989 | Ahern et al. |
| 4,842,326 A | 6/1989 | DiVito |
| 4,843,557 A | 6/1989 | Ina et al. |
| 4,864,154 A | 9/1989 | Copeland et al. |
| 4,864,568 A | 9/1989 | Sato et al. |
| 4,881,756 A | 11/1989 | Kumasaka et al. |
| 4,894,781 A | 1/1990 | Sato et al. |
| 4,941,546 A | 7/1990 | Nist et al. |
| 4,949,808 A | 8/1990 | Garnett |
| 4,953,646 A | 9/1990 | Kim |
| 4,955,443 A | 9/1990 | Bausch |
| 4,966,242 A | 10/1990 | Baillargeon |
| 4,985,845 A | 1/1991 | Goetz et al. |
| 4,993,729 A | 2/1991 | Payne |
| 5,025,253 A | 6/1991 | DiLullo et al. |
| 5,046,007 A | 9/1991 | McCrery et al. |
| 5,062,759 A | 11/1991 | Pieperhoff |
| 5,067,932 A | 11/1991 | Edwards |
| 5,071,307 A | 12/1991 | Carson |
| 5,081,832 A | 1/1992 | Mowill |
| 5,086,863 A | 2/1992 | Tischer |
| 5,088,573 A | 2/1992 | Moll |
| 5,091,856 A | 2/1992 | Hasegawa et al. |
| 5,092,419 A | 3/1992 | Leiber et al. |
| 5,111,901 A | 5/1992 | Bachhuber et al. |
| 5,120,282 A | 6/1992 | Fjaellstroem |
| 5,124,915 A | 6/1992 | Krenzel |
| 5,137,292 A | 8/1992 | Eisen |
| 5,168,946 A | 12/1992 | Dorgan |
| 5,168,948 A | 12/1992 | Roehringer et al. |
| 5,180,456 A | 1/1993 | Schultz et al. |
| 5,189,617 A | 2/1993 | Shiraishi |
| 5,194,851 A | 3/1993 | Kraning et al. |
| 5,195,600 A | 3/1993 | Dorgan |
| 5,201,629 A | 4/1993 | Simpson et al. |
| 5,202,830 A | 4/1993 | Tsurumiya et al. |
| 5,205,587 A | 4/1993 | Orr |
| 5,215,423 A | 6/1993 | Schulte-Hinsken et al. |
| 5,217,083 A | 6/1993 | Bachhuber et al. |
| 5,222,853 A | 6/1993 | Carson |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,301,997 A | 4/1994 | Cudden |
| 5,310,239 A | 5/1994 | Koske et al. |
| 5,343,675 A | 9/1994 | Norton |
| 5,343,971 A | 9/1994 | Heidelberg et al. |
| 5,345,154 A | 9/1994 | King |
| 5,365,436 A | 11/1994 | Schaller et al. |
| 5,369,540 A | 11/1994 | Konrad et al. |
| 5,389,825 A | 2/1995 | Ishikawa et al. |
| 5,409,425 A | 4/1995 | Shibahata |
| 5,416,702 A | 5/1995 | Kitagawa et al. |
| 5,417,299 A | 5/1995 | Pillar et al. |
| 5,418,437 A | 5/1995 | Couture et al. |
| 5,445,347 A | 8/1995 | Ng |
| 5,448,561 A | 9/1995 | Kaiser et al. |
| 5,463,992 A | 11/1995 | Swenson et al. |
| 5,470,187 A | 11/1995 | Smith et al. |
| 5,493,490 A | 2/1996 | Johnson |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,521,817 A | 5/1996 | Burdoin et al. |
| 5,538,274 A | 7/1996 | Schmitz et al. |
| 5,540,037 A | 7/1996 | Lamb et al. |
| 5,553,673 A | 9/1996 | Hackman |
| 5,555,171 A | 9/1996 | Sonehara et al. |
| 5,557,257 A | 9/1996 | Gieffers |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,573,300 A | 11/1996 | Simmons |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,592,375 A | 1/1997 | Salmon et al. |
| 5,595,398 A | 1/1997 | Brown |
| 5,601,392 A | 2/1997 | Smith et al. |
| 5,607,028 A | 3/1997 | Braun et al. |
| 5,619,412 A | 4/1997 | Hapka |
| 5,623,169 A | 4/1997 | Sugimoto et al. |
| 5,629,567 A | 5/1997 | Kumar |
| 5,629,603 A | 5/1997 | Kinoshita |
| 5,636,122 A | 6/1997 | Shah et al. |
| 5,637,933 A | 6/1997 | Rawlings et al. |
| 5,638,272 A | 6/1997 | Minowa et al. |
| 5,646,510 A | 7/1997 | Kumar |
| 5,657,224 A | 8/1997 | Lonn et al. |
| 5,669,470 A | 9/1997 | Ross |
| 5,670,845 A | 9/1997 | Grant et al. |
| 5,672,920 A | 9/1997 | Donegan et al. |
| 5,679,085 A | 10/1997 | Fredriksen et al. |
| 5,680,122 A | 10/1997 | Mio |
| 5,732,074 A | 3/1998 | Spaur et al. |

(56) References Cited

U.S. PATENT DOCUMENTS

| | | |
|---|---|---|
| 5,736,925 A | 4/1998 | Knauff et al. |
| 5,739,592 A | 4/1998 | Rigsby et al. |
| 5,754,021 A | 5/1998 | Kojima |
| 5,767,584 A | 6/1998 | Gore et al. |
| 5,779,300 A | 7/1998 | McNeilus et al. |
| 5,781,119 A | 7/1998 | Yamashita et al. |
| 5,793,648 A | 8/1998 | Nagle et al. |
| 5,794,165 A | 8/1998 | Minowa et al. |
| 5,812,959 A | 9/1998 | Froeberg et al. |
| 5,813,487 A | 9/1998 | Lee et al. |
| 5,813,488 A | 9/1998 | Weiss |
| 5,815,126 A | 9/1998 | Fan et al. |
| 5,819,188 A | 10/1998 | Vos |
| 5,819,201 A | 10/1998 | DeGraaf |
| 5,820,150 A | 10/1998 | Archer et al. |
| 5,827,957 A | 10/1998 | Wehinger |
| 5,828,554 A | 10/1998 | Donegan et al. |
| 5,838,251 A | 11/1998 | Brinkmeyer et al. |
| 5,844,473 A | 12/1998 | Kaman |
| 5,845,221 A | 12/1998 | Hosokawa et al. |
| 5,847,520 A | 12/1998 | Theurillat et al. |
| 5,848,365 A | 12/1998 | Coverdill |
| 5,851,100 A | 12/1998 | Brandt |
| 5,864,781 A | 1/1999 | White |
| 5,879,265 A | 3/1999 | Bek |
| 5,880,570 A | 3/1999 | Tamaki et al. |
| 5,881,559 A | 3/1999 | Kawamura |
| 5,884,206 A | 3/1999 | Kim |
| 5,890,080 A | 3/1999 | Coverdill et al. |
| 5,890,558 A | 4/1999 | Keegan |
| 5,890,865 A | 4/1999 | Smith et al. |
| 5,895,454 A | 4/1999 | Harrington |
| 5,896,418 A | 4/1999 | Hamano et al. |
| 5,913,210 A | 6/1999 | Call |
| 5,918,180 A | 6/1999 | Dimino |
| 5,919,237 A | 7/1999 | Balliet |
| 5,922,040 A | 7/1999 | Prabhakaran |
| 5,924,879 A | 7/1999 | Kameyama |
| 5,925,993 A | 7/1999 | Lansberry |
| 5,928,291 A | 7/1999 | Jenkins et al. |
| 5,930,742 A | 7/1999 | Dodd, Jr. et al. |
| 5,939,794 A | 8/1999 | Sakai et al. |
| 5,945,919 A | 8/1999 | Trask |
| 5,947,855 A | 9/1999 | Weiss |
| 5,948,025 A | 9/1999 | Sonoda |
| 5,949,330 A | 9/1999 | Hoffman et al. |
| 5,950,144 A | 9/1999 | Hall et al. |
| 5,954,470 A | 9/1999 | Duell et al. |
| 5,957,985 A | 9/1999 | Wong et al. |
| 5,973,463 A | 10/1999 | Okuda et al. |
| 5,986,416 A | 11/1999 | Dubois |
| 5,987,365 A | 11/1999 | Okamoto |
| 5,995,898 A | 11/1999 | Tuttle |
| 5,997,338 A | 12/1999 | Pohjola |
| 5,998,880 A | 12/1999 | Kumar |
| 5,999,104 A | 12/1999 | Symanow et al. |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,041,310 A | 3/2000 | Green et al. |
| 6,054,844 A | 4/2000 | Frank |
| 6,059,058 A | 5/2000 | Dower |
| 6,070,538 A | 6/2000 | Flamme et al. |
| 6,088,650 A | 7/2000 | Schipper et al. |
| 6,096,978 A | 8/2000 | Pohjola |
| 6,104,148 A | 8/2000 | Kumar et al. |
| 6,105,984 A | 8/2000 | Schmitz et al. |
| 6,112,152 A | 8/2000 | Tuttle |
| 6,123,497 A | 9/2000 | Duell et al. |
| 6,125,356 A | 9/2000 | Brockman et al. |
| 6,135,806 A | 10/2000 | Pohjola |
| 6,141,608 A | 10/2000 | Rother |
| 6,141,610 A | 10/2000 | Rothert et al. |
| 6,151,539 A | 11/2000 | Bergholz et al. |
| 6,152,673 A | 11/2000 | Anderson et al. |
| 6,154,122 A | 11/2000 | Menze |
| 6,154,658 A | 11/2000 | Caci |
| 6,157,889 A | 12/2000 | Baker |
| 6,173,222 B1 | 1/2001 | Seo et al. |
| 6,181,994 B1 | 1/2001 | Colson et al. |
| 6,182,807 B1 | 2/2001 | Saito et al. |
| 6,208,948 B1 | 3/2001 | Klingler et al. |
| 6,219,626 B1 | 4/2001 | Steinmetz et al. |
| 6,223,104 B1 | 4/2001 | Kamen et al. |
| 6,232,874 B1 | 5/2001 | Murphy |
| 6,240,365 B1 | 5/2001 | Bunn |
| 6,243,628 B1 | 6/2001 | Bliley et al. |
| 6,244,758 B1 | 6/2001 | Solymar et al. |
| 6,246,320 B1 | 6/2001 | Monroe |
| 6,256,580 B1 | 7/2001 | Meis et al. |
| 6,263,268 B1 | 7/2001 | Nathanson |
| 6,263,269 B1 | 7/2001 | Dannenberg |
| 6,269,295 B1 | 7/2001 | Gaugush et al. |
| 6,281,790 B1 | 8/2001 | Kimmel et al. |
| 6,285,932 B1 | 9/2001 | De Bellefeuille et al. |
| 6,298,932 B1 | 10/2001 | Bowman et al. |
| 6,332,745 B1 | 12/2001 | Duell et al. |
| 6,338,010 B1 | 1/2002 | Sparks et al. |
| RE37,610 E | 3/2002 | Tsuchiya et al. |
| 6,356,826 B1 | 3/2002 | Pohjola |
| 6,370,454 B1 | 4/2002 | Moore |
| 6,371,243 B1 | 4/2002 | Donaldson et al. |
| 6,387,007 B1 | 5/2002 | Fini, Jr. |
| 6,404,607 B1 | 6/2002 | Burgess et al. |
| 6,421,593 B1 | 7/2002 | Kempen et al. |
| 6,429,773 B1 | 8/2002 | Schuyler |
| 6,430,488 B1 | 8/2002 | Goldman et al. |
| 6,434,512 B1 | 8/2002 | Discenzo |
| 6,466,258 B1 | 10/2002 | Mogenis et al. |
| 6,480,769 B1 * | 11/2002 | Kageyama .............. 701/23 |
| 6,487,717 B1 | 11/2002 | Brunemann et al. |
| 6,496,393 B1 | 12/2002 | Patwardhan |
| 6,496,775 B2 | 12/2002 | McDonald, Jr. et al. |
| 6,501,368 B1 | 12/2002 | Wiebe et al. |
| 6,542,077 B2 | 4/2003 | Joao |
| 6,549,827 B1 | 4/2003 | Yen |
| 6,553,290 B1 | 4/2003 | Pillar |
| 6,580,953 B1 | 6/2003 | Wiebe et al. |
| 6,593,960 B1 | 7/2003 | Sugimoto et al. |
| 6,609,108 B1 | 8/2003 | Pulliam et al. |
| 6,611,116 B2 | 8/2003 | Bachman et al. |
| 6,611,740 B2 | 8/2003 | Lowrey et al. |
| 6,611,755 B1 | 8/2003 | Coffee et al. |
| 6,615,186 B1 | 9/2003 | Kolls |
| 6,636,790 B1 | 10/2003 | Lightner et al. |
| 6,678,394 B1 | 1/2004 | Nichani |
| 6,694,234 B2 | 2/2004 | Lockwood et al. |
| 6,722,458 B2 | 4/2004 | Hofbauer |
| 6,757,597 B2 | 6/2004 | Yakes et al. |
| 6,798,344 B2 | 9/2004 | Faulkner et al. |
| 6,874,772 B2 | 4/2005 | Oldenettel |
| 6,882,917 B2 | 4/2005 | Pillar et al. |
| 6,885,920 B2 | 4/2005 | Yakes et al. |
| 6,902,630 B2 | 6/2005 | Ernst et al. |
| 6,909,944 B2 | 6/2005 | Pillar et al. |
| 6,922,615 B2 | 7/2005 | Pillar et al. |
| 6,983,324 B1 * | 1/2006 | Block et al. ............. 709/228 |
| 6,993,421 B2 | 1/2006 | Pillar et al. |
| 7,006,902 B2 | 2/2006 | Archer et al. |
| 7,024,296 B2 | 4/2006 | Squires et al. |
| 7,243,026 B2 | 7/2007 | Kudo |
| 7,248,283 B2 | 7/2007 | Takagi et al. |
| 7,478,817 B1 * | 1/2009 | Carrier ................ 180/6.48 |
| 7,555,468 B2 | 6/2009 | El-Damhougy |
| 2001/0034573 A1 | 10/2001 | Morgan et al. |
| 2001/0034656 A1 | 10/2001 | Lucas et al. |
| 2001/0044769 A1 | 11/2001 | Chaves |
| 2002/0005304 A1 | 1/2002 | Bachman et al. |
| 2002/0010643 A1 | 1/2002 | Chaves |
| 2002/0015354 A1 | 2/2002 | Buckelew |
| 2002/0045507 A1 | 4/2002 | Bowen |
| 2002/0049523 A1 | 4/2002 | Diaz et al. |
| 2002/0065594 A1 | 5/2002 | Squires et al. |

(56) References Cited

U.S. PATENT DOCUMENTS

| | | | |
|---|---|---|---|
| 2002/0065707 | A1 | 5/2002 | Lancaster et al. |
| 2002/0107833 | A1 | 8/2002 | Kerkinni |
| 2002/0111725 | A1 | 8/2002 | Burge |
| 2002/0123832 | A1 | 9/2002 | Gotvall et al. |
| 2002/0133273 | A1 | 9/2002 | Lowrey et al. |
| 2002/0161489 | A1* | 10/2002 | Johnson ............................ 701/4 |
| 2002/0175007 | A1 | 11/2002 | Strong |
| 2003/0001736 | A1 | 1/2003 | Lewis |
| 2003/0025357 | A1 | 2/2003 | Fischer et al. |
| 2003/0031543 | A1 | 2/2003 | Elbrink |
| 2003/0046179 | A1 | 3/2003 | Anabtawi et al. |
| 2003/0080619 | A1 | 5/2003 | Bray et al. |
| 2003/0081123 | A1 | 5/2003 | Rupe |
| 2003/0085562 | A1 | 5/2003 | Sparling |
| 2003/0090077 | A1 | 5/2003 | Colet |
| 2003/0105565 | A1 | 6/2003 | Loda et al. |
| 2003/0105566 | A1 | 6/2003 | Miller |
| 2003/0107191 | A1 | 6/2003 | Romer et al. |
| 2003/0114965 | A1 | 6/2003 | Fiechter et al. |
| 2003/0130765 | A1 | 7/2003 | Pillar et al. |
| 2003/0144011 | A1 | 7/2003 | Richards et al. |
| 2003/0158635 | A1 | 8/2003 | Pillar et al. |
| 2003/0158638 | A1 | 8/2003 | Yakes et al. |
| 2003/0158640 | A1 | 8/2003 | Pillar et al. |
| 2003/0163228 | A1 | 8/2003 | Pillar et al. |
| 2003/0163229 | A1 | 8/2003 | Pillar et al. |
| 2003/0163230 | A1 | 8/2003 | Pillar et al. |
| 2003/0163233 | A1 | 8/2003 | Song et al. |
| 2003/0171854 | A1 | 9/2003 | Pillar et al. |
| 2003/0182034 | A1 | 9/2003 | Katagishi et al. |
| 2003/0195680 | A1 | 10/2003 | Pillar |
| 2003/0200015 | A1 | 10/2003 | Pillar |
| 2003/0205422 | A1 | 11/2003 | Morrow et al. |
| 2003/0208309 | A1* | 11/2003 | Triphathi ........................ 701/29 |
| 2003/0230443 | A1 | 12/2003 | Cramer et al. |
| 2003/0233178 | A1 | 12/2003 | Sinex |
| 2004/0002794 | A1 | 1/2004 | Pillar et al. |
| 2004/0019414 | A1 | 1/2004 | Pillar et al. |
| 2004/0021569 | A1 | 2/2004 | Lepkofker et al. |
| 2004/0023635 | A1 | 2/2004 | Impson et al. |
| 2004/0024502 | A1 | 2/2004 | Squires et al. |
| 2004/0030451 | A1* | 2/2004 | Solomon ...................... 700/245 |
| 2004/0039502 | A1 | 2/2004 | Wilson et al. |
| 2004/0039504 | A1 | 2/2004 | Coffee et al. |
| 2004/0039510 | A1 | 2/2004 | Archer et al. |
| 2004/0055802 | A1 | 3/2004 | Pillar et al. |
| 2004/0069865 | A1 | 4/2004 | Rowe et al. |
| 2004/0070515 | A1 | 4/2004 | Burkley et al. |
| 2004/0133319 | A1 | 7/2004 | Pillar et al. |
| 2004/0133332 | A1 | 7/2004 | Yakes et al. |
| 2004/0167709 | A1* | 8/2004 | Smitherman et al. ......... 701/208 |
| 2004/0193334 | A1* | 9/2004 | Carlsson et al. .................. 701/9 |
| 2004/0199302 | A1 | 10/2004 | Pillar et al. |
| 2004/0203974 | A1 | 10/2004 | Seibel |
| 2005/0004723 | A1* | 1/2005 | Duggan et al. .................. 701/24 |
| 2005/0004733 | A1 | 1/2005 | Pillar et al. |
| 2005/0018627 | A1* | 1/2005 | Cardei et al. .................... 370/328 |
| 2005/0021197 | A1* | 1/2005 | Zimmerman et al. .......... 701/29 |
| 2005/0038934 | A1 | 2/2005 | Gotze et al. |
| 2005/0049944 | A1 | 3/2005 | Chernoff et al. |
| 2005/0054351 | A1 | 3/2005 | McAlexander |
| 2005/0060246 | A1 | 3/2005 | Lastinger et al. |
| 2005/0113988 | A1 | 5/2005 | Nasr et al. |
| 2005/0113996 | A1 | 5/2005 | Pillar et al. |
| 2005/0114007 | A1 | 5/2005 | Pillar et al. |
| 2005/0119806 | A1 | 6/2005 | Nasr et al. |
| 2005/0128431 | A1 | 6/2005 | Jannard et al. |
| 2005/0131600 | A1 | 6/2005 | Quigley et al. |
| 2005/0197749 | A1* | 9/2005 | Nichols et al. ...................... 701/3 |
| 2005/0209747 | A1 | 9/2005 | Yakes et al. |
| 2005/0234622 | A1 | 10/2005 | Pillar et al. |
| 2006/0018513 | A1 | 1/2006 | Sogawa |
| 2006/0020380 | A1* | 1/2006 | Saito et al. ...................... 701/29 |
| 2006/0114324 | A1* | 6/2006 | Farmer et al. ................. 348/144 |
| 2006/0129292 | A1 | 6/2006 | Ohkubo |
| 2006/0171704 | A1 | 8/2006 | Bingle et al. |
| 2007/0228676 | A1 | 10/2007 | Stegmann |
| 2007/0235584 | A1* | 10/2007 | Corman et al. ............... 244/75.1 |
| 2007/0299794 | A1 | 12/2007 | El-Damhougy |
| 2007/0299947 | A1* | 12/2007 | El-Damhougy ............... 709/223 |
| 2008/0189009 | A1* | 8/2008 | Wang et al. ...................... 701/34 |
| 2008/0195277 | A1 | 8/2008 | Stiller |
| 2010/0253017 | A1 | 10/2010 | Vanraaphorst |
| 2010/0268409 | A1* | 10/2010 | Vian et al. ....................... 701/24 |
| 2011/0093166 | A1 | 4/2011 | Li et al. |
| 2013/0345920 | A1* | 12/2013 | Duggan et al. .................. 701/23 |

FOREIGN PATENT DOCUMENTS

| | | |
|---|---|---|
| DE | 40 41 483 A1 | 6/1992 |
| DE | 41 08 647 A1 | 9/1992 |
| DE | 44 31 929 C1 | 10/1995 |
| DE | 198 46 664 A1 | 4/1999 |
| DE | 197 49 074 A1 | 5/1999 |
| DE | 199 29 434 A1 | 12/2000 |
| EP | 0 496 302 A1 | 7/1992 |
| EP | 0 504 913 A1 | 9/1992 |
| EP | 0 266 704 B1 | 6/1993 |
| EP | 0 630 831 A1 | 12/1994 |
| EP | 0 791 506 A2 | 8/1997 |
| EP | 0 812 720 B1 | 12/1997 |
| EP | 0 622 264 B1 | 11/1998 |
| EP | 0 894 739 A1 | 2/1999 |
| EP | 0 898 213 A1 | 2/1999 |
| EP | 0 949 122 A2 | 10/1999 |
| EP | 1 018 451 A1 | 7/2000 |
| EP | 0 805 059 B1 | 8/2000 |
| EP | 1 087 343 A1 | 3/2001 |
| EP | 1 092 406 A2 | 4/2001 |
| EP | 0 564 943 B1 | 6/2001 |
| EP | 1 115 264 A2 | 7/2001 |
| EP | 1 229 636 A2 | 8/2002 |
| EP | 1 504 929 | 2/2005 |
| EP | 1 504 929 A2 | 2/2005 |
| EP | 1 844 961 | 10/2007 |
| FR | 2658259 A1 | 8/1991 |
| GB | 1 308 318 | 2/1973 |
| GB | 2 263 376 A | 7/1993 |
| GB | 2 302 850 A | 2/1997 |
| JP | 60-216703 A | 10/1985 |
| JP | 11-212641 A | 8/1999 |
| JP | 2000-333160 A0 | 11/2000 |
| JP | 2002-196817 A | 7/2002 |
| SE | 507046 C2 | 3/1998 |
| WO | WO-95/15594 A1 | 6/1995 |
| WO | WO-96/32346 A1 | 10/1996 |
| WO | WO-96/40573 A1 | 12/1996 |
| WO | WO-97/02965 A1 | 1/1997 |
| WO | WO-98/19875 A1 | 5/1998 |
| WO | WO-98/30961 A1 | 7/1998 |
| WO | WO-99/23783 A2 | 5/1999 |
| WO | WO-00/69662 A1 | 11/2000 |
| WO | WO-00/79727 A2 | 12/2000 |
| WO | WO-01/15001 A2 | 3/2001 |
| WO | WO-01/54939 A2 | 8/2001 |
| WO | WO-03/055714 A1 | 7/2003 |
| WO | WO-03/059455 A2 | 7/2003 |
| WO | WO-03/060831 A2 | 7/2003 |
| WO | WO-03/061235 A3 | 7/2003 |
| WO | WO-03/093046 A3 | 11/2003 |
| WO | WO-2004/052756 A1 | 6/2004 |
| WO | WO-2005/030614 A1 | 4/2005 |

OTHER PUBLICATIONS

Williamson et al., "A Trinocular Stereo System for Highway Obstacle Detection," *Robotics and Automation*, Proceedings, 1999 IEEE International Conference, Detroit, Michigan, May 10-15, 1999, pp. 2267-2273.

International Search Report and Written Opinion for Application No. PCT/US2007/071473, mailing date Jun. 27, 2008, 11 pages.

International Search Report and Written Opinion for PCT Application No. PCT/US2011/056697, dated Jun. 8, 2012, 16 pages.

(56) References Cited

OTHER PUBLICATIONS

International Search Report and Written Opinion for PCT Application No. PCT/US2009/043980, dated Dec. 29, 2009, 11 pages.
"Telvisant Ready Mix Industry Plan: maximize your ready mix fleet operation", 2003 (2 pgs.).
Advanced Wireless Technology for CAN and DeviceNet, available at www.matrric.com, Apr. 2003, 1 page, Pennsylvania, United States of America.
Aircraft Internal Time Division Multiplex Data Bus, MIL STD 1553 (USAF), Aug. 30, 1973, 29 pgs.
AssetVision Brochure, printed on Aug. 8, 2001, 3 pgs.
AssetVision Product Specification Preliminary, Wireless Link, revised date May 18, 1999, 63 pages.
Barraco Klement, M.A., Agile Support Project—Global Hawk Program, Jan.-Feb. 1999, pp. 66-70 (5 pgs.).
Belluta, P. et al., "Terrain Perception for DEMO III," Proceedings of the IEEE Intelligent Vehicles Symposium 2000, Oct. 3-5, 2000 (8 pgs.).
Bertozzi, Massimo et al., "Stereo Inverse Perspective Mapping—Theory and Applications," Image Vision Computing, Jun. 1998, pp. 585-590 (8 pgs.).
Bose, B.K. et al., 1CHigh Frequency AC vs. DC Distribution System for Next Generation Hybrid Electric Vehicle 1D; Industrial Electronics, Control and Instrumentation, 1996: Proceedings of the 1996 IEEE IECON 22nd International Conference on Taipei, Taiwan; Aug. 5-10, 1996, New York, NY; pp. 706-712.
Braid, Deborah et al., "The TerraMax Autonomous Vehicle," Journal of Field Robotics, Sep. 2006 (17 pgs.).
Broggi, Alberto et al., "Obstacle Detection with Stereo Vision for Off-Road Vehicle Navigation," Proceedings of the 2005 IEEE Computer Society Conference on Computer Vision and Pattern Recognition, 2005 (8 pgs.).
Broggi, Alberto et al., "Single Frame Stereo Vision System for Reliable Obstacle Detection used during the 2005 DARPA Grand Challenge on TerraMax," Proceedings of the 2006 IEEE Intelligent Transportation Systems Conference, Toronto, Canada, Sep. 17-20, 2006 pp. 745-752 (8 pgs.).
Cadec Corporation, Onboard Computer—Mobius TTS Smarter Mobile Logistics on the Road, Londonderry, NH, estimated date obtained of Aug. 8, 2001, 4 pgs.
CarPort—The Only Link Between the Auto and the PC, Vetronix Corporation, available at http://www.vetronix.com/telematics/carport/description.html, printed on Jul. 30, 2003, 1 page.
CarPort by Vertronix, "User's Guide Version 1.0," Vetronix Corporation, Nov. 1999 (40 pgs.).
Caterpillar, Technology Products—MineStar, Minestar, printed on Aug. 8, 2001, 2 pgs.
Construction, "Equipment Tracking-A New Asset Management Method"; Equipment Today, Oct. 1999 (3 pgs.).
Customer Applications, "Benefits of Monitoring and Tracking of Heavy Equipment:" MobileNet; printed on Aug. 8, 2001, marked as copyright 2000 (2 pgs.).
Dana Corporation, Dana Spicer Central Tire Inflation System Specifications, Kalamazoo, Michigan, May 2000 (2 pgs.).
Dang Thao et al., "Fusing Optical Flow and Stereo Disparity for Object Tracking," The IEEE 5th International Conference on Intelligent Transportation Systems—Proceedings, Sep. 3-6, 2002 (8 pgs.).
Dang, Thao et al., "Fast Object Hypotheses Generation Using 3D Position and 3D Motion," Proceedings of the 2005 IEEE Computer Society Conference on Computer Vision and Pattern Recognition, 2005 (6 pgs.).
Dearborn Group Technology, Dearborn Group Puts Wireless Vehicle Connectivity in Customers' Hands, Mar. 3, 2001, 3 pgs.
Dick Smith and Russ Walker, "Coming to a multiplex near you," WasteAge.com, Fire Chief, Feb. 1, 2003 (5 pgs.).
DriverTech, Inc., DriverTech—Features, printed on Jul. 29, 2003, 1 page.
DriverTech, Inc., DriverTech—Functional Specifications, printed on Jul. 29, 2003, 5 pgs.
DriverTech, Inc., DriverTech—Hardware & Software, printed on Jul. 29, 2003, 3 pgs.
DriverTech, Inc., DriverTech—Wireless IP Based Fleet Management System, printed on Jul. 29, 2003, 2 pgs.
Estrada Francisco J. et al., "Quantitative Evaluation of a Novel Image Segmentation Algorithm," IEEE Computer Society Conference on Computer Vision and pattern Recognition [2], Jun. 20-25, 2005 (9 pgs.).
FAQ, "Global Asset Monitoring," MobileNet; printed on Aug. 8, 2001, copyright marked as 1999 (2 pgs.).
Goldberg, Steven B. et al., "Stereo Vision and Rover Navigation Software for Planetary Exploration," 2002 IEEE Aerospace Conference Proceedings, Mar. 9-16, 2002, vol. 5 of 7 (14 pgs.).
Griffin, J., Look, up in the sky . . . it's . . . it's a . . . fleet management satellite! American Rental Association, MobileNet, printed on Aug. 8, 2001, copyright marked 2000, 4 pgs.
HGI Wireless Inc., HGI Wireless Products and Services, Product and Services, Product Summary HGI Wireless Inc.; printed on Aug. 8, 2001, copyright marked as 2001, 2 pgs.
Home Page, "An Introduction to InterTrak," InterTrak Tracking Services, LLC., printed on Aug. 8, 2001, copyright marked as 2001 (3 pgs.).
Hu, Zhencheng et al., "Complete U-V-Disparity Study for Stereovision Based 3D Driving Environmental Analysis," 3DIM 2005 Proceedings of the Fifth International Conference on 3-D Digital Imaging and Modeling, Jun. 13-16, 2005 (9 pgs.).
I.D. Systems, Inc., I.D. Systems | Products Gallery, The I.D. Systems Product Gallery, printed on Aug. 8, 2001, 3 pgs.
IA-32 Intel Architecture Optimization Reference Manual, Jun. 2005 (512 pgs.).
IBM Press room, IBM Service After Sales Solutions Open Lucrative New Customer Service Markets for Manufacturers and Service Organizations, Press Release, White Plains, NY, Jun. 26, 2001, 2 pgs.
Instruction and Parts Manual, Machine type: GCB 1000 SPLIT, May 23, 2002, 80 pages, Geesink Norba Group.
Instruction and Parts Manual, Machine type: GPM Ile, Jul. 10, 2002, 74 pages, Geesink Norba Group.
Instruction Manual for the Training AS-i bus, Aug. 2002, 31 pages, Version 3.0, Geesink Norba Group.
Interests, "Global Remote Asset Monitoring," MobileNet, printed on Aug. 8, 2001, copyright marked 2000 (2 pgs.).
International Search Report and Written Opinion for International Application No. PCT/US2004/031216, dated Oct. 31, 2005, 13 pgs.
Kato, Takeo et al., "An Obstacle Detection Method by Fusion of Radar and Motion Stereo," IEEE Transactions on Intelligent Transportation Systems, Sep. 2002, vol. 3, No. 3 (7 pgs.).
Khan, I.A., "Automotive Electrical Systems: Architecture and Components," Digital Avionics Systems Conference, 1999, IEEE pp. 8.C.5-1-8.C.5-10 (10 pgs.).
Konolige, Kurt, "Small Vision Systems: Hardware and Implementation," Robotics Research—The Eight International Symposium, see IDS for date information (cover page and pp. 203-212).
Labayrade, Raphael et al., "A Single Framework for Vehicle Roll, Pitch, Yaw Estimation and Obstacles Detection by Stereovision," IEEE IV2003 Intelligent Vehicle Symposium—Proceedings, Jun. 9-11, 2003 (8 pgs.).
Labayrade, Raphael et al., "Real Time Obstacle Detection in Stereovision on Non Flat Road Geometry Through 'V-disparity' Representation," IV'2002 IEEE Intelligent Vehicle Symposium—Proceeding Part 2 (1), Jun. 17-21, 2002, (8 pgs.).
Lemonde, Vincent et al., "Obstacle Detection With Stereovision," Mechatronics and Robotics '04, Sep. 13-15, 2004 (7 pgs.).
Luka, J and Stubhan, F, "Mobile Diagnosis," Vehicle Electronics Conference, 1999 (IVEC 99), proceedings of the IEEE International Changchun, China, Sep. 6-9, 1999 (6 pgs.).
Manduchi, R., "Obstacle Detection and Terrain Classification for Autonomous Off-Road Navigation," Autonomous Robots, 2005 (pp. 81-102).
Matric, "Wireless CAN Bridge CB-300," Apr. 10, 2002 (20 pgs.).
Miltope Recieves $13.5 Million Order for SPORT, Montgomery, AL, Jan. 25, 2000 (1 pg.).
Miltope Recieves $16 Million Defense System Integration Award, PRNewswire, Mar. 26, 2000 (1 pg.).

(56) References Cited

OTHER PUBLICATIONS

Mobile Workstation, "MobileNet Mobile Workstation," printed on Aug. 8, 2001, copyright marked 2000 (2 pgs.).
MobilEmail, "MobileNet MobilEmail," printed on Aug. 8, 2001, copyright marked 2000 (2 pgs.).
Mussaf, J.S., "The Space Shuttle Clickable Map," Retrieved from the Internet: http://web.archive.org/web/2001040101, Apr. 1, 2001 (24 pgs.).
Namuduri, C.S. et al., "High Power Density Electric Drive for an Hybrid Vehicle," Applied Power Electronics Conference and Exposition, Feb. 15, 1998, pp. 34-40 (7 pgs.).
Nathanson M., "Vehicle Intelligence and Remote Wireless OBD," SAE Technical Paper, Dec. 4-6, 2000 (15 pgs.).
Nedevschi, Sergiu et al., "High Accuracy Stereovision Approach for Obstacle Detection on Non-Planar Roads," see IDS for date information (6 pgs.).
New Unimog Generation, collection of documents each individually dated as shown (24 pgs.).
Nissan Moter Phils., Inc., "Client: Nissan Motor Philippines, Inc. Project," RADIX Systems Service Corporation, pinted on Aug. 8, 2001, copyright marked 2000 (1 pg.).
Nister, David et al., "Visual Odometry," IEEE Computer Society Conference on Computer Vision and Pattern Recognition, Jun. 27-Jul. 2, 2004 (9 pgs.).
Oshkosh Truck Corporatiion, "Oshkosh Showcases ProPulse Hybrid Electric System at Major Defense Exhibition," Oct. 21, 2002 (1 pg.).
Oshkosh Truck Corporation "M1070F Heavy Equipment Transporter & Trailer" Sep. 2001 (8 pgs.).
Oshkosh Truck Corporation, "HEMTT—Heavy Expanded Mobility Tactical Truck M977 Series Truck," Mar. 2000 (12 pgs. as photocopied).
Oshkosh Truck Corporation, "Medium Tactical Vehicle Replacement," Aug. 2000 (6 pgs.).
Oshkosh Truck Corporation, "MTVR Dump Body Variant (Medium Tactical Vehicle Replacement)," Sep. 2001 (2 pgs.).
Oshkosh Truck Corporation, "MTVR Wrecker Variant (MK36 Wrecker Recovery Vehicle)," Sep. 2001 (2 pgs.).
Oshkosh Truck Corporation, "Oshkosh Demonstrates ProPulse, the First Electric Hybrid—Drive Heavy Defense Truck," Feb. 27, 2000 (2 pgs.).
Oshkosh Truck Corporation, "Oshkosh Receives Federal Government Funding to Develop ProPulse Alternative Drive System for Military Trucks," Aug. 31, 2001 (2 pgs.).
Oshkosh Truck Corporation, "Oshkosh Truck and Ohio State University Design Robotic Vehicle to Compete in Desert Race," Feb. 11, 2004 (2 pgs.).
Oshkosh Truck Corporation, "Oshkosh Truck Awarded Contract for U.S. Army Future Tactical Truck Concepts and Technology Evaluations," Dec. 2, 2003 (2 pgs.).
Oshkosh Truck Corporation, "Oshkosh Truck Rolls Out Next Generation of Command Zone Advanced Electronics System to Military Market," Oct. 21, 2002 (2 pgs.).
Oshkosh Truck Corporation, "Oshkosh Truck's Robotic Truck Qualifies for Pentagon's $1 Million Desert Race," Mar. 12, 2004 (2 pgs.).
Oshkosh Truck Corporation, "The One to Count on Through Hell and High Water," Sep. 2000 (4 pgs.).
Ozguner, Umit et al., "Teama TereraMax and the DARPA Grand Challenge: A General Overview," 2004 IEEE Intelligent Vehicle Symposium, Jun. 14-17, 2004 (7 pgs.).
Products—CMS Products, "CMS Products," Cadec Corporation, printed on Aug. 8, 2001, copyright marked 2001 (6 pgs.).
Products—Mobius TTS, "Mobius TTS / Onboard Computer," Cadec Corporation, printed on Aug. 8, 2001, copyright marked 2001 (2 pgs.).
Products—Mobius TTS, "Mobius TTS," Cadec Corporation, printed on Aug 8, 2001, copyright marked 2001 (3 pgs.).
Products—Overview, "Overview—The Right Stuff for 25 Years," Cadec Corporation, printed on Aug. 8, 2001, copyright marked 2001 (2 pgs.).
Products, "MobileNet Products," printed on Aug. 8, 2001, copyright marked 2000 (2 pgs.).
Rajashekara, K., "History of Electric Vehicles in General Motors," Industry Applications Society Annual Meeting, Oct. 2-8, 1993, pp. 447-454 (8 pgs.).
Rankin, Arturo et al., "Evaluation of Stereo Vision Obstacle Detection Algorithms for Off-Road Autonomous Navigation," see IDS for date information (15 pgs.).
Red Team DARPA Grand Challenge 2005 Technical Paper, Aug. 24, 2005 (15 pgs.).
Red Team Too DARPA Grand Challenge 2005 Technical Paper, Aug. 24, 2005 (15 pgs.).
Reitzner, S. and Schleicher, M., "Options and risks—PDAs in the automotive area," Aug. 2001 (3 pgs.).
RM CANview Bluetooth/TCP/IP, RM Michaelides Software & Electronic Corp., Nov. 19, 2002 (2 pgs.).
Scharstein, Daniel et al., "A Taxonomy and Evaluation of Dense Two-Fram Stereo Correspondence Algorithms," IEEE Workshop on Stereo and Multi-Baseline Vision, Dec. 9-10, 2001 (12 pgs.).
Shalabi, L., "Equipment Tracking—A New Asset Management Method"; Equipment Today, Oct. 1999 (3 pgs.).
Singh, Sanjiv et al., "Recent Progress in Local and Global Traversability for Planetary Rovers," 2000 IEEE International Conference on Robotics and Automation, Apr. 24-28, 2000 (9 pgs.).
Skibinski, J. et al., "Internet-based Vehicle Communication Network," SAE Technical Paper Series, Dec. 4-6, 2000 (8 pgs.).
STE/ICE-R Design Guide for Vehicle Diagnostic Connector Assemblies, Report No. CR-82-588-003 REV Feb. 1, 1988 (182 pgs.).
Steele, John et al., "Stereo Images for Object Detection in Surface Mine Safety Application," Nov. 4, 2003 (pgs. 1-11).
Sun, Jian et al., "Symmetric Stereo Matching for Occlusion Handling," IEEE Computer Society Conference on Computer Vision and Pattern Recognition [1], Jun. 20-25, 2005 (9 pgs.).
Talukder, A. et al., "Fast and Reliable Obstacle Detection and Segmentation for Cross-Country Navigation," IV'2002 Intelligent Vehicle Symposium—Proceedings Part 2, Jun. 17-21, 2002 (11 pgs.).
Team DAD Technical Paper DARPA Grand Challenge 2005, Aug. 26, 2005 (12 pgs.).
Technology Products—MineStar, "Minestar," Caterpillar, printed on Aug. 8, 2001 (2 pgs.).
Technology Products—VIMS, "Technology Products," Caterpillar, printed on Aug. 8, 2001 (2 pgs.).
Telematics Diagram, Vetronix Corporation, printed on Jul. 30, 2003 (1 pg.).
Top 100, "Construction Equipment's editors pick the 100 most significant product introductions of the year," Construction Equipment Magazine, Dec. 1999 (1 pg.).
TrakPak2000, "The TrakPak 2000—A Self-Contained Mobile Tracking Unit," printed on Aug. 8, 2001, copyright marked 2000 (2 pgs.).
Trimble Information Services, "Trimble Information Services Power the Transformation of Location Data . . . into Location Information" printed on Aug. 8, 2001 (4 pgs.).
Trimble Navigation Limited, "Telvisant Fleet Management—The Concrete Solution," Mar. 2002 (2 pgs.).
Trimble, "Telvisant Ready Mix Industry Plan: maximize your ready mix fleet operation," 2004 (2 pgs.).
Trimble, "Trimble and McNeilus Enhance Televisant Fleet Management System for the Ready Mix Market," Feb. 4, 2003 (2 pgs.).
Trimble, "Trimble and McNeilus Form Alliance to Factory-Install Fleet Management Solutions on Ready Mix Concrete Trucks," Mar. 19, 2002 (2 pgs.).
Tsai, Roger Y., "A Versatile Camera Calibration Technique for High-Accuracy 3D Machine Vision Metrology Using Off-the-Shelf TV Cameras and Lenses," IEEE Journal of Robotics and Automation, Aug. 1987, (cover pages and pp. 323-344), vol. RA-3, No. 4, A Publication of the IEEE Robotics and Automation Council.
US Office Action on 061300-0871 DTD May 6, 2011.
Van Der Mark, W., "Stereo based Navigation in Unstructured Environments," IMTC 2001 Proceedings of the 18th IEEE Instrumentation and Measurements Technology Conference, Budapest, Hungary, May 21-23, 2001 (cover pages. and pp. 2038-2043).

(56) References Cited

OTHER PUBLICATIONS

Vermeer Deal, "MobileNet asset monitoring system selected by Vermeer Manufacturing Company," Alpharetta, GA, Nov. 1, 1999 (2 pgs.).

Vetronix Coporation, "Vehicle Internet Port (VIP)—Internet Access System for AutoPC," printed on Jul. 30, 2003 (1 pg.).

Vetronix Corporation, "Vehicle Internet Port (VIP) System Description," printed on Jul. 30, 2003 (2 pgs.).

Vetronix Corporation, "WirelessRoad Fleet Management System," printed on Jul. 30, 2003 (2 pgs.).

Vetronix Corporation, "WirelessRoad Frequently Asked Questions," printed on Jul. 30, 2003 (2 pgs.).

Vetronix Corporation, "WirelessRoad System Description," printed on Jul. 30, 2003 (5 pgs.).

Welcome to Modular Mining Systems, Inc.—Products, "Products—Dispatch Systems for Open Pit Mines," printed on Aug. 8, 2001, copyright marked 1996-2001 (1 pg.).

Welcome to Modular Mining Systems, Inc.—Products, "Products—Vehicle Health Systems (VHS)," printed on Aug. 8, 2001 (1 pg.).

Wireless Data—Introduction, printed on Aug. 8, 2001 (7 pgs.).

Wireless Link Corporation—News Room, "CSI Wireless Receives $7M Order from InterTrak," Jan. 9, 2001 (3 pgs.).

Woodard, S. "Computer Diagnoses Vehicle Deficiencies," Fort Jackson Leader, Jul. 26, 2002 (2 pgs.).

Wright et al., "Oshkosh Trucks—75 Years of Specialty Truck Production," Motorbooks International Publishers & Wholesalers, 1992, pp. 119-126 (10 pgs.).

Non-Final Office Action on U.S. Appl. No. 13/370,136, dated Oct. 21, 2014, 12 pages.

\* cited by examiner

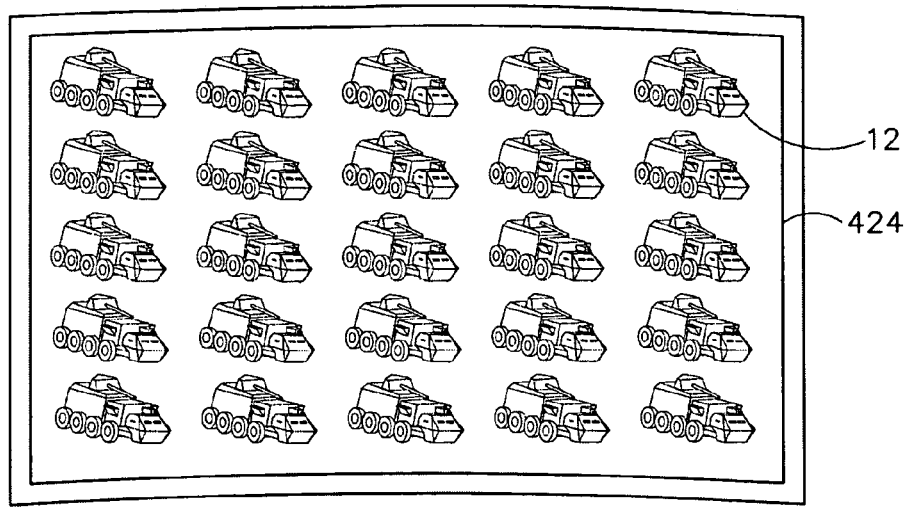
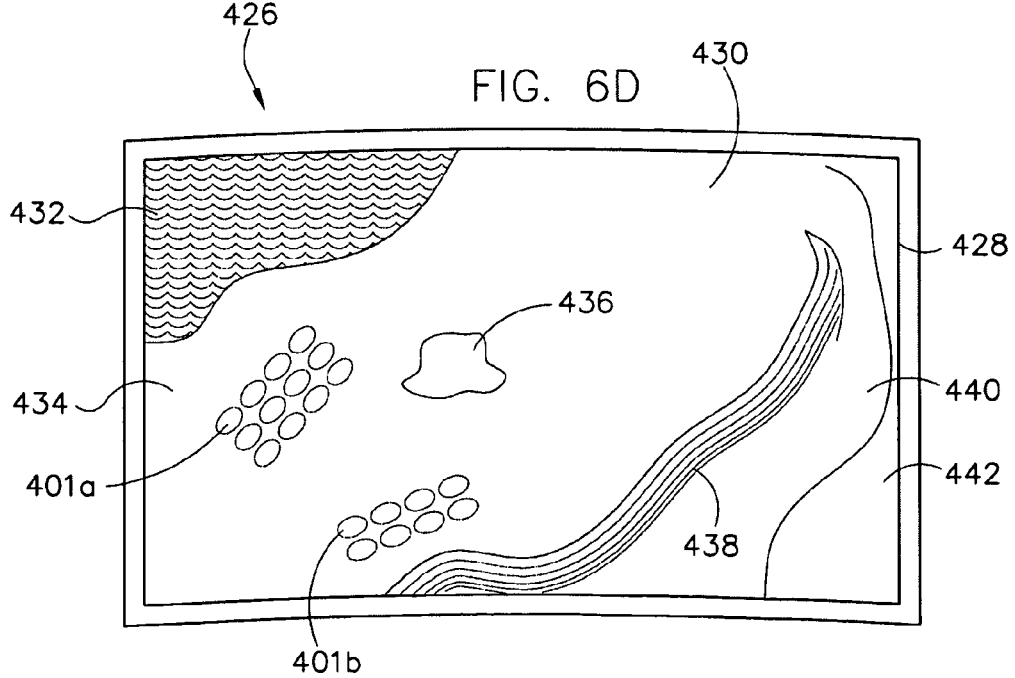

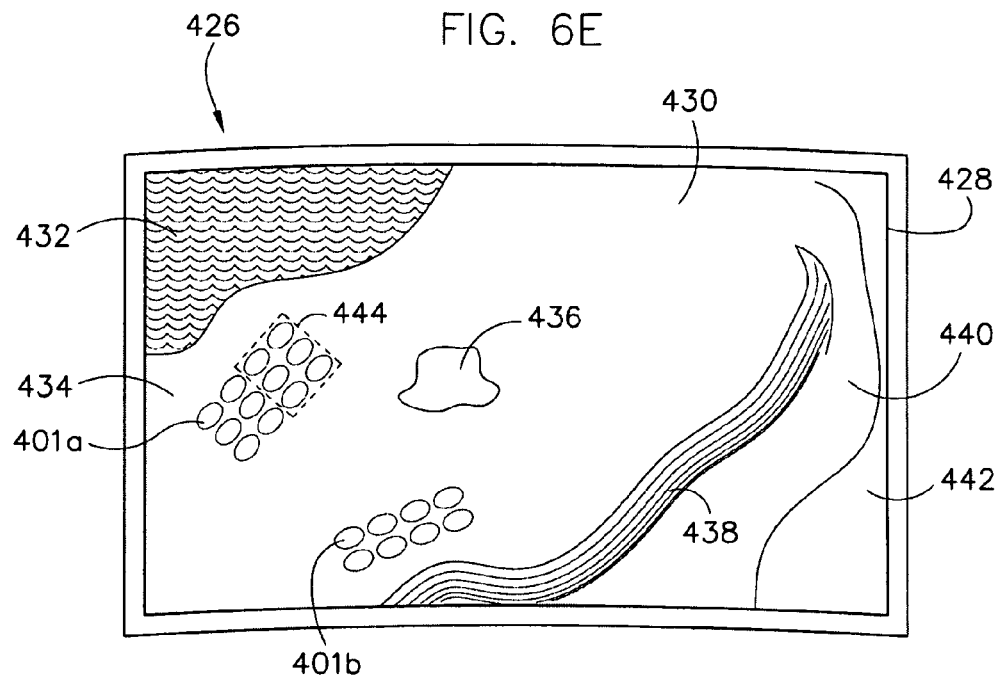
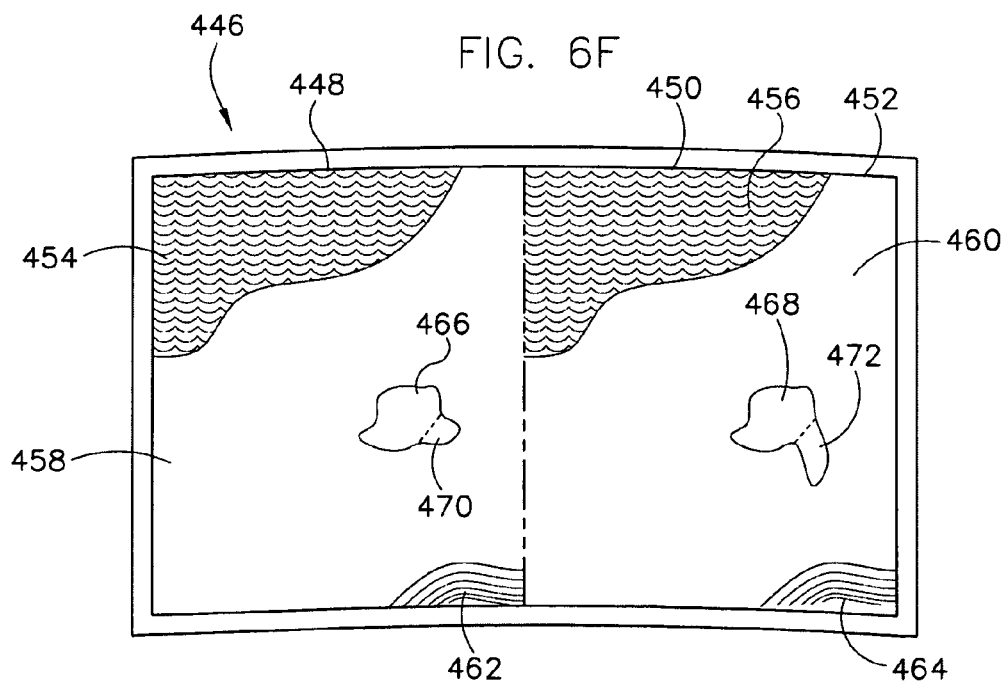

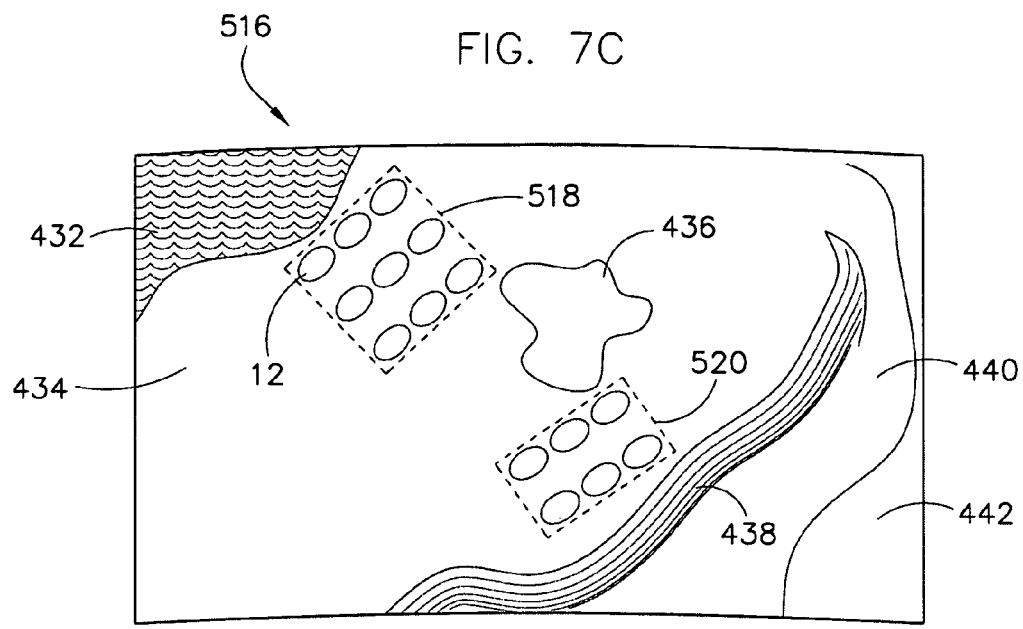
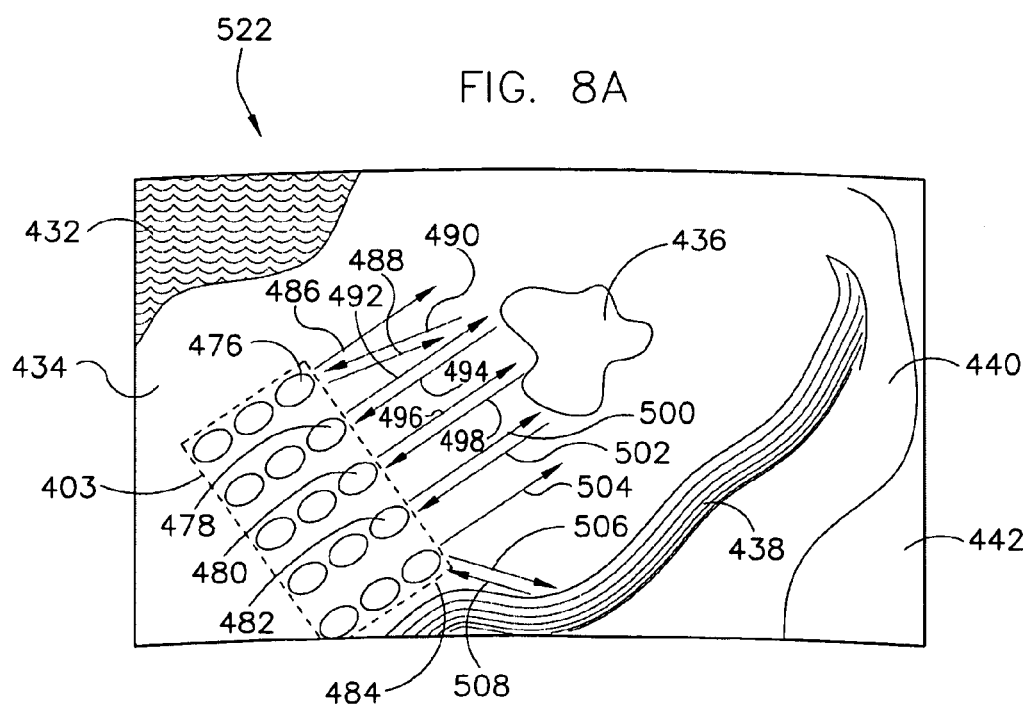

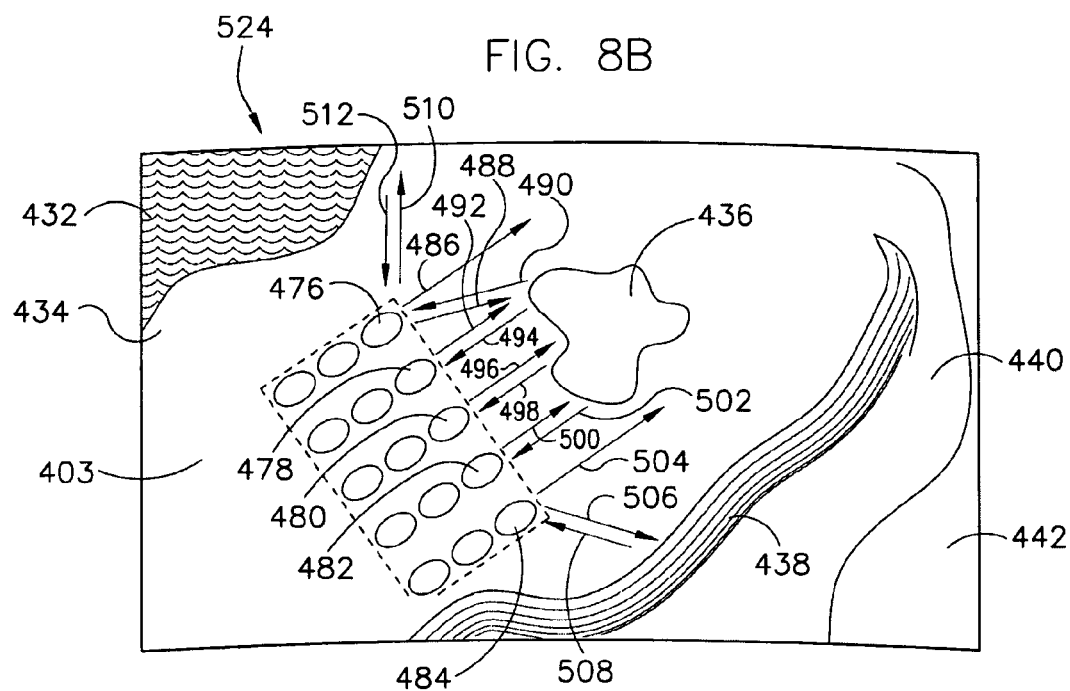
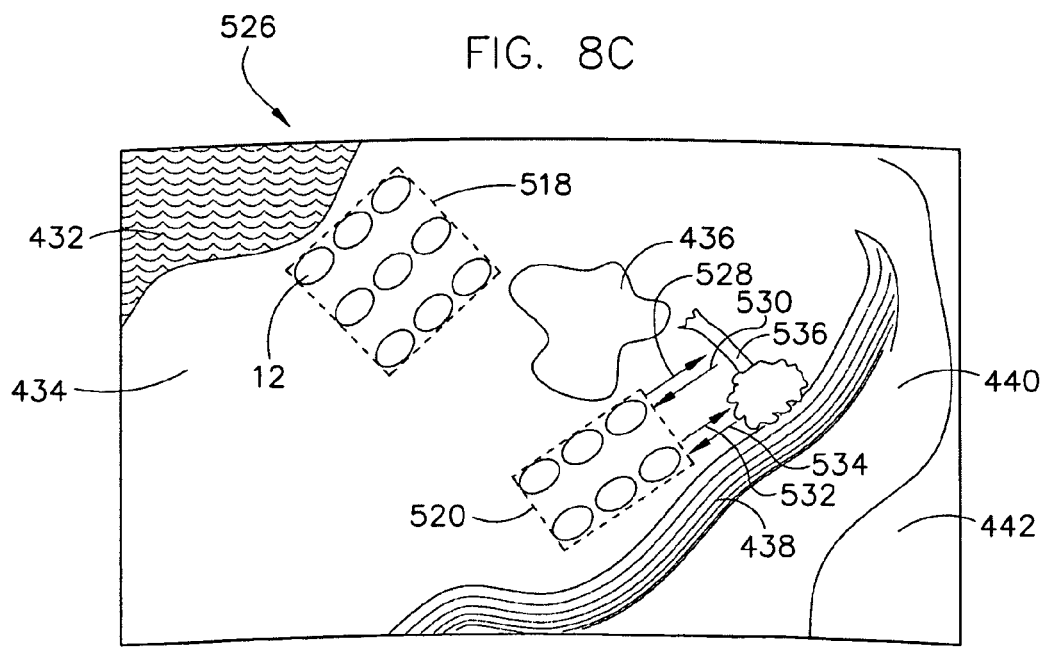

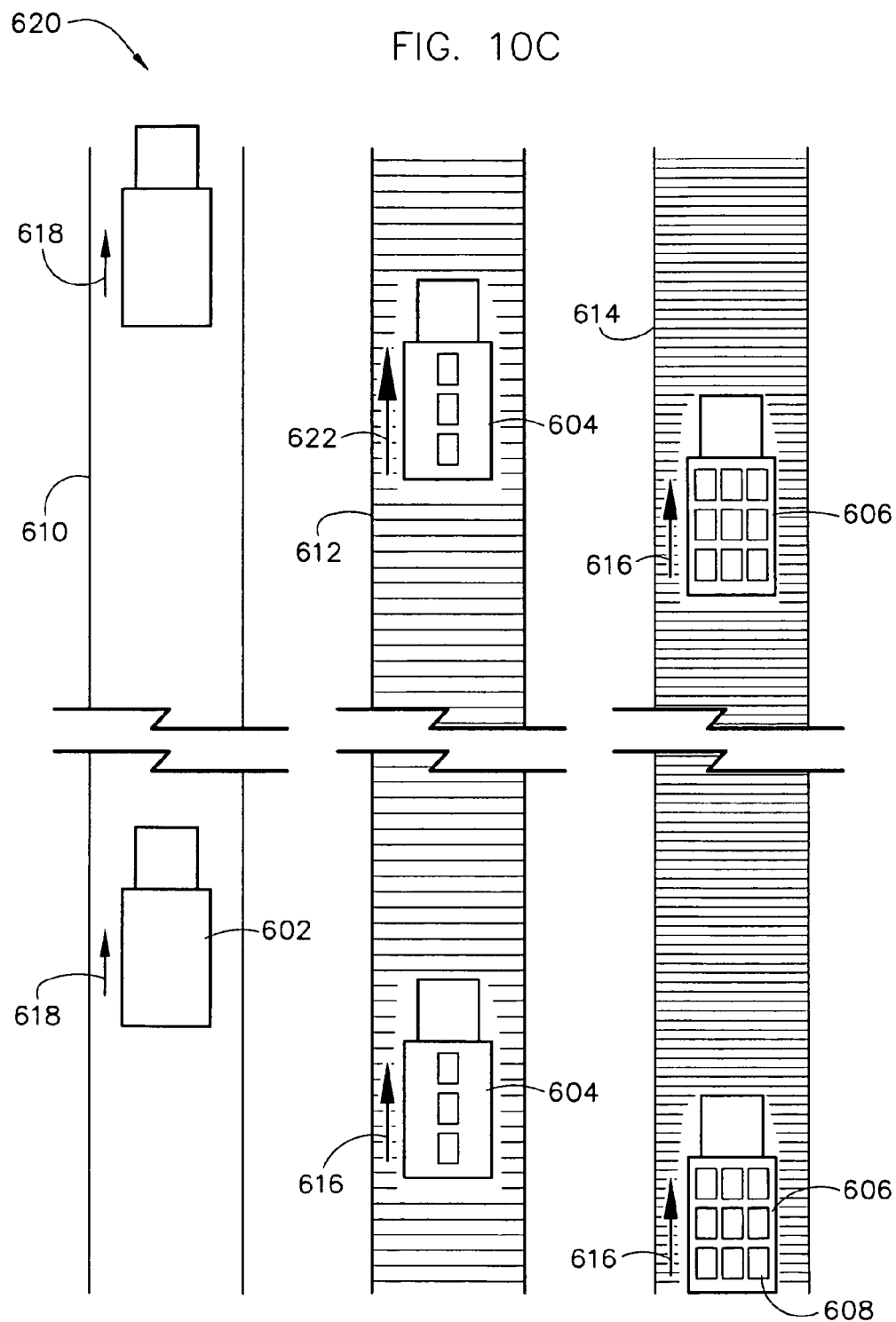

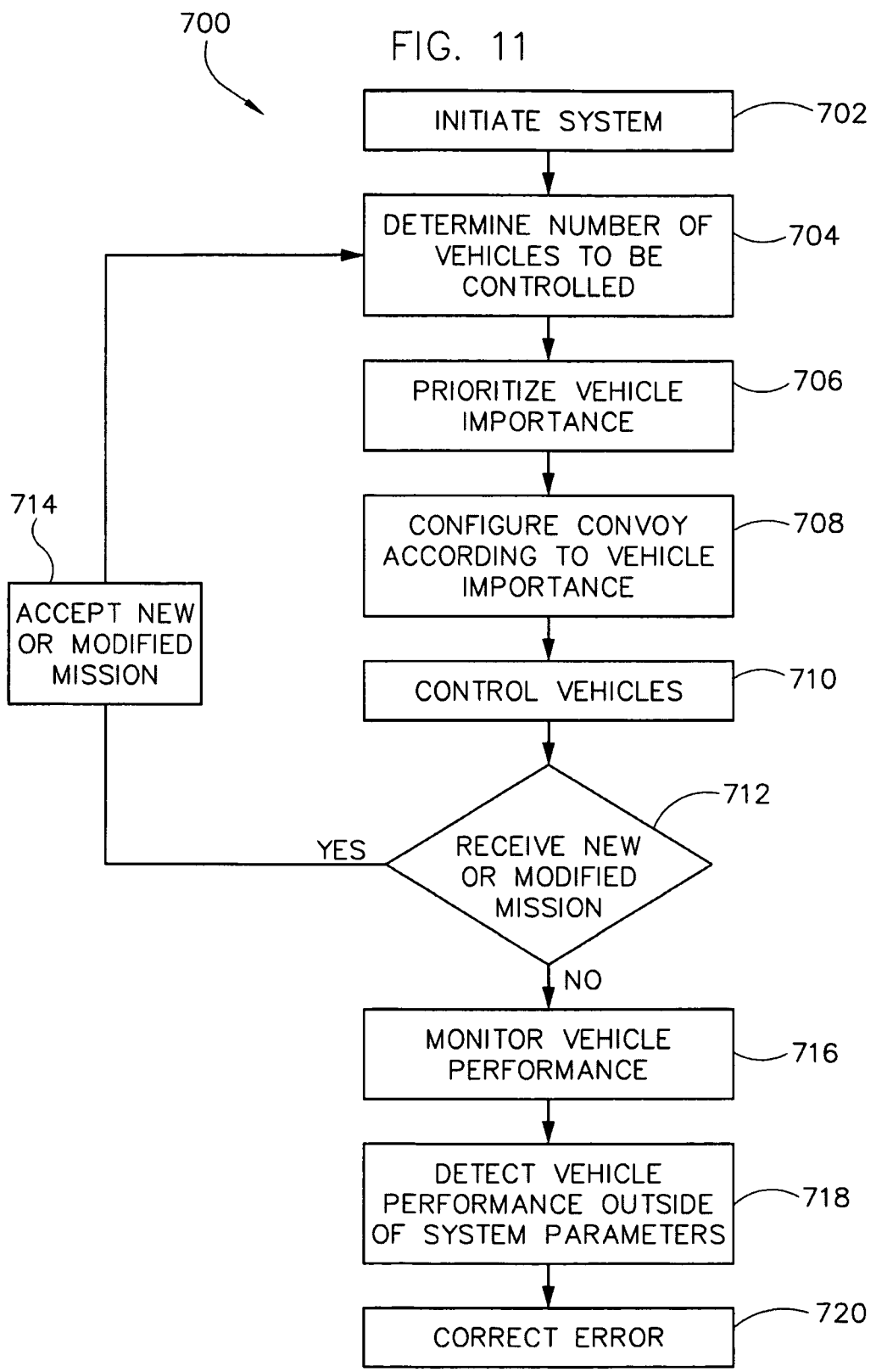

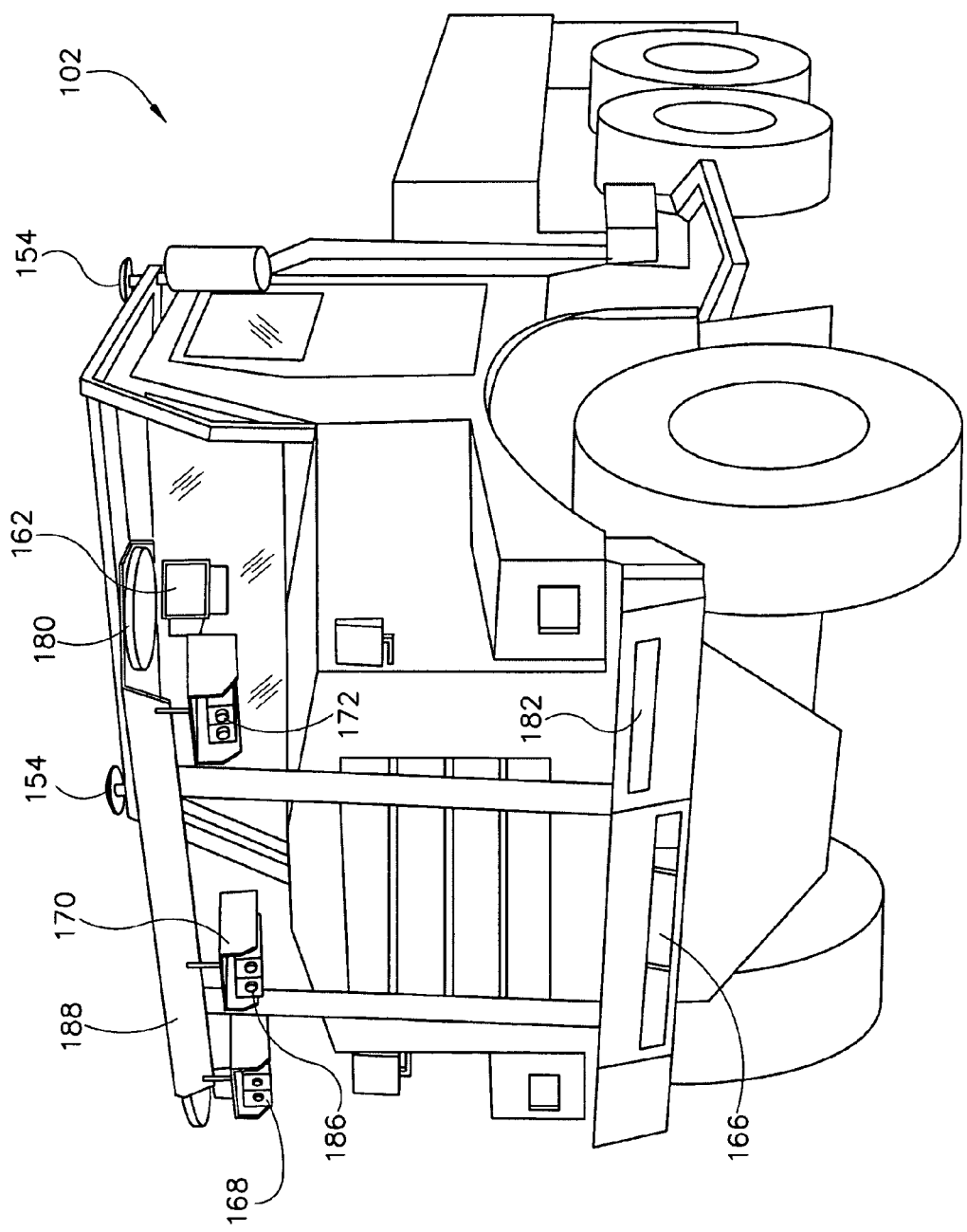

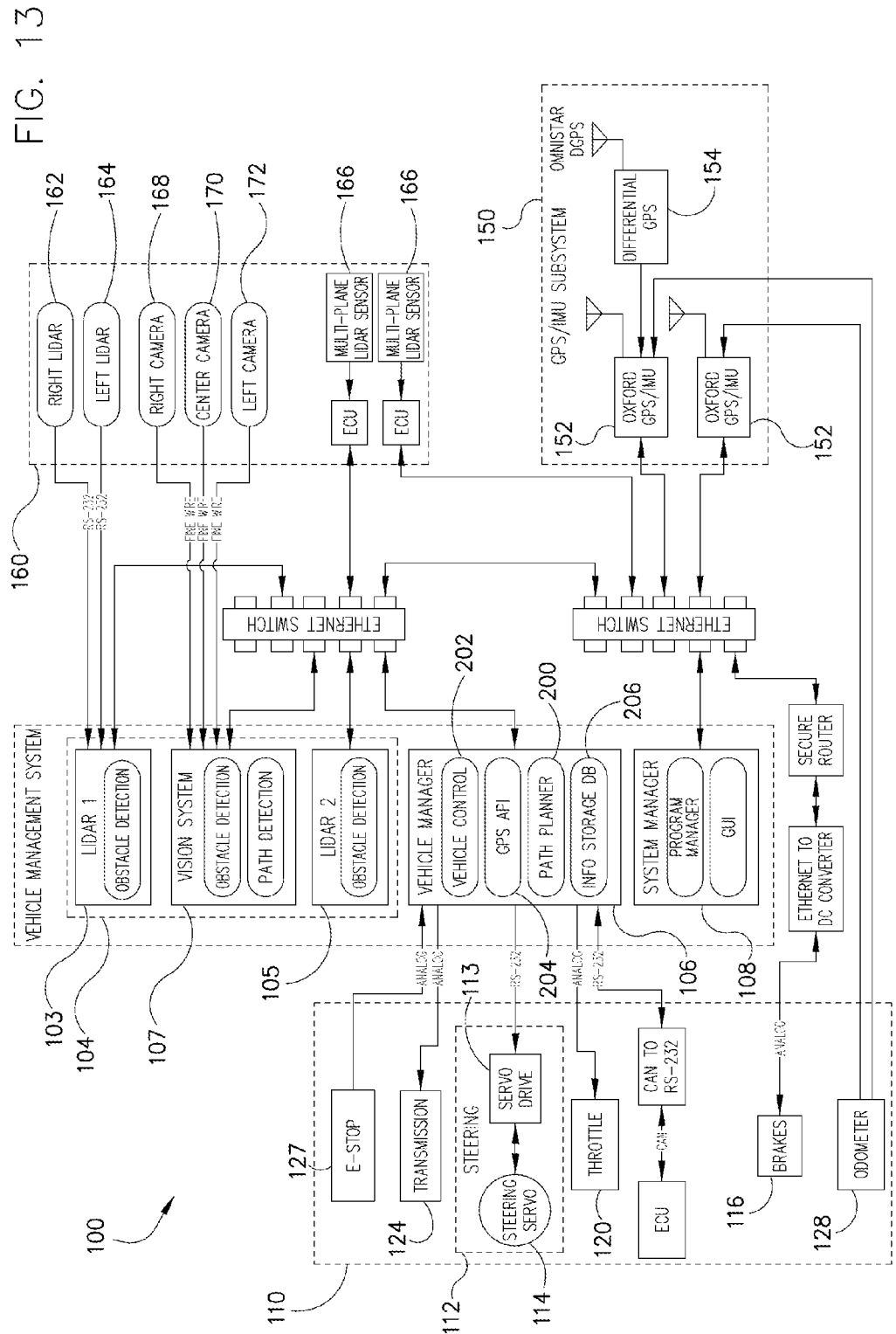

VEHICLE DIAGNOSTICS BASED ON INFORMATION COMMUNICATED BETWEEN VEHICLES

CROSS-REFERENCE TO RELATED PATENT APPLICATIONS

This application is a continuation-in-part of U.S. Ser. No. 11/562,824, filed Nov. 22, 2006, entitled "Vision System For An Autonomous Vehicle," pending, which claims priority to U.S. Prov. No. 60/805,197, filed Jun. 19, 2006, entitled "Vision System For An Autonomous Vehicle," all of which are hereby expressly incorporated by reference.

BACKGROUND

The present disclosure relates generally to the field of the fleet vehicles. More specifically, the present disclosure relates to military vehicles (e.g., tanks, trucks, ambulances, ships, airplanes, trains), cargo transportation vehicles (e.g., trucks, trains, ships, airplanes), personnel transportation vehicles (e.g., buses, ships, airplanes, trains), emergency response vehicles (e.g. fire engines, ambulances, police cars), or any other type of service vehicle (hereinafter "vehicle").

Vehicles have become increasingly complex, difficult to maintain and require increased operator sophistication/training to be properly deployed. The movement of vehicles has become increasingly intertwined to enhance the effectiveness of vehicle movement.

A convoy is a modification of a caravan, which allows vehicles to travel together for a mutual support. The vehicle movement may also be coordinated to position multiple vehicles in an attack position to achieve an overall goal. For example, a plurality of tanks may take up position surrounding a target (e.g., city) to provide protection, to eliminate a hostile force, provide reinforcement or any combination thereof. In another example, a plurality of fire engines may take up position surrounding a target (e.g., burning building) to extinguish a fire.

The convoy and/or coordinated maneuvering functionality is limited by the amount of trained human resource available. The convoy and/or coordinated maneuvering functionality is further limited by the imprecision introduced by requiring multiple human operators to coordinate complex tactical actions.

A system that could minimize the need for trained human resource would increase human to machine efficiency, precision and tactical consistency.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment of the disclosure relates to a convoy of vehicles including a leader vehicle in communication with a plurality of autonomous follower vehicles. The leader vehicle being configured to receive a first autonomous follower vehicle data and compare the first autonomous follower vehicle data to at least one of a leader vehicle data, a second autonomous follower vehicle data and/or a threshold value. The first autonomous follower vehicle data, the leader vehicle data, the second autonomous follower vehicle data and the threshold value relate to a vehicle performance characteristic.

Another embodiment of the disclosure relates to a convoy of vehicles including a leader vehicle in communication with a plurality of autonomous follower vehicles and configured to receive at least one autonomous follower vehicle data, the leader vehicle configured to transmit at least one command signal to the plurality of autonomous follower vehicles. The plurality of autonomous follower vehicles implements the at least one command signal.

Yet another embodiment of the disclosure relates to a method for controlling a leader-follower convoy including transmitting a first command from a leader vehicle to a first follower vehicle and receiving the first command at the first follower vehicle. The method further includes transmitting a second command from the first follower vehicle to a second follower vehicle and transmitting a first confirmation signal from the first follower vehicle to the leader vehicle. The further includes wherein the second command is a retransmission of the first command.

BRIEF DESCRIPTION OF THE DRAWINGS

The disclosure will become more fully understood from the following detailed description, taken in conjunction with the accompanying drawings. The exemplary embodiments will hereafter be described with reference to the accompanying drawings, wherein like numerals depict like elements.

FIG. 6C is an illustration of a vehicle control center master screen where all of the vehicles are displayed on the master screen, according to an exemplary embodiment;

FIG. 6D is an illustration of a vehicle control center master screen where the display image is a composite image based on data received from multiple vehicles in the convoy, according to an exemplary embodiment;

FIG. 6E is an illustration of a vehicle control center master screen where the operator can select a subset of the convoy and initiate a mission for this selected subset, according to an exemplary embodiment;

FIG. 6F is an illustration of a vehicle control center master screen where the display image includes a composite image based on data received from multiple convoy vehicles and an image generated by a terrain database, according to an exemplary embodiment;

FIGS. 7A-7C are illustrations of the convoy utilizing an object detection system to avoid an obstacle, according to an exemplary embodiment;

FIGS. 8A-8D are illustrations of a subset of the convoy reaching an obstacle and initiating maneuvers to circumvent the obstacle, according to an exemplary embodiment;

FIGS. 10A-10C are illustrations of convoy vehicles with different load factors and traveling on different inclines maintain convoy formation, according to an exemplary embodiment;

FIG. 11 is a flow diagram of the convoy operation procedures, according to an exemplary embodiment;

FIG. 12 is a perspective view of a vehicle that is autonomous and/or semi-autonomous, according to an exemplary embodiment;

FIG. 13 is a block diagram schematically illustrating a vehicle control system, according to an exemplary embodiment;

DETAILED DESCRIPTION OF THE EXEMPLARY EMBODIMENTS

Figure 1:
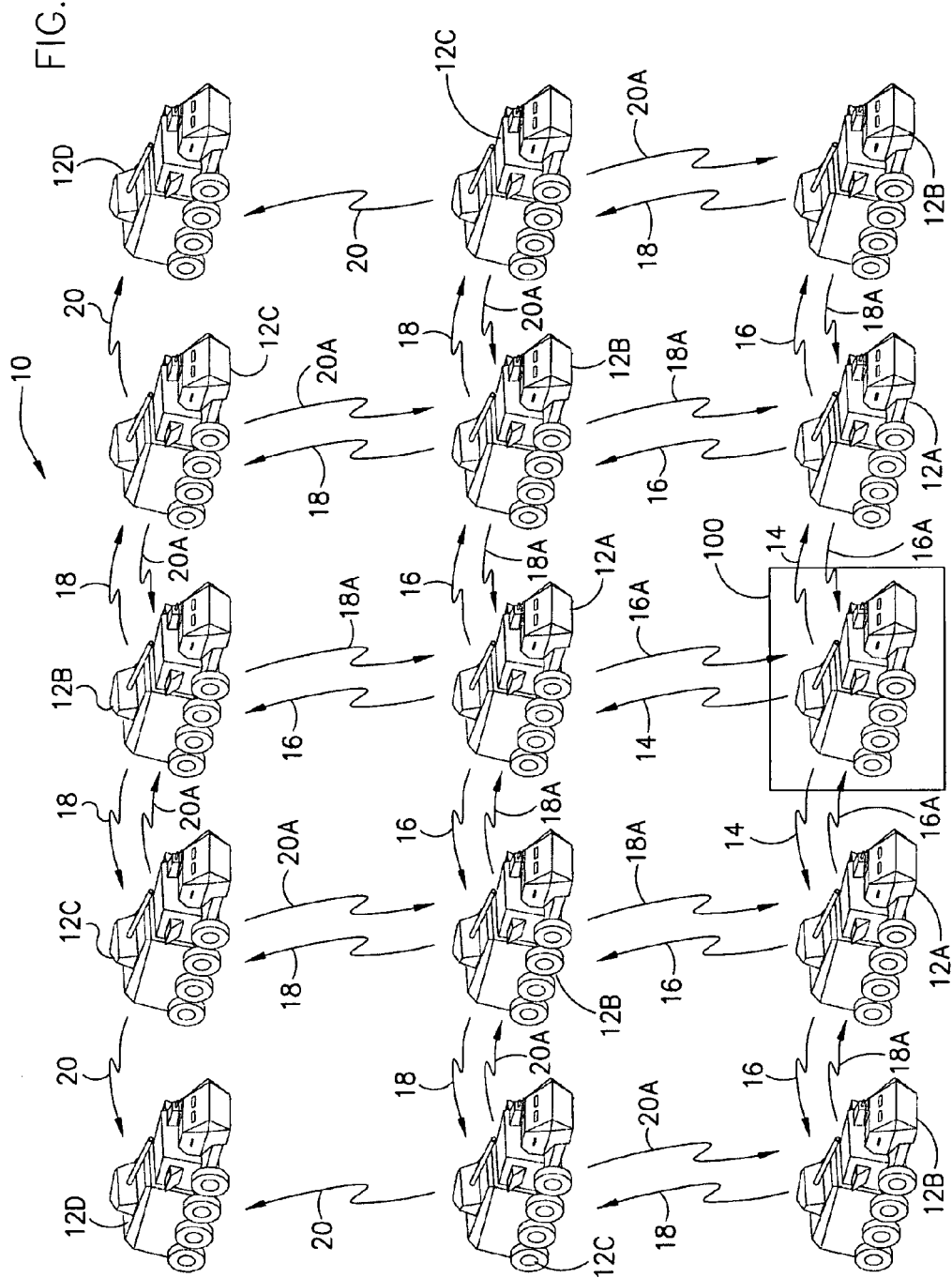
FIG. 1 is an illustration of a lead vehicle in communication with follower vehicles in a leader-follower convoy, according to an exemplary embodiment.

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

It should be appreciated that the vehicles, control systems, features, advantages, and any other subject matter described in: (1) U.S. Pat. No. 6,922,615, entitled "Turret Envelope Control System and Method for a Fire Fighting Vehicle," issued on Jul. 26, 2005, (2) U.S. Pat. No. 6,885,920, entitled "Control System and Method for Electric Vehicle," issued on Apr. 26, 2005, (3) U.S. Pat. No. 6,882,917, entitled "Steering Control System and Method," issued on Apr. 19, 2005, (4) U.S. Pat. No. 6,421,593, entitled "Military Vehicle having Cooperative Control Network with Distributed I/O Interfacing," issued on Jul. 16, 2002, and (5) U.S. Prov. Pat. App. No. 60/723,363, entitled "Vehicle Control System and Method," filed on Oct. 4, 2005, may be used and/or incorporated with the subject matter described herein. All possible configurations of the subject matter described in these documents and the subject matter described herein is contemplated and hereby expressly disclosed. For example, any of the vehicles or any portion of any of the vehicles (e.g., vehicle control systems, components for vehicle control systems, etc.) in these documents with their various configurations, control systems, features, and components may be combined with all or any part of the subject matter described herein. In particular, this disclosure could be utilized with the turret envelope control strategy of U.S. Pat. No. 6,922,615, the control system of U.S. Pat. No. 6,885,920, the steering control system of U.S. Pat. No. 6,882,917, the cooperative control network with distributed input/output interfacing of U.S. Pat. No. 6,421,593, and/or the control system of U.S. Prov. Pat. App. No. 60/723,363. The documents (1)-(5) listed in this paragraph are hereby incorporated by reference herein in their entireties as if the entire contents of these documents were reproduced herein.

Referring to FIG. 1, an illustration of a lead vehicle in communication with follower vehicles in a leader-follower convoy is shown, according to an exemplary embodiment. In exemplary embodiments, a convoy 10 can be made up of a two convoy vehicles 12, multiple convoy vehicles 12, and/or a plurality of convoy vehicles 12. In an exemplary embodiment, convoy 10 can include a leader vehicle 100, which initiates commands to convoy vehicles 12. In an exemplary embodiment, leader vehicle 100 can be in the front of convoy 10, the back of convoy 10, the right side of convoy 10, the left side of convoy 10, the middle of convoy 10 and/or any other position inside or outside of convoy 10. In a exemplary embodiment, there can be more than one leader vehicle 100. In an exemplary embodiment, convoy 10 can be controlled by commands initiated by a single leader vehicle 100, a few leader vehicles 100 or a plurality of leader vehicles 100. In an exemplary embodiment, multiple leader vehicles 100 can initiate commands utilizing a composite analysis, a composite image, composite sensor data and/or a composite data. In an exemplary embodiment, any of the composite analysis, composite image, composite sensor data and/or composite data is based off of data received from multiple leader vehicles 100 and/or convoy vehicles 12.

Convoy vehicles 12 follow the commands of leader vehicle 100 without regard to any other program, according to an exemplary embodiment. In another exemplary embodiment, convoy vehicles 12 compare the commands of leader vehicle 100 to predetermined values. The predetermined values can be mission specific values entered before the mission started and/or values entered during the manufacturing process. In an exemplary embodiment, the predetermined values can be vehicle performance characteristics or tolerances (e.g., cargo load capacity, speed, turning radius, rpms, temperature maximum and/or minimum values, etc.). In another exemplary embodiment, the predetermined values can be mission tolerances, such as, duration, mission phase timelines, acceptable loses, temperature ranges, visibility, distance, etc.). In an exemplary embodiment, if leader vehicle 100 commands are within the predetermined value, then convoy vehicles 12 follow the commands initiated by leader vehicle 100. In this exemplary embodiment, if leader vehicle 100 commands are not within the predetermined value, then convoy vehicles 12 can be configured to not follow the commands initiated by leader vehicle 100. In an exemplary embodiment, leader vehicle 100 can be configured with an override switch to disengage the ability of convoy vehicle 12 to not follow the commands of leader vehicle 100.

In an exemplary embodiment, the commands from leader vehicle 100 are not within the predetermined value when these leader vehicle 100 commands would damage convoy vehicle 12. In this exemplary embodiment, damage could occur because convoy vehicle 12 sense an obstacle, terrain, an enemy and/or a threat (e.g., landmines) that is not sensed by leader vehicle 100.

In an exemplary embodiment, leader vehicle 100 transmits a first command 14 to first convoy vehicles 12A. In this exemplary embodiment, first convoy vehicles 12A are directly adjacent to leader vehicle 100. In an exemplary embodiment, first convoy vehicles 12A transmit a second command 16 and a first validation command 16A to a second convoy vehicles 12B and leader vehicle 100 respectively. In an exemplary embodiment, leader vehicle 100 receives first validation command 16A and compares first validation command 16A to first command 14. If first validation command 16A and first command 14 are within predetermined parameters and/or mission parameters, then leader vehicle 100 can be configured to refrain from reissuing first command 14, according to an exemplary embodiment. If first validation command 16A and first command 14 are not within predetermined parameters and/or mission parameters, then leader vehicle 100 can be configured to reissue first command 14, according to an exemplary embodiment. In another exemplary embodiment, leader vehicle 100 can reissue first command 14 or another command signal to modify convoy vehicles 12 actions when first validation command 16A is not identical to first command 14.

In an exemplary embodiment, second convoy vehicles 12B transmit a third command 18 to a third convoy vehicles 12C and a second validation command 18A to first convoy vehicles 12A. If second validation command 18A and second command 16 are within predetermined parameters and/or mission parameters, then first convoy vehicles 12A can be configured to refrain from reissuing second command 16, according to an exemplary embodiment. If second validation command 18A and second command 16 are not within predetermined parameters and/or mission parameters, then first convoy vehicles 12A can be configured to reissue second command 16, according to an exemplary embodiment. In another exemplary embodiment, first convoy vehicle 12B can reissue second command 16 or another command signal to modify convoy vehicles 12 actions when second validation command 18A is not identical to second command 16.

In another exemplary embodiment, second validation command 18A can be transmitted to leader vehicle 100. In this exemplary embodiment, leader vehicle 100 can be configured to reissue first command 14 to first convoy vehicle 12A, reissue first command 14 to second convoy vehicle 12B, issue a modified command to first convoy vehicle 12A and/or issue a modified command to second convoy vehicle 12B.

In an exemplary embodiment, third convoy vehicles 12C transmit a fourth command 20 to a fourth convoy vehicles 12D and a third validation command 20A to second convoy vehicles 12B. If third validation command 20A and third command 18 are within predetermined parameters and/or mission parameters, then second convoy vehicles 12B can be configured to refrain from reissuing third command 18, according to an exemplary embodiment. If third validation command 20A and third command 18 are not within predetermined parameters and/or mission parameters, then second convoy vehicles 12B can be configured to reissue third command 18, according to an exemplary embodiment. In another exemplary embodiment, second convoy vehicle 12B can reissue third command 18 or another command signal to modify convoy vehicles 12 actions when third validation command 20A is not identical to third command 18. In another exemplary embodiment, third validation command 20A can be transmitted to leader vehicle 100. In this exemplary embodiment, leader vehicle 100 can be configured to reissue first command 14 to first convoy vehicle 12A, reissue first command 14 to second convoy vehicle 12B, reissue first command 14 to third convoy vehicle 12C, issue a modified command to first convoy vehicle 12A, issue a modified command to second convoy vehicle 12B and/or issue a modified command to third convoy vehicle 12C. In exemplary embodiments, the communication system can be closed loop (see FIGS. 1 and 2) or the communication system can be open loop (see FIG. 3).

Figure 2:
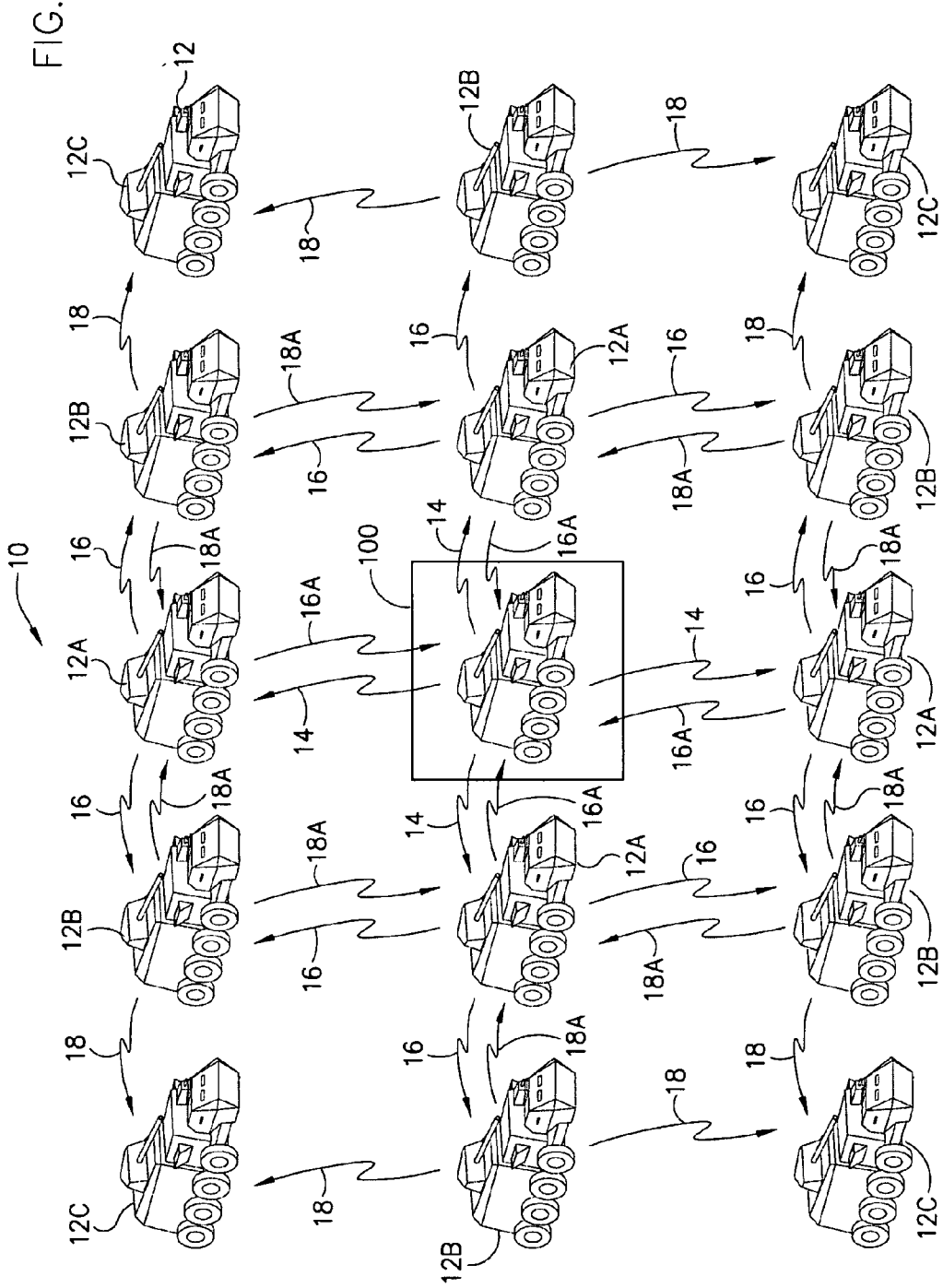
FIG. 2 is another illustration of a lead vehicle in communication with follower vehicles in a leader-follower convoy, according to an exemplary embodiment.

In FIG. 2, another illustration of a lead vehicle in communication with follower vehicles in a leader-follower convoy is shown, according to an exemplary embodiment. In an exemplary embodiment, convoy 10 can include leader vehicle 100, which initiates commands to convoy vehicles 12. In this exemplary embodiment, leader vehicle 100 is in the middle of convoy 10. In an exemplary embodiment, leader vehicle 100 transmits a first command 14 to first convoy vehicles 12A. In this exemplary embodiment, first convoy vehicles 12A are directly adjacent to leader vehicle 100. In an exemplary embodiment, first convoy vehicles 12A transmit a second command 16 and a first validation command 16A to a second convoy vehicles 12B and leader vehicle 100 respectively. In an exemplary embodiment, leader vehicle 100 receives first validation command 16A and compares first validation command 16A to first command 14. If first validation command 16A and first command 14 are within predetermined parameters and/or mission parameters, then leader vehicle 100 can be configured to refrain from reissuing first command 14, according to an exemplary embodiment. If first validation command 16A and first command 14 are not within predetermined parameters and/or mission parameters, then leader vehicle 100 can be configured to reissue first command 14, according to an exemplary embodiment. In another exemplary embodiment, leader vehicle 100 can reissue first command 14 or another command signal to modify convoy vehicles 12 actions when first validation command 16A is not identical to first command 14.

In an exemplary embodiment, second convoy vehicles 12B transmit a third command 18 to a third convoy vehicles 12C and a second validation command 18A to first convoy vehicles 12A. If second validation command 18A and second command 16 are within predetermined parameters and/or mission parameters, then first convoy vehicles 12A can be configured to refrain from reissuing second command 16, according to an exemplary embodiment. If second validation command 18A and second command 16 are not within predetermined parameters and/or mission parameters, then first convoy vehicles 12A can be configured to reissue second command 16, according to an exemplary embodiment. In another exemplary embodiment, first convoy vehicle 12B can reissue second command 16 or another command signal to modify convoy vehicles 12 actions when second validation command 18A is not identical to second command 16. In another exemplary embodiment, second validation command 18A can be transmitted to leader vehicle 100. In this exemplary embodiment, leader vehicle 100 can be configured to reissue first command 14 to first convoy vehicle 12A, reissue first command 14 to second convoy vehicle 12B, issue a modified command to first convoy vehicle 12A and/or issue a modified command to second convoy vehicle 12B. It should be noted that in this exemplary embodiment, leader vehicle 100 was positioned in the middle of convoy 10, which required one less command (e.g., fourth command 20) being communication in comparison to the exemplary embodiment shown in FIG. 1. In an exemplary embodiment, leader vehicle 100 can be configured to determine the position in convoy 10 which requires the least amount of commands to be transmitted to convoy vehicles 12 and position leader vehicle 100 accordingly. In an exemplary embodiment, leader vehicle 100 can be configured to determine the position in convoy 10 which requires the highest amount of validation commands to be issued and position leader vehicle 100 accordingly. In this exemplary embodiment, the communication system would have the most amount of redundancy to ensure the proper commands were being received.

Figure 3:
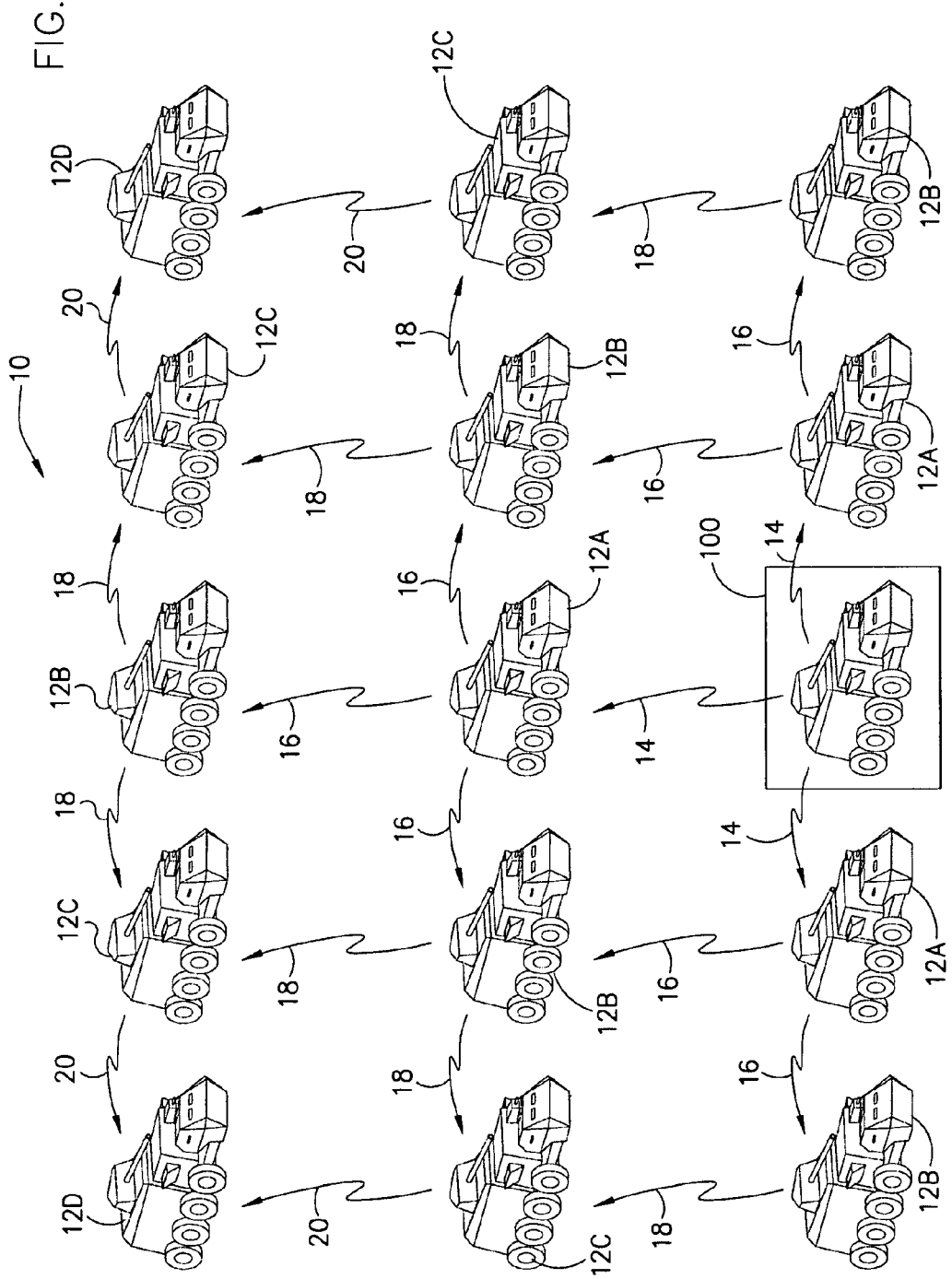
FIG. 3 is another illustration of a lead vehicle in communication with follower vehicles in a leader-follower convoy, according to an exemplary embodiment.

In FIG. 3, another illustration of a lead vehicle in communication with follower vehicles in a leader-follower convoy is shown, according to an exemplary embodiment. In an exemplary embodiment, leader vehicle 100 transmits first command 14 to first convoy vehicles 12A. In this exemplary embodiment, first convoy vehicles 12A are directly adjacent to leader vehicle 100. In an exemplary embodiment, first convoy vehicles 12A transmit second command 16 to second convoy vehicles 12B. In an exemplary embodiment, second convoy vehicles 12B transmit third command 18 to third convoy vehicles 12C. In an exemplary embodiment, third convoy vehicles 12C transmit fourth command 20 to fourth convoy vehicles 12D. In exemplary embodiments, the communication system can be closed looped (see FIGS. 1 and 2) or the communication system can be opened looped (see FIG. 3).

Figure 4:
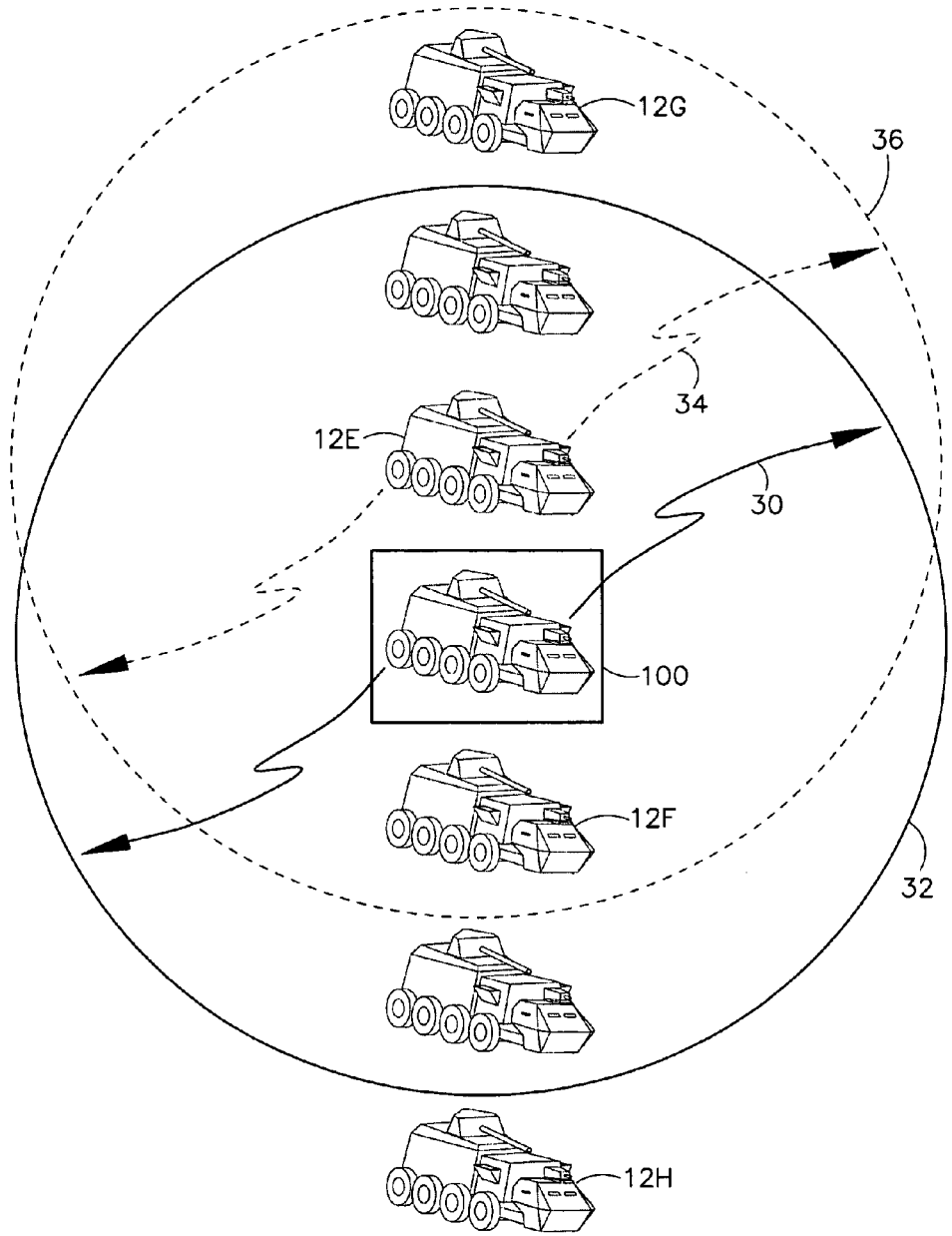
FIG. 4 is an illustration of a lead vehicle in communication with follower vehicles based on the difference distance between the lead vehicle and the follower vehicles, according to an exemplary embodiment.

In FIG. 4, an illustration of leader vehicle 100 in communication with follower vehicles based on the difference distance between leader vehicle 100 and the follower vehicles, according to an exemplary embodiment. Leader vehicle 100 transmits a first command signal 30. First command signal 30 has a first transmission range 32, according to an exemplary embodiment. In an exemplary embodiment, any follower vehicles within first transmission range 32 receive first command signal 30. In an exemplary embodiment, a retransmission vehicle 12e may be within first transmission range 32. Retransmission vehicle 12e retransmits first command signal 30 as a second command signal 34, according to an exemplary embodiment. In an exemplary embodiment, second command signal 34 has a second transmission range 36. Second transmission range 36 reaches a first follower vehicle outside of first transmission range 12g, according to an exemplary embodiment. In an exemplary embodiment, a potential retransmission vehicle 12f may transmit a third command signal (not shown) to reach a second follower vehicle outside of first transmission range 12h. It should be noted that first follower vehicle outside of first transmission range 12g, second follower vehicle outside of first transmission range 12h or any other follower vehicle may be configured to retransmit first command signal 30.

Figure 5A:
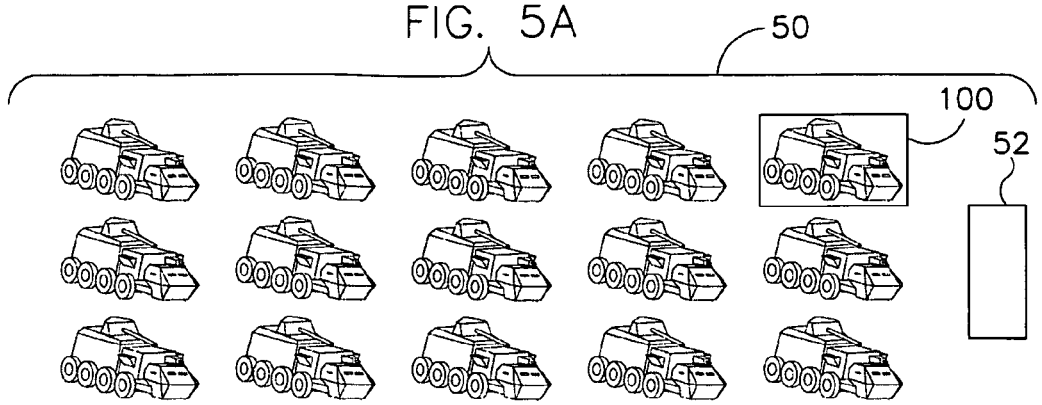
FIGS. 5A-5C are illustrations of the lead vehicle changing positions based on the detection of a hazard, according to exemplary embodiments.
Figure 5B:
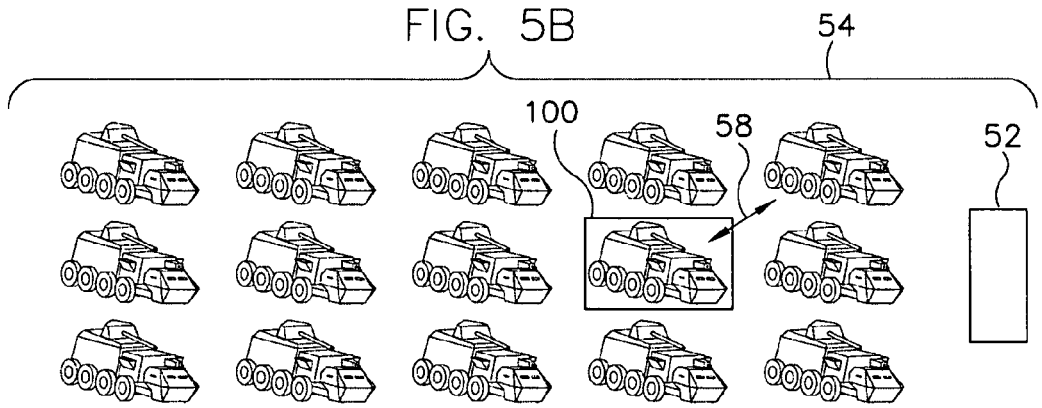
Figure 5C:
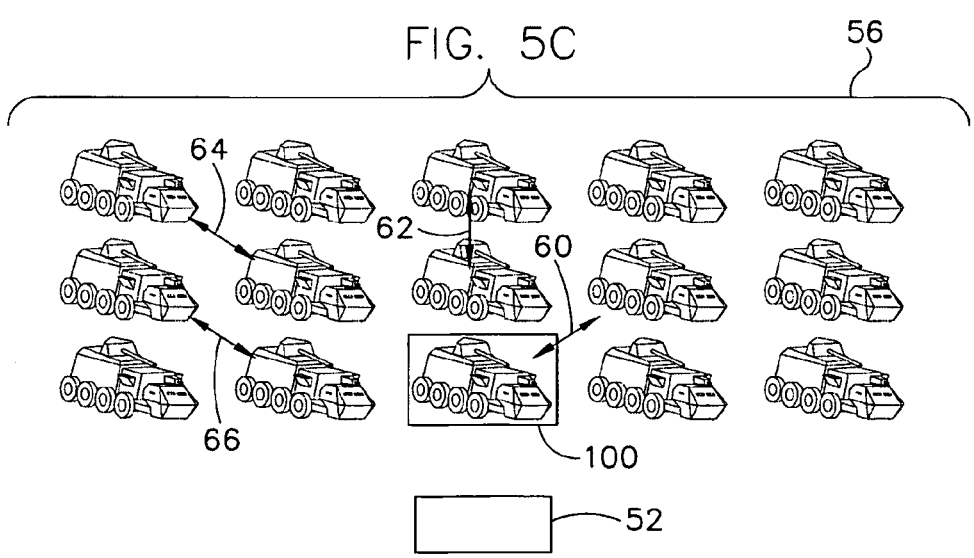

In FIGS. 5A-5C, illustrations are shown of the lead vehicle changing positions based on the detection of a hazard, according to exemplary embodiments. In FIG. 5A, a first view of convoy 50 shows that leader vehicle 100 is positioned in the first row of the convoy as convoy approaches a threat 52. In exemplary embodiments, threat 52 can be obstacles (e.g., hills, mountain, landmines, water, enemy forces, trees or other hazardous terrains). In FIG. 5B, a second view of convoy 54 shows that leader vehicle 100 has moved into the second row of the convoy utilizing a first path 58 as convoy approaches threat 52. It should be noted that the movement can be physical or virtual. In the virtual mode, the leader function is electronically switched to another vehicle. It should also be noted that leader vehicle 100 can be moved to any position in the convoy either physically or virtually.

In FIG. 5C, a third view of convoy 56 shows that leader vehicle 100 is positioned in the front row of convoy as convoy approaches threat 52. In this exemplary embodiment, leader vehicle 100 has utilized a second path 60 to move to the second row. In this exemplary embodiment, follower vehicles have utilized a third path 62, a fourth path 64 and a fifth path 66 to change locations. In this exemplary embodiment, follower vehicles have changed location to increase the complexity for the enemy to determine leader vehicle 100.

Figure 6A:
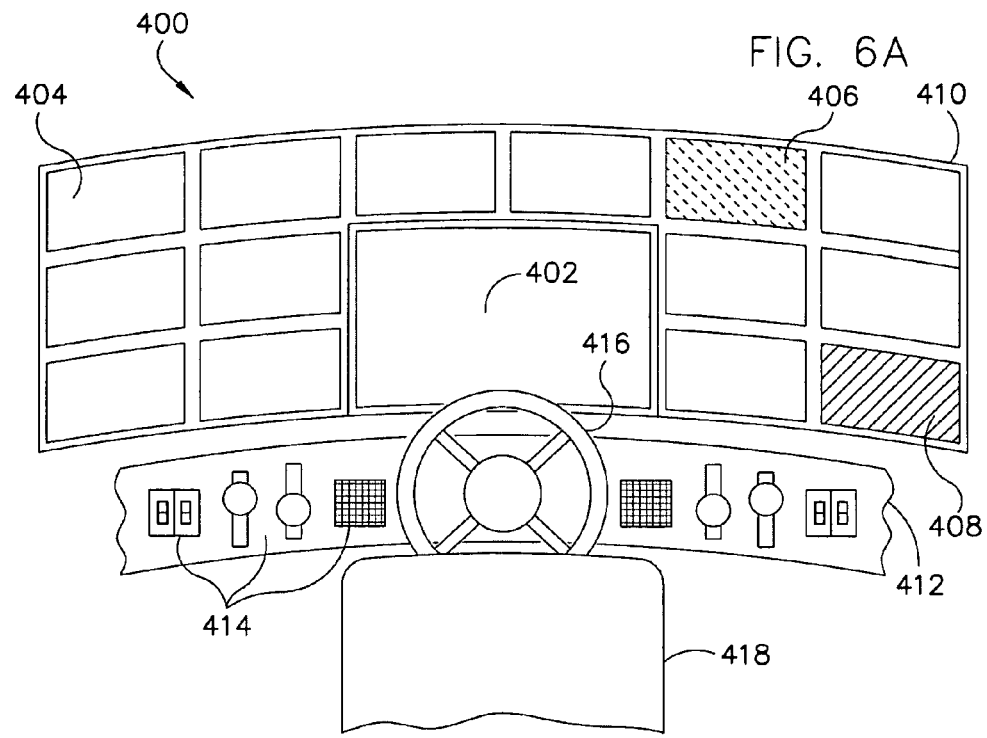
FIG. 6A is an illustration of a vehicle control center utilizing a master screen and a plurality of secondary screens, according to an exemplary embodiment.

In FIG. 6A, an illustration of a vehicle control center 400 utilizing a master screen 402 and a plurality of secondary screens 404 is shown, according to an exemplary embodiment. In an exemplary embodiment, vehicle control center 400 includes a driver seat 418, a steering wheel 416, a control panel 412 and a video screen 410. In an exemplary embodiment, control panel 412 includes a plurality of control devices 414. Control devices can be switches, levers, pushbuttons, and/or knobs. In an exemplary embodiment, video screen 410 includes a combination of plurality of secondary screens 404 and master screen 402. Secondary screens 404 and/or master screen 402 may be a touch-screen display, while in other exemplary embodiments, may be any other non-touch sensitive display. In still other exemplary embodiments, secondary screens 404 and/or master screen 402 may be of any technology (e.g. LCD, DLP, plasma, CRT), configuration (e.g. portrait or landscape), or shape (e.g. polygonal, curved, curvilinear).

In an exemplary embodiment, vehicle control center 400 can allow the operator to utilize master screen 402 to monitor the convoy. The operator can control any of the follower vehicles from vehicle control center 400 by issuing commands and/or taking over control of the follower vehicle. In an exemplary embodiment, the operator takes over control of the follower vehicle utilizing steering wheel 416 and control panel 412. In this exemplary embodiment, steering wheel 416 may be configured to engage control of the follower vehicle and disengage control of leader vehicle 100. For example, steering wheel 416 may be configured to normally control the direction of leader vehicle 100; however, under operator command steering wheel 416 may no longer control the direction of leader vehicle but instead control follower vehicle.

In another exemplary embodiment, plurality of secondary screens 404 may be configured to monitor one or more of the follower vehicles. In an exemplary embodiment, plurality of secondary screens 404 may include a caution screen 406 and a warning screen 408. In this exemplary embodiment, caution screen 406 occurs when one of plurality of secondary screens 404 determines that a potential threat is within a predetermined range (e.g., 1-50 miles away) of one or more follower vehicles. The potential threat may be terrain obstacles, enemy vehicles, enemy personnel, vehicle performance factors outside of tolerance (e.g., engine speed, oil pressure, tire pressure, engine temperature, transmission speed, water level, and/or torque) and/or any other source of potential harm to follower vehicle. In this exemplary embodiment, caution screen 406 can be transferred to master screen 402 automatically or by operator command. Operator command can be audio or tactile.

In another exemplary embodiment, plurality of secondary screens 404 may include warning screen 408. In this exemplary embodiment, warning screen 408 occurs when one of plurality of secondary screens 404 determines that a potential threat is within predetermined range (e.g., under 1 mile) of one or more follower vehicles. The potential threat may be terrain obstacles, enemy vehicles, enemy personnel, vehicle performance factors outside of tolerance (e.g., engine speed, oil pressure, tire pressure, engine temperature, transmission speed, water level, and/or torque) and/or any other source of potential harm to follower vehicle. In this exemplary embodiment, caution screen 406 can be transferred to master screen 402 automatically or by operator command. Operator command can be audio or tactile.

Figure 6B:
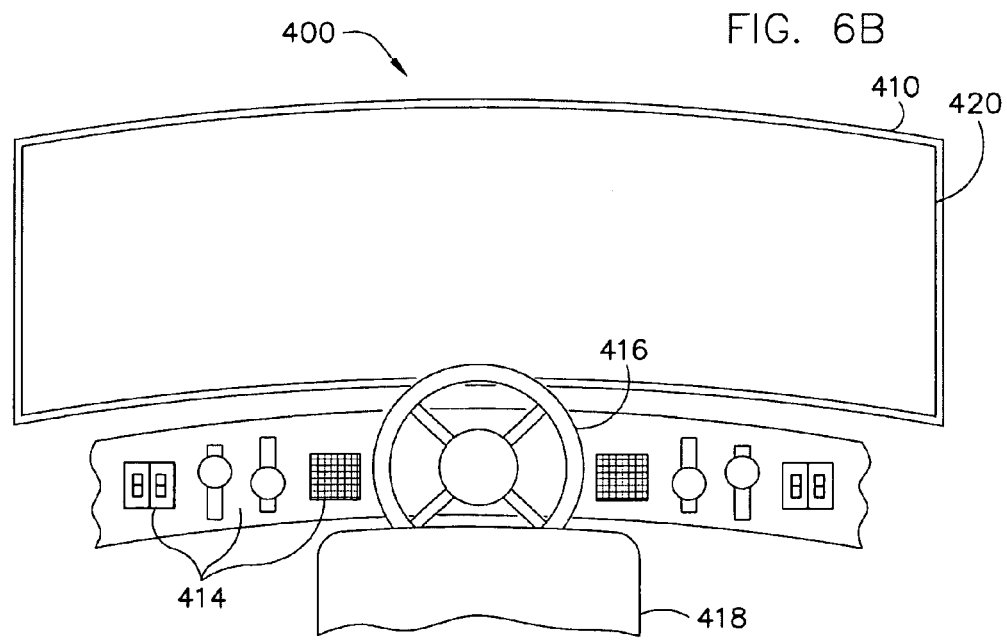
FIG. 6B is an illustration of a vehicle control center utilizing one master screen, according to an exemplary embodiment.

In FIG. 6B, an illustration of vehicle control center 400 utilizing a single master screen 420 is shown, according to an exemplary embodiment. In this exemplary embodiment, any portion of the convoy can be shown on single master screen 420 in significant detail.

In FIG. 6C, an illustration of vehicle control center master 400 utilizing a second master screen 424 where all of the vehicles are displayed on second master screen 424 is shown, according to an exemplary embodiment. In this exemplary embodiment, all of follower vehicles 12 and leader vehicle 100 can be shown on one screen in significant detail.

In FIG. 6D, an illustration of vehicle control center master screen 426 where the display image is a composite image 430 based on data received from multiple vehicles in the convoy is shown, according to an exemplary embodiment. In an exemplary embodiment, each vehicle (e.g., leader vehicle 100 and follower vehicle 12) in the convoy can be configured to include sensors that enable the collect of data related to the environment surrounding the convoy (see FIGS. 7A-7C). In an exemplary embodiment, each vehicles transmits environmental data gather from the vehicle's sensor to vehicle control center 400. Vehicle control center 400 includes a processing engine, terrain database engine, graphics engine and display drive that allows vehicle control center 400 to create composite image 430 of the environment in and around the convoy.

In an exemplary embodiment, composite image 430 includes a first section of the convoy 401a, a second section of the convoy 401b, an obstacle 436, a water obstacle 432, a first level of terrain 434, a steep terrain decline 438, a second level of terrain 440 and a third level of terrain 442.

In FIG. 6E, an illustration of vehicle control center master screen 426 where the operator can select a subset of the convoy 444 and initiate a mission for this selected subset of the convoy 444 is shown, according to an exemplary embodiment. In an exemplary embodiment, subset of the convoy 444 may be commanded by leader vehicle 100 to draw enemy fire away from the main convoy. This could be accomplished by maneuvering subset of the convoy 444 toward an enemy location, towards an enemy target area or away from the enemy. Subset of the convoy 444 could be maneuvered away from the enemy in a manner that would make subset of the convoy 444 appear to be a critical element of the convoy. In an exemplary embodiment, subset of the convoy 444 could appear to include leader vehicle 100. In this exemplary embodiment, one of the vehicles in subset of the convoy 444 could be maneuvered in a manner that indicates that this vehicle is being protected by the other vehicles in subset of the convoy 444. The enemy would see this protection scheme and may conclude that leader vehicle 100 is within subset of the convoy 444. This may cause the enemy to focus the enemy's attack on subset of the convoy 444 while the real leader vehicle 100 escapes. In exemplary embodiments, the maneuvering of subset of the convoy 444 could be performed by a predetermined program that is implemented automatically, implemented manually by leader vehicle 100 or a combination of both. In an exemplary embodiment, the predetermined value could be damage to leader vehicle 100, the amount of damage to convoy 10, exceeding a threshold convoy damage percentage, communication interruption, duration of attack, duration of mission, fuel supply, weapon supply or any other criteria known to a person of ordinary skill in the art.

In another exemplary embodiment, subset of the convoy 444 can be commanded by leader vehicle 100 to diverge from the main mission to location and/or transport personnel, machinery, and/or supplies (e.g., weapons, fuel, food, medication, clothing, and surveillance equipment). Subset of the convoy 444 may be one vehicle that is directed to maneuver into a field that potentially contains a threat (e.g., minefield). In this exemplary embodiment, subset of the convoy 444 maneuvers into the field while transmitting the exact path that subset of the convoy 444 has traveled. If subset of the convoy 444 successfully traverses the field, the main convoy utilizes the coordinates transmitted by subset of the convoy 444 to traverse the field. If subset of the convoy 444 is initially unsuccessful, then the process can be repeated until a path that traverses the field is determined or leader vehicle 100 can command the convoy to take a different path to the objective.

In FIG. 6F, an illustration of a composite vehicle control center master screen 446 where the display image includes a composite image 452 based on data received from multiple convoy vehicles and an image generated by a terrain database is shown, according to an exemplary embodiment. In an exemplary embodiment, composite image 452 includes a convoy data image 448 and a database image 450. Convoy data image 448 is based on data received from one of the convoy vehicles, a few convoy vehicles, a plurality of convoy vehicles or all of the convoy vehicles (see FIGS. 7A-7C), according to exemplary embodiments. Database image 450 is based on data received from at least one terrain database.

Convoy data image 448 includes a first water hazard 454, a first field 458, a first obstacle 466, and a first steep terrain decline 462, according to an exemplary embodiment. Database image 450 includes a second water hazard 450, a second field 460, a second obstacle 468, and a second steep terrain decline 464, according to an exemplary embodiment. In this exemplary embodiment, first water hazard 454 and second water hazard 450, first field 458 and second field 460, first obstacle 466 and second obstacle 468, and first steep terrain decline 462 and second steep terrain decline 462 are all configured to depict the same terrain and/or obstacle source. In other words, first water hazard 454 should be identical or substantially similar to second water hazard 450. In an exemplary embodiment, an obstacle source and/or terrain image from convoy data image 448 may be different than the same obstacle source and/or terrain image from database image 450. In this exemplary embodiment, when the image on convoy data image 448 differs from the image on database image 450 by a predetermined threshold value (e.g., percentage, feet, inches, and/or miles) an alert will be issued. In another exemplary embodiment, a discrepancy report will be generated which may be sent to leader vehicle 100, a central command station or a central database.

In an exemplary embodiment, first obstacle 466 and second obstacle 468 differ by a value that is greater than the predetermined threshold value (e.g., 5 percent). In this exemplary embodiment, first obstacle 466 has a first section of first obstacle 470 that is significantly (e.g., greater than the predetermined threshold value) different than a first section of second obstacle 472. In exemplary embodiments, differences in the images on convoy data image 448 and database image 450 can be resolved by automatically or manually selecting a primary image which may be either convoy data image 448 or database image 450. In another exemplary embodiment, convoy data image 448 can be automatically or manually selected based on the distance of the obstacle source and/or terrain from vehicles in the convoy. When the distance is less than a predetermined amount (e.g., 10 feet, 100 feet, 1,000 feet, or 5,000 feet) convoy data image 448 can be selected because the actual sensor data is determined to be more reliable than the database data, according to an exemplary embodiment. When the distance is greater than a predetermined amount (e.g., 5,000 feet) database image 450 can be selected because the database data is determined to be more reliable than the sensor data, according to an exemplary embodiment.

Figure 7A:
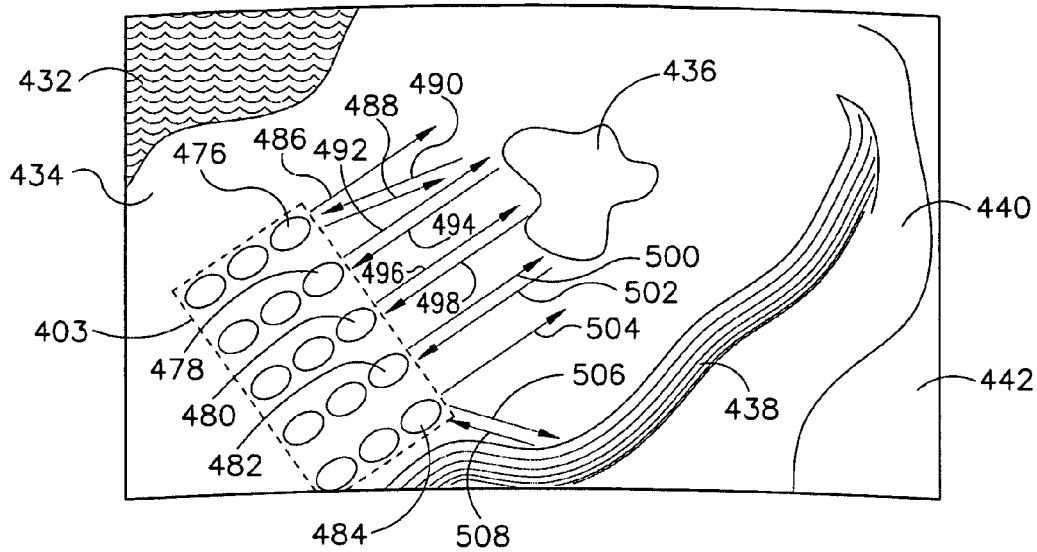
Figure 7B:
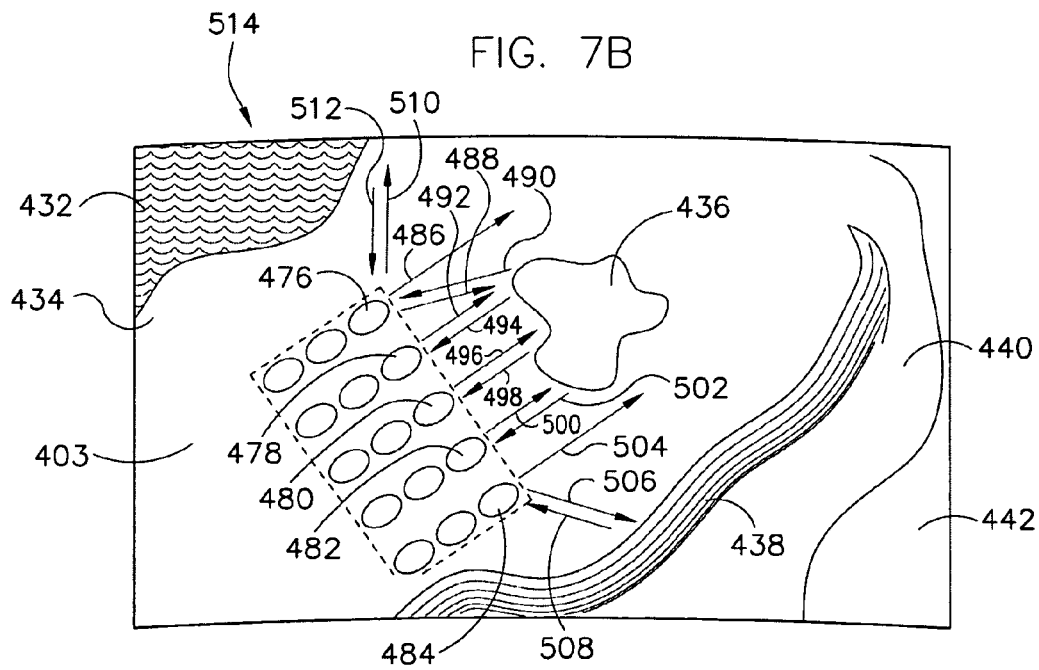

In FIGS. 7A-7C, an illustration of the convoy utilizing an object detection system to avoid an obstacle is shown, according to an exemplary embodiment. In FIG. 7A, an image of convoy at a first position 474 is shown, according to an exemplary embodiment. Image of convoy at a first position 474 includes a convoy 403, obstacle 436, water obstacle 432, first level of terrain 434, steep terrain decline 438, second level of terrain 440 and third level of terrain 442. Convoy 403 includes follower vehicles 12 and leader vehicles 100 (see FIG. 1) in a column-row configuration, according to an exemplary embodiment. The column-row configuration includes three rows and five columns. A vehicle in column three row three can be designated vehicle$_{33}$. Convoy 403 includes a vehicle, 476, a vehicle$_{21}$ 478, a vehicle$_{31}$ 480, a vehicle$_{41}$ 482, and a vehicle$_{51}$ 484. In this exemplary embodiment, convoy 403 is at a first distance from obstacle 436.

In an exemplary embodiment, one vehicle, a few vehicles, a plurality of vehicles or all of the vehicles in convoy 403 transmit electromagnetic radiation (e.g., LIDAR, radar) in a predetermined pattern. It should be noted that the predetermined pattern can be the same for all the vehicle, the predetermined pattern can be different for a subset of the vehicle (e.g., the vehicle in front of the convoy could have different patterns than vehicles in the middle of the convoy). The predetermined pattern could be different from every vehicle. It should also be noted that the transmit of electromagnetic radiation could be in pattern that is not predetermined but selected by operator on an ad hoc basis. The operator can change or override any predetermined pattern.

For simplicity and clarity only a few electromagnetic radiation signals will be shown in the following exemplary embodiments. It should be noted that more or less electromagnetic radiation signals could be shown and/or utilized with this disclosure.

In an exemplary embodiment, vehicle$_{11}$ 476 transmits a first signal 486 and a second signal 488. First signal 486 does not generate a return signal because first signal 486 does not contact an obstacle and/or terrain, according to an exemplary embodiment. The system processes this information and determines that the path covered by first signal 486 is clear of any obstacles and/or the terrain has not significantly changed. Second signal 488 generates a first return signal 490 because second signal 488 contacts obstacle 436. The system processes this information to determine at least one data point for obstacle 436.

Vehicle$_{21}$ 478 transmits a third signal 492, which generates a second return signal 494 because third signal 492 contacts obstacle 436, according to an exemplary embodiment. The system processes this information to determine at least one data point for obstacle 436. Similarly, vehicle$_{31}$ 480 transmits a fourth signal 496, which generates a third return signal 498 because fourth signal 496 contacts obstacle 436. The system processes this information to determine at least one data point for obstacle 436. Vehicle$_{41}$ 482 transmits a fifth signal 500, which returns as a fourth return signal 502. The system processes this information to determine at least one data point for obstacle 436. Vehicle$_{51}$ 484 transmits a sixth signal 504 and a seventh signal 508, according to an exemplary embodiment. Sixth signal 504 does not generate a return signal because six signal 504 does not contact an obstacle and/or terrain, according to an exemplary embodiment. The system processes this information and determines that the path covered by six signal 504 is clear of any obstacles and/or the terrain has not significantly changed. The system processes all the obstacle data points generated by the return signals to create a composite image of obstacle 436, according to an exemplary embodiment. In an exemplary embodiment, seventh signal 508 generates a fifth return signal 506 because seventh signal 508 contacted a change in the terrain. The system processes the data positions generated by seventh signal 508, along with other data positions generated in a similar manner as described above to determine a composite image of steep terrain decline 438.

In FIG. 7B, an image of convoy at a second position 514 is shown, according to an exemplary embodiment. In an exemplary embodiment, convoy at second position is closer to obstacle 436 than convoy at first position. In an exemplary embodiment, vehicle$_{11}$ 476 transmits an eighth signal 510, which generates a sixth return signal 512 because eighth signal 510 contacted water obstacle 432. The system processes the data positions generated by eighth signal 510, along with other data positions generated in a similar manner as described above to determine a composite image of water obstacle 432.

In FIG. 7C, an image of convoy at a third position 516 is shown, according to an exemplary embodiment. Convoy 403 (see FIGS. 7A and 7B) has split up into a left subsection 518 and a right subsection 520. Convoy 403 has split up into left subsection 518 and right subsection 520 based on the composite image of obstacle 436 generated by the data position information collected in FIGS. 7A and 7B. In an exemplary embodiment, the composite image of the obstacle 436 generated by the data position information collected by convoy 403 can be overlaid with terrain data provided by at least one terrain database. In other exemplary embodiments, the overlaid image can be display as a perspective view, a wireframe view and/or as a synthetic image in a synthetic vision system. It should be noted that any process for displaying an image known to a person skilled in the art can also be used with this disclosure.

Figure 8D:
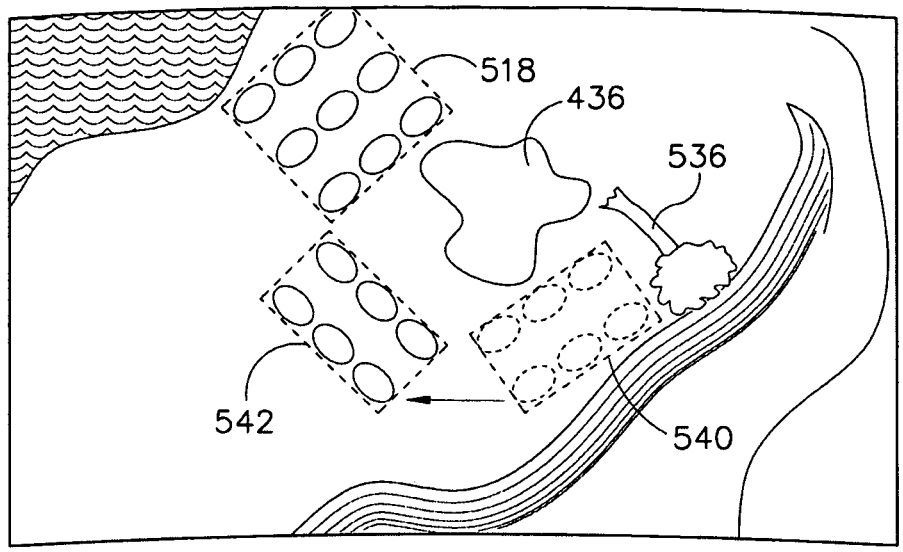

In FIGS. 8A-8D, an illustration of a subset of the convoy reaching an obstacle and initiating maneuvers to circumvent the obstacle is shown, according to an exemplary embodiment. In FIG. 8A, an image of convoy at fourth position 522 is shown, according to an exemplary embodiment. Image of convoy at a fourth position 522 includes convoy 403, obstacle 436, water obstacle 432, first level of terrain 434, steep terrain decline 438, second level of terrain 440 and third level of terrain 442.

In an exemplary embodiment, vehicle$_{11}$ 476 transmits first signal 486 and second signal 488. The system processes this information and determines that the path covered by first signal 486 is clear of any obstacles and/or the terrain has not significantly changed. Second signal 488 generates first return signal 490, which is utilized by the system to determine at least one data point for obstacle 436. Vehicle$_{21}$ 478 transmits third signal 492, which generates second return signal 494 that the system utilizes to determine at least one data point for obstacle 436. Similarly, vehicle$_{31}$ 480 transmits fourth signal 496, vehicle$_{41}$ 482 transmits fifth signal 500, and vehicle$_{51}$ 484 transmits sixth signal 504 and seventh signal 508, which are utilized by the system similar to the process discussed for FIG. 7A.

In FIG. 8B, an image of convoy at a fifth position 524 is shown, according to an exemplary embodiment. In an exemplary embodiment, convoy at fifth position is closer to obstacle 436 than convoy at fourth position. In an exemplary embodiment, vehicle$_{11}$ transmission and how the system processes this information is discussed in FIG. 7B.

In FIG. 8C, convoy 403 has divided into left subsection 518 and right subsection 520 because of obstacle 436, according to an exemplary embodiment. In an exemplary embodiment, left subsection 518 and right subsection 520 continue to transmit signal to locate obstacles and/or changes in the terrain. In this exemplary embodiment, right subsection 520 transmits a ninth signal 528 and a tenth signal 530, which generate a seventh return signal 530 and an eighth return signal 532. Seventh return signal 530 and eighth return signal 532 are processed, along with other data positions, to determine that an obscured obstacle 536 is blocking right subsection's 520 path, according to an exemplary embodiment. In exemplary embodiments, obscured obstacle 536 can be an obstacles outside of the vehicle sensor range when convoy 403 was at first position, second position and/or third position. In other exemplary embodiments, obscured obstacle 536 may be a new obstacle, such as a tree falling, a mud slide, a rock slide, landmines, enemy vehicles and/or enemy personnel.

In FIG. 8D, right subsection 520 maneuvers from an impeded position 540 to an unimpeded position 542, according to an exemplary embodiment. Right subsection 520 and left subsection 518 determine a right subsection course, a left subsection course, and a relative speed of right subsection 520 to left subsection 518 to minimize the time required for right subsection 520 to rejoin left subsection 518, according to an exemplary embodiment.

Figure 9A:
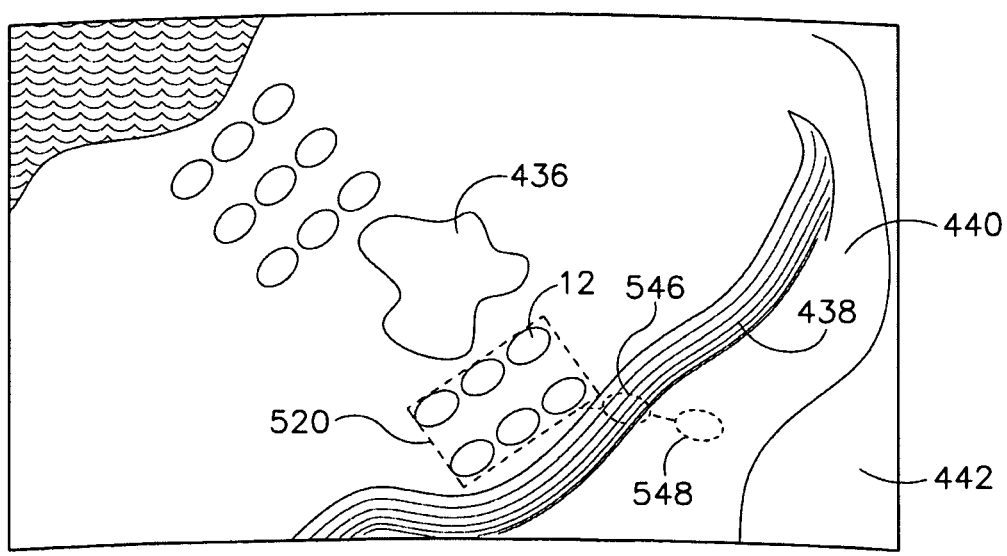
FIGS. 9A-9B are illustrations of a convoy vehicle becoming separated from the main convoy and traversing the landscape to rejoin the convoy, according to an exemplary embodiment.
Figure 9B:
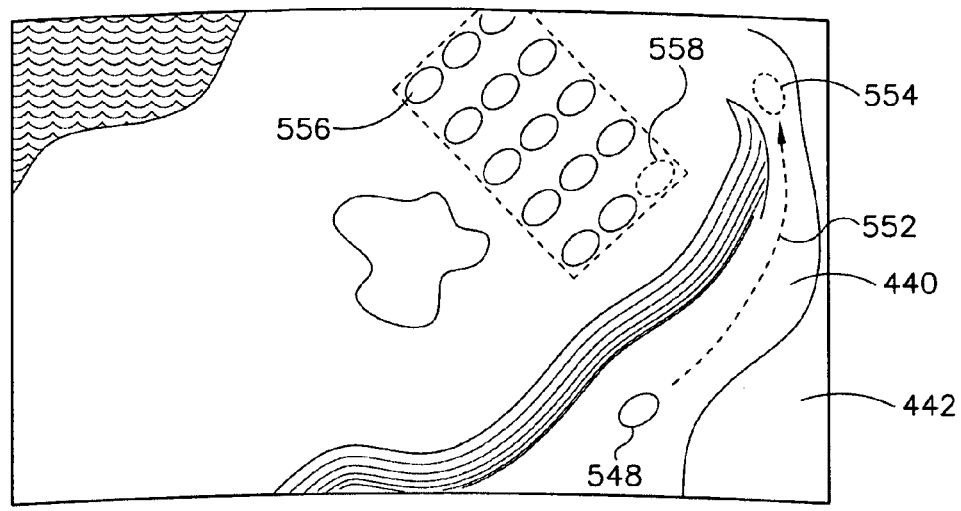

In FIGS. 9A-9B, an illustration of a convoy vehicle becoming separated from the main convoy and traversing the landscape to rejoin the convoy is shown, according to an exemplary embodiment. In an exemplary embodiment, right subsection 520 has maneuvered too close to steep terrain decline 438. Follower vehicle 12 has slide down to a position on steep terrain decline 546, according to an exemplary embodiment. In this exemplary embodiment, follower vehicle 12 is incapable of ascending steep terrain decline 438. Leader vehicle 100 (see FIG. 1) commands follower vehicle to a position on second level terrain 548.

In FIG. 9B, leader vehicle 100 commands follower vehicle 12 to maneuver from position on second level terrain 548 to a position on first level terrain 554 along a path 552, according to an exemplary embodiment. Follower vehicle 12 maneuvers from position on first level terrain 554 to a position inside of convoy 558 as convoy 556 approaches position on first level terrain 554, according to an exemplary embodiment. In another exemplary embodiment, follower vehicle 12 can be programmed to automatically determine a path back to convoy 556 utilizing a terrain database, a global positioning system, a location signal from convoy 556 and/or follower vehicle 12 sensors.

Figure 10A:
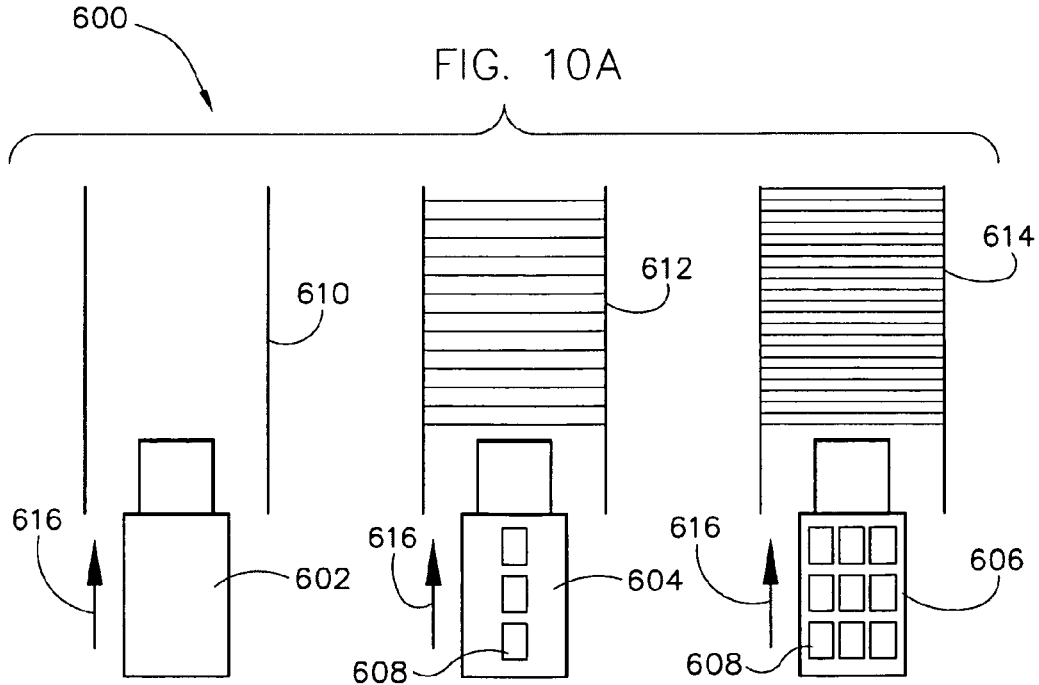
Figure 10B:
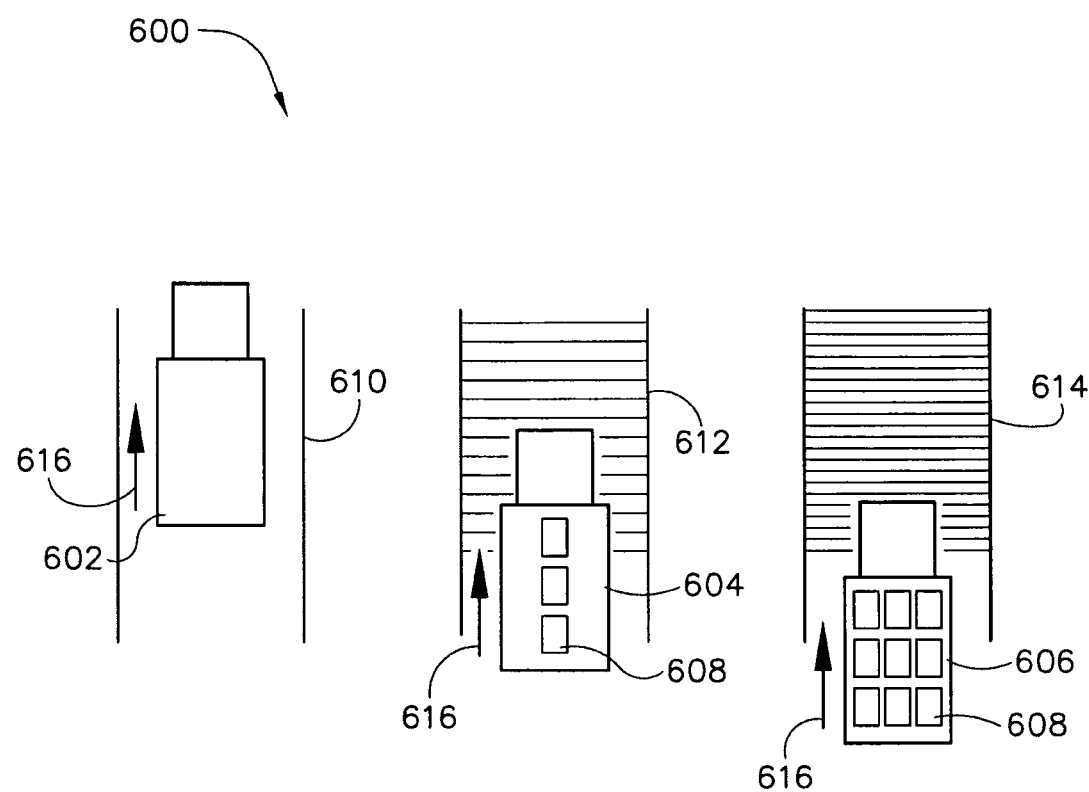

In FIGS. 10A-10C, an illustration of convoy vehicles with different load factors and traveling on different inclines while maintaining convoy formation is shown, according to an exemplary embodiment. In FIG. 10A, a first vehicle 602, a second vehicle 604 and a third vehicle 606 are part of a convoy. First vehicle 602, second vehicle 604 and third vehicle 606 are all producing a first engine output 616, according to an exemplary embodiment. In this exemplary embodiment, first vehicle 602 is not carrying any equipment, supplies, or personnel. First vehicle 602 is traveling on a flat surface 610, according to an exemplary embodiment. Second vehicle 604 is lightly loaded with a cargo 608, according to an exemplary embodiment. In this exemplary embodiment, cargo 608 can be equipment, supplies and/or personnel. Second vehicle 604 is traveling on a moderate incline surface 612, according to an exemplary embodiment. Third vehicle 606 is heavily loaded with cargo 608 and is traveling on a steep incline surface 614, according to this exemplary embodiment.

In FIG. 10B, the distances between first vehicle 602, second vehicle 604, and/or third vehicle 606 has increased because first vehicle 602, second vehicle 604, and/or third vehicle has maintained first engine output 616. In this exemplary embodiment, first vehicle 602 can travel at a higher rate of speed than either second vehicle 604 and/or third vehicle 606 with first engine output 616 because first vehicle 602 is not loaded with cargo 608 and is traveling on flat surface 610. Similarly, second vehicle 604 can travel at a higher rate of speed than third vehicle 606 with first engine output 616 because second vehicle 604 is less loaded with cargo 608 than third vehicle 616 and is traveling on a surface with less of an incline. In this exemplary embodiment, first vehicle 602, second vehicle 604, and/or third vehicle 606 may separate from the convoy by maintaining first engine output 616, which may place the separated vehicle at increased risk of attack, damage, and/or becoming lost.

In FIG. 10C, first vehicle 602, second vehicle 604 and third vehicle 606 have separated by a distance that is greater than a threshold distance, according to an exemplary embodiment. In this exemplary embodiment, if the separation distance is greater than a predetermined threshold, then leader vehicle 100 operator and/or a computer program calculates a second engine output 618. First vehicle 602 is commanded to operate at second engine output 618, which is less than first engine output 616. In this exemplary embodiment, there can be numerous engine outputs with the objective of reducing the separation distance in an optimal time. In this exemplary embodiment, once second vehicle's 604 distance from first vehicle 602 has been reduced to a predetermined amount, then second vehicle 604 is commanded to operate at a third engine output 622. Third engine output 622 minimizes the relative distance comparison between the delta third vehicle 606 and second vehicle 604 distance as compared to the delta second vehicle 604 and first vehicle 602 distance.

Figure 10D:
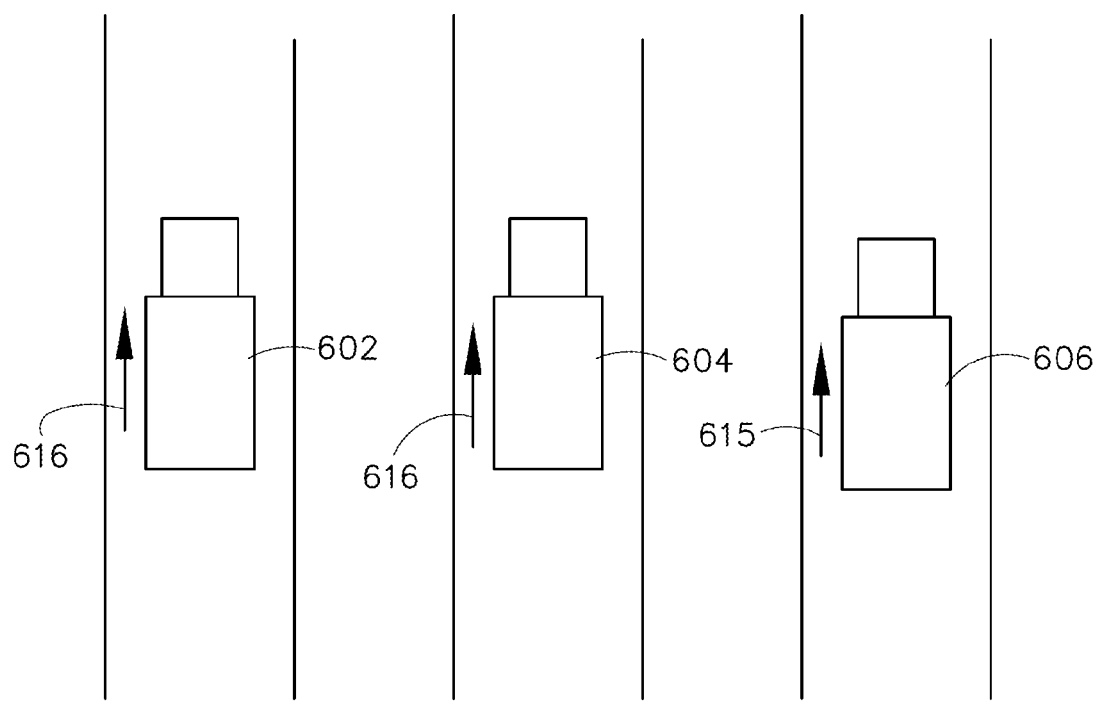
FIG. 10D is an illustration of a vehicle diagnostic comparison, according to an exemplary embodiment.

In FIG. 10D, a diagnostic vehicle comparison is shown, according to an exemplary embodiment. In this exemplary embodiment, first vehicle 602, second vehicle 604 and third vehicle 606 are traveling on flat surface 610. First vehicle 602 and second vehicle 604 have first engine output 616, while third vehicle 606 has a fourth engine output 615, according to an exemplary embodiment. Since first vehicle 602, second vehicle 604 and third vehicle 606 are traveling on the same terrain (e.g., flat surface 610), operational information regarding first vehicle 602, second vehicle 604 and third vehicle 606 should be similar and/or identical. In this exemplary embodiment, the on-board diagnostics system of each vehicle should be observing similar health and operational parameters. In this exemplary embodiment, if disparities are detected in the data generated at one of the vehicles relative to the data generated at the other vehicles, this may be a sign that a component of the vehicle is in poor health. Therefore, faults may be detected in components that would otherwise appear to be within normal operating parameters (e.g., maintenance schedule, life expectancy etc.). In should be noted that vehicle health and/or performance characteristics can be oil pressure, tire pressure, engine torque output, engine speed, fuel consumption, engine temperature, coolant level, transmission temperature, transmission speed, transmission fluid level, motor temperature, motor output, motor speed, and/or any other vehicle parameter known to a person skilled in the art.

In an exemplary embodiment, a discrepancy report can be generated based on any detected variations in vehicle performance characteristics. In another exemplary embodiment, a maintenance schedule can be generated based on the discrepancy report.

In FIG. 11, a flow diagram of the convoy operation procedures 700 is shown, according to an exemplary embodiment. The system is initiated (step 702). The system determines the number of vehicles to be controlled (step 704). The system prioritizes the importance of each vehicle (step 706). The system configures the convoy based on the importance of each vehicle (step 708). The system controls the vehicles (step 710). If the system receives a new or modified mission (step 712), then the system accepts the new or modified mission (step 714) and returns to step 704. If the system does not receive a new or modified mission (step 712), then the system monitors the vehicles' performance (step 716). Based on the system monitoring the vehicles' performance, the system detects vehicle performance outside of system parameters (step 718). The system will correct for errors and/or vehicle performance outside of system parameters (step 720).

Referring to FIG. 12, one embodiment of an autonomous vehicle 102 is shown. In an exemplary embodiment, vehicle 102 is a tactical wheeled vehicle that may be used in a military context to transport troops, supplies, or any other goods. In an exemplary embodiment, vehicle 102 can have eighteen inches of ground clearance and be capable of traversing rugged terrain. Vehicle 102 may have features such as all-wheel drive, all-wheel steering, independent suspension (all or some of the wheels), and a central tire inflation system. Many of these features make it easier for vehicle 102 to operate autonomously. For example, since vehicle 102 is relatively large, the addition of all-wheel steering allows vehicle 102 to maneuver quickly and with more agility to avoid obstacles, pass through tunnels, etc. Also, the central tire inflation system may be used to help vehicle 102 get unstuck by reducing the air pressure in the tires and thereby increasing the traction of vehicle 102.

In an exemplary embodiment, vehicle 102 may also be configured to handle about 60% grades and about 30% side slopes while the vehicle 102 is fully loaded. In an exemplary embodiment, vehicle 102 may be capable of carrying about a seven ton payload off-road and about a fifteen ton payload on-road. In another exemplary embodiment, vehicle 102 may also be capable of fording five feet of water, traveling up to and above about 65 miles per hour, and cruising for a range of about 300 miles or more.

In an exemplary embodiment, vehicle 102 may be provided in a dump truck configuration where the bed pivots upward to unload material in the bed of the truck. In another exemplary embodiment, vehicle 102 may also be configured as a wrecker vehicle that is capable of towing disabled vehicles such as tanks or other trucks to be repaired. In another exemplary embodiment, vehicle 102 may also include a flat bed and an articulated lifting system. The lifting system may be configured to move supplies or other goods onto the flat bed. The lifting system folds up near the end of the bed in a stowed position while vehicle 102 is traveling. In an exemplary embodiment, vehicle 102 may include a load handling system that is capable of receiving and securely transporting standard or custom sized shipping containers. In one embodiment, vehicle 102 may be the medium tactical vehicle replacement (MTVR) manufactured by Oshkosh Truck Corporation, Oshkosh, Wis. In this exemplary embodiment, vehicle 102 may include any of the various commercial embodiments of the MTVR such as the cargo truck embodiment (regular and extended), dump truck embodiment, wrecker embodiment, HIMARS resupply vehicle embodiment, tractor embodiment, and/or load handling system embodiment. It should be noted that vehicle 102 can be any vehicle that can utilize the autonomous and/or semi-autonomous features described in this disclosure. It should also be noted that vehicle 102 can be any vehicle that can be deployed in a convoy and/or utilize a leader-follower communication system.

In a military context there are some challenges to and advantageous of using an autonomous vehicle. For example, one of the challenges is that many of the technologies used to sense the terrain around the vehicle rely on the transmission of electromagnetic radiation (e.g., LIDAR, radar). The radiation can be detected by the enemy and used as a signal to guide bombs or other munitions to the autonomous vehicle. Also, the enemy may be able to jam the signals and cause the vehicle to crash or otherwise be disabled. The principle advantage of an autonomous vehicle in a military context is that fewer people need to be put in danger in order to transport supplies and goods.

Although vehicle 102 is described in the context of a military vehicle, it should be appreciated that the subject matter described herein may be used with any of a number of suitable vehicles regardless of whether they are civilian or military vehicles, heavy duty or light duty vehicles, or large or small vehicles. For example, the subject matter described herein may be used with the firefighting vehicles described in some of the documents that are incorporated by reference above.

In an exemplary embodiment, vehicle 102 may be configured to be easily switched from manual operation to autonomous operation. The switchover may be as simple as pressing a button or may involve some amount of mechanical or electrical reconfiguration. In exemplary embodiments, the switchover can occur and/or be initiated remotely. In another exemplary embodiment, the switchover can occur and/or be initiated within vehicle 102 that is part of the convoy. In an exemplary embodiment, allowing vehicle 102 to be used in both manual and autonomous mode increases the usability of vehicle 102. For example, in a military context, if vehicle 102 is inoperable in autonomous mode due to enemy fire, vehicle 102 may still be capable of being operated manually. Also, vehicle 102 may be capable of being operated by an operator until vehicle 102 enters a dangerous area (e.g., vehicle approaches the enemy, vehicle 102 enters a hazardous waste area) at which point vehicle 102 may be operated autonomously.

In an exemplary embodiment, vehicle includes a differential GPS unit 154, a single-plane LIDAR sensors 162, a multi-plane LIDAR sensors 166, a first camera 168, a second camera 170, a third camera 172, a roll bar or roll cage 180, a bumper 182, a sun shade 186, and a reflector 188.

FIG. 13 is a block diagram schematically illustrating a vehicle control system 100 for use with vehicle 102, according to an exemplary embodiment. In an exemplary embodiment, vehicle control system 100 may include a terrain detection system 104, a vehicle management system 106, and a system manager 108. In an exemplary embodiment, vehicle control system 100 may also includes a plurality of vehicle subsystems 110, a position sensors 150, and a terrain sensors 160. In an exemplary embodiment, vehicle control system 100 can be configured to acquire and process vehicle position information and terrain information from position sensors 150 and terrain sensors 160 to control vehicle 102 autonomously.

Figure 20:
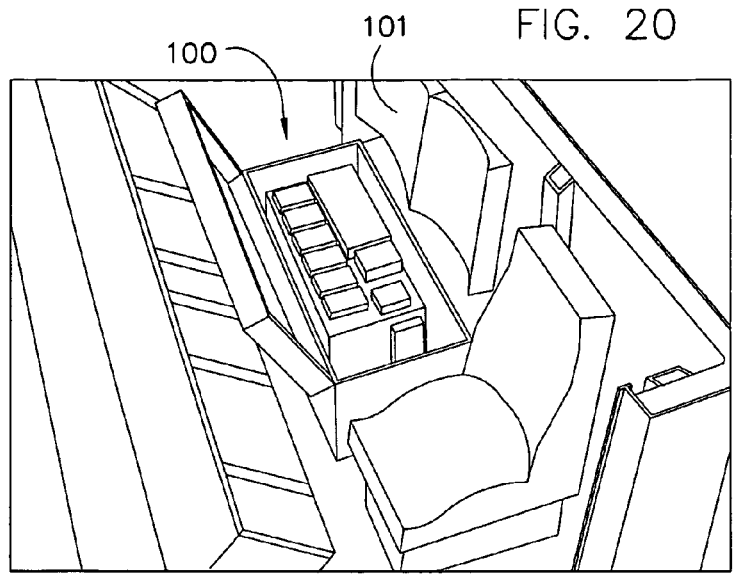
FIG. 20 is a perspective view of the interior of an autonomous and/or semi-autonomous vehicle showing at least a portion of the hardware for the vehicle control system positioned under the passenger seat, according to an exemplary embodiment.

Referring to FIG. 20, certain hardware components of vehicle control system 100 may be positioned under passenger seat 101 of vehicle 102, according to an exemplary embodiment. In an exemplary embodiment, the hardware components may be packaged in a shock absorbing rack that fits inside passenger seat 101. In one embodiment, vehicle 102 may include a temperature control system that is configured to heat and/or cool the hardware components. For example, vehicle 102 may be configured to air condition the space under passenger seat 101 to prevent the microprocessors from overheating. In this exemplary embodiment, vehicle 102 may be configured to heat and/or cool the space that contains the hardware components using the heating and cooling systems used to control the climate in the cab of vehicle 102.

In an exemplary embodiment, terrain detection system 104 (see FIG. 13) is used to detect obstacles around vehicle 102 (e.g., rocks, sudden drop-offs, trees, and so forth) and/or detect a path for vehicle 102 to travel (e.g., detect a road). In this exemplary embodiment, terrain detection system 104 receives and analyzes input from terrain sensors 160 to identify obstacles and a path for vehicle 102 to follow. Terrain data from the various terrain sensors 160 is merged into a single database that is used to plan the path of vehicle 102.

In an exemplary embodiment, terrain detection system 104 includes a first LIDAR system 103, a second LIDAR system 105, and a vision system 107. In an exemplary embodiment, first LIDAR system 103 receives input from two single-plane LIDAR sensors 162, 164 coupled to vehicle 102. In an exemplary embodiment, second LIDAR system 105 receives input from two multi-plane LIDAR sensors 166 coupled to vehicle 102. In this exemplary embodiment, vision system 107 receives input from three cameras 168, 170, 172 coupled to the front of vehicle 102. It should be appreciated that the number, configuration, and types of terrain sensors used to provide input to terrain detection system 104 may be varied widely. For example, terrain detection system 104 may include a radar system, or may include additional LIDAR systems, or may include a rotating array of LIDAR sensors to provide a 360° view of the surrounding terrain. Likewise, terrain sensors 160 may include a radar antenna, various cameras (still and/or video cameras), and multiple LIDAR sensors (e.g., single plane or multi-plane LIDAR systems). Also, vehicle 102 may include any of these sensors in any configuration coupled to the rear of vehicle 102 to facilitate operation of vehicle 102 in reverse.

Figure 23:
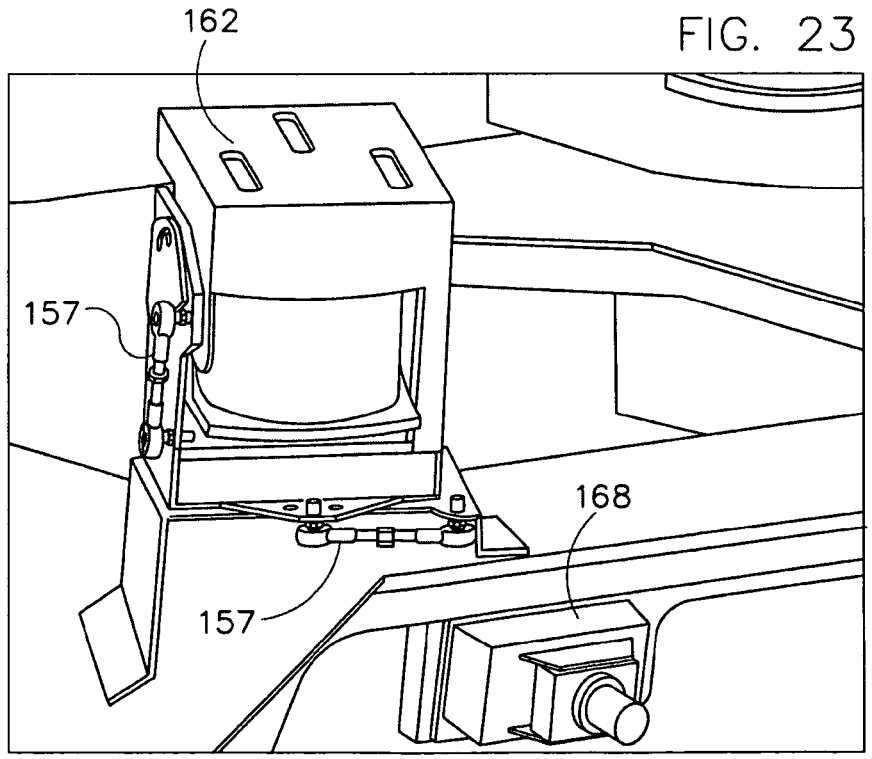
FIG. 23 is a perspective view of the vehicle in FIG. 21 showing sensors coupled to the cab of the vehicle, according to an exemplary embodiment.

In an exemplary embodiment, terrain sensors 160 may be mounted to vehicle 102 using any suitable mounting structure. For example, as shown in FIG. 23, terrain sensors 160 may be mounted to vehicle 102 using telescopically adjustable mounts 157 that move in and out via a threaded engagement system. In an exemplary embodiment, adjustable mounts 157 allow for precise adjustment of terrain sensors 160 but also keep terrain sensors 160 in a fixed position after the adjustment has been performed. In an exemplary embodiment, adjustable mounts 157 may be used to hold any of terrain sensors 160 and/or position sensors 150 in place. In an exemplary embodiment, terrain sensors 160 and/or position sensors 150 may be coupled to roll bar or roll cage 180 of vehicle 102. In an exemplary embodiment, roll bar 180 may also serve as a protective conduit for the sensor communication wires and power wires to travel.

Figure 14:
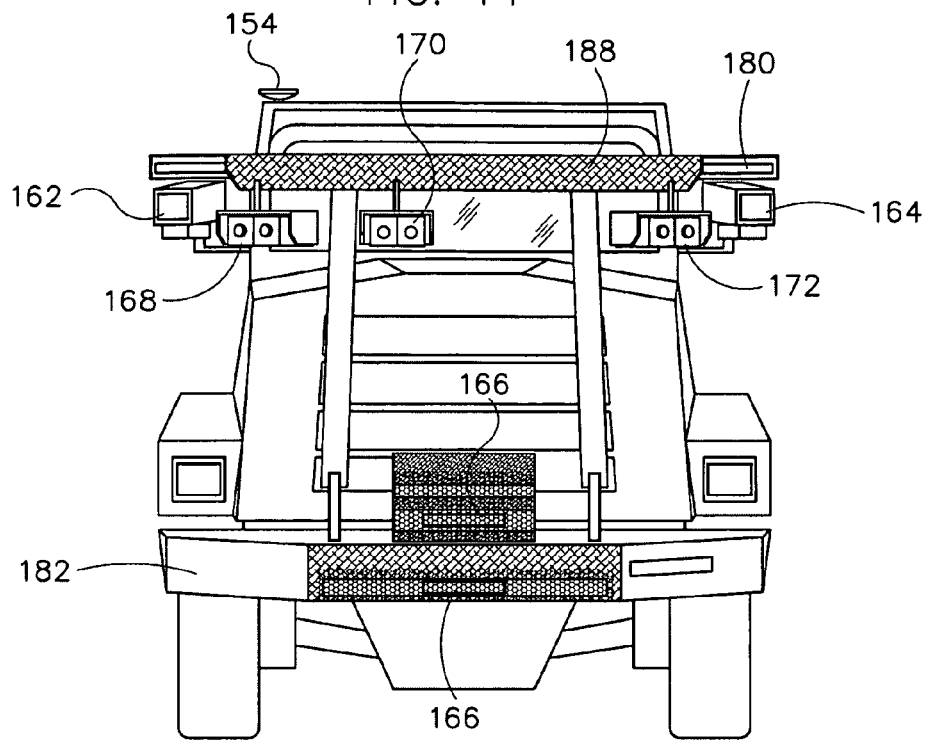
FIG. 14 is a front view of an autonomous and/or semi-autonomous vehicle, according to an exemplary embodiment.
Figure 15:
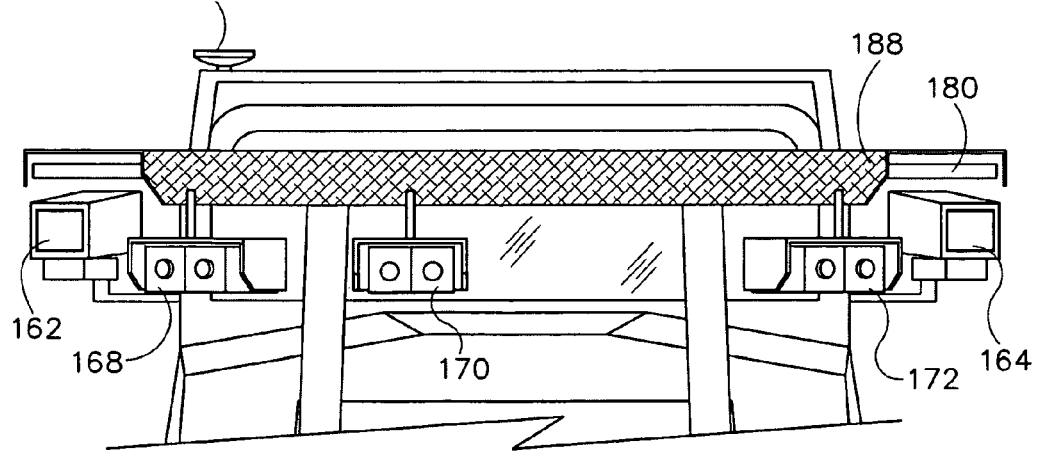
FIG. 15 is a front view of the vehicle in FIG. 14 which shows some of the sensors coupled to the roll cage and/or on or near the cab of the vehicle, according to an exemplary embodiment.

As shown in FIGS. 14 and 15, LIDAR sensors 162, 164 are coupled to the outside edges of roll bar 180 at the front of vehicle 102, according to an exemplary embodiment. In an exemplary embodiment, LIDAR sensors 162, 164 are positioned so that they point about 10 degrees down and about 25 degrees outward to the side of vehicle 102. In this exemplary embodiment, positioning of LIDAR sensors 162, 164 in this fashion provides good coverage of the terrain to the front and the side of vehicle 102. In this exemplary embodiment, the positioning of LIDAR sensors 162, 164 in this fashion allows vehicle 102 to make tight turns while still having some information regarding the terrain in the direction that vehicle 102 is turning. It should be appreciated that LIDAR sensors 162, 164 may be positioned at any suitable position to provide the most useful information to vehicle control system 100. To some extent, the orientation of LIDAR sensors 162, 164 depends on the type of vehicle 102 being used (e.g., taller vehicles may require the LIDAR sensors to be pointed down more). In an exemplary embodiment, LIDAR sensors 162, 164 may be configured to be positioned about 0 to 20 degrees down and about 0 to 90 degrees outward to the side of vehicle 102. In another exemplary embodiment, LIDAR sensors 162, 164 may be configured to scan a 100 degree scan area with a 1 degree resolution. Suitable LIDAR sensors may be obtained from SICK, Inc., having an office in Minneapolis, Minn. located at 6900 West 110$^{th}$ street, as model number SICK LMS-291.

In an exemplary embodiment, first LIDAR system 103 may be configured to detect positive obstacles (e.g., obstacles that protrude upward) and negative obstacles (e.g., road edges, cliffs, etc.). In an exemplary embodiment, the positioning of LIDAR sensors 162, 164 can be configured to allow for detection of both positive and negative obstacles. In an exemplary embodiment, first LIDAR system 103 processes the scan data from LIDAR sensors 162, 164 to identify positive and negative obstacles. In an exemplary embodiment, positive obstacles may be detected by translating the raw scan data from a sensor level coordinate framework to a local level coordinate framework and comparing the relative heights of neighboring scan points. In an exemplary embodiment, a history of scan data can be used to effectively map the surface in front of vehicle 102. In an exemplary embodiment, an obstacle is identified if the surface as detected by LIDAR sensors 162, 164 protrudes upward above a threshold amount.

In this exemplary embodiment, the detection threshold may be set at a minimum obstacle height based on the capabilities of vehicle 102. For example, vehicle 102 as shown in FIG. 12 may be configured to have a detection threshold of about eighteen inches since vehicle 102 can drive over any obstacle that is under eighteen inches, according to an exemplary embodiment. In an exemplary embodiment, a convex hull algorithm may be used to define the outermost edge of the obstacle. Once the obstacle and its outermost edges have been identified, vehicle control system 100 can store the obstacle in the database.

In an exemplary embodiment, first LIDAR system 103 may detect negative obstacles in a manner that is similar to detecting positive obstacles. In an exemplary embodiment, the data map of the surface in front of vehicle 102 may be searched using an algorithm that identifies any negative height discontinuities. In this exemplary embodiment, any identified negative height discontinuities are evaluated further to determine if the edge of the discontinuity is a continuation of a previously detected edge.

It should be appreciated that many aspects related to first LIDAR system 103 and single-plane LIDAR sensors 162, 164 may be modified in a variety of ways. For example, instead of using single-plane LIDAR sensors, multi-plane LIDAR sensors may be used. It should also be noted that more or less than two LIDAR sensors 162, 164 may be used (e.g., one or more additional LIDAR sensors may be coupled to the rear of vehicle 102 to assist with backing vehicle 102). Also, LIDAR sensors 162, 164 may be coupled to vehicle 102 at any suitable location such as the cab, fender, and so forth.

Figure 16:
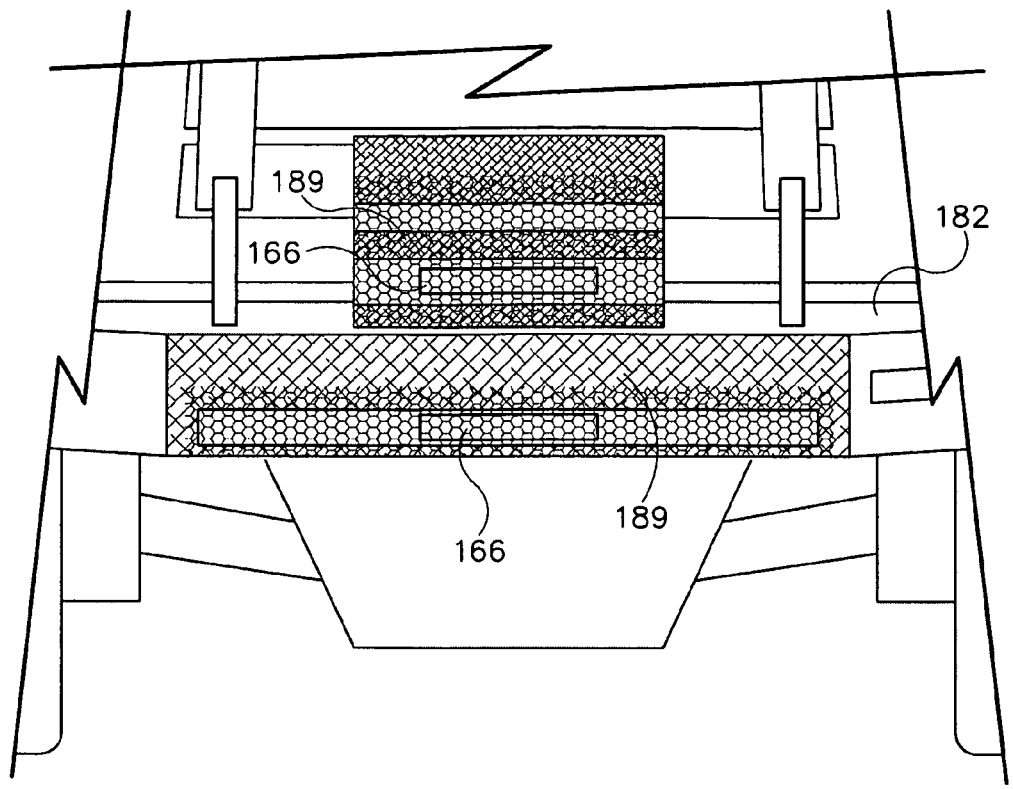
FIG. 16 is a front view of the vehicle in FIG. 14 which shows some additional sensors positioned near the bumper of the vehicle, according to an exemplary embodiment.
Figure 17:
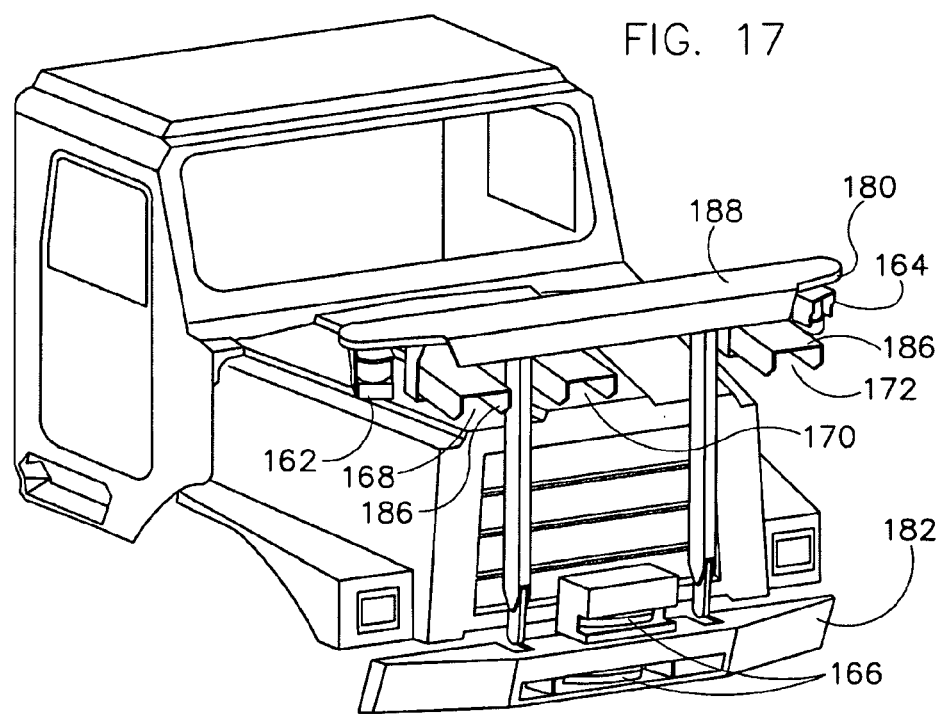
FIG. 17 is a perspective view of an autonomous and/or semi-autonomous vehicle showing sensors positioned near the roll cage and the bumper, according to an exemplary embodiment.
Figure 18:
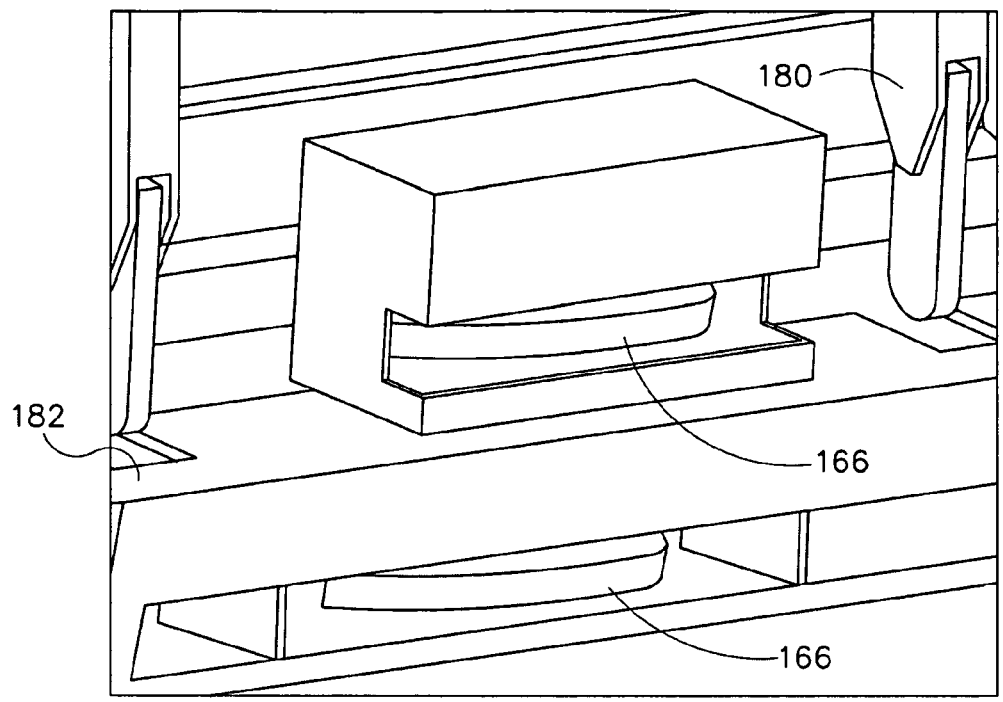
FIG. 18 is a perspective view of the vehicle in FIG. 17 showing two LIDAR sensors coupled to the bumper of the vehicle, according to an exemplary embodiment.
Figure 19:
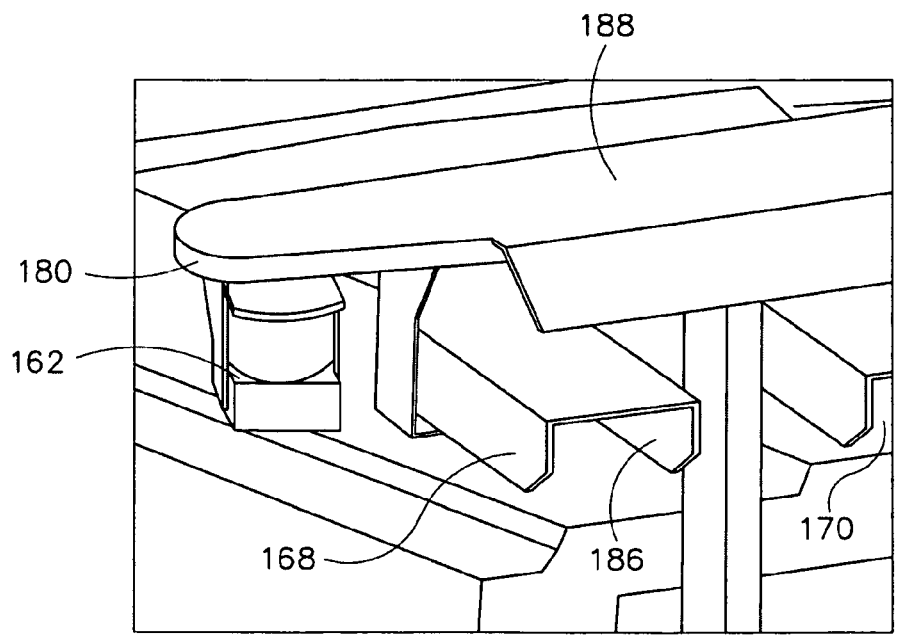
FIG. 19 is a perspective view of the vehicle in FIG. 17 showing a LIDAR sensor and a camera coupled to the roll cage of the vehicle, according to an exemplary embodiment.

Referring to FIGS. 14, 16, and 18, multi-plane LIDAR sensors 166 used with second LIDAR system 105 are coupled to vehicle 102 near bumper 182, according to an exemplary embodiment. In an exemplary embodiment, each of LIDAR sensors 166 are four plane scanner devices that are used primarily for positive obstacle detection at long and close range. In an exemplary embodiment, each LIDAR sensor 166 is positioned horizontally so that two planes scan toward the ground and two planes scan toward the sky. In an exemplary embodiment, LIDAR sensors 166 each have a range of about 80 meters, a resolution of about 0.25 degrees, and a 170 degree scan area. In an exemplary embodiment, the large scan area allows LIDAR sensors 166 to be used to identify obstacles around upcoming turns.

As shown in FIG. 12, vehicle 102 may be configured to include only a single LIDAR sensor 166. However, it may be desirable to include at least two LIDAR sensors 166 so that in case one of LIDAR sensors 166 is damaged or otherwise unable to be used, the remaining LIDAR sensor 166 can still provide information to vehicle control system 100.

In an exemplary embodiment, second LIDAR system 105 is configured to receive scan data from LIDAR sensors 166 and identify obstacles by searching for large positive slopes in the scan data. In an exemplary embodiment, the obstacle detection algorithm used to process the scan data in first LIDAR system 103 is similar to the obstacle detection algorithm used to process the scan data in second LIDAR system 105. In one embodiment, the same algorithm may be used to process scan data from both sources. In an exemplary embodiment, second LIDAR system 105 may be configured to translate the scan data from the coordinate frame of the particular LIDAR sensor 166 to a local level coordinate frame and stored in the database. In an exemplary embodiment, since LIDAR sensors 166 are multi-plane devices, the scan data from each plane may be compared to each other to aid in detecting obstacles and false positives. In an exemplary embodiment, since the scan data has been translated into a local level coordinate frame, the position of obstacles identified in the scan data from LIDAR sensors 166 can be compared to the position of obstacles identified using the other terrain sensors 160 and to the position of vehicle 102.

In an exemplary embodiment, LIDAR sensors 162, 164 and LIDAR sensors 166 may be configured to scan the same area or different areas in front of vehicle 102. In one embodiment, LIDAR sensors 162, 164, 166 are used to scan overlapping areas in front of and to the side of vehicle 102. In another embodiment, LIDAR sensors 162, 164 may be configured to scan for obstacles that are 0 to 20 meters in front of vehicle 102 and LIDAR sensors 166 may be configured to scan for obstacles that are 20 to 60 meters in front of vehicle 102. In an exemplary embodiment, obstacles detected by LIDAR sensors 162, 164, 166 may be put into an obstacle database that vehicle control system 100 uses to plan the path of vehicle 102.

In an exemplary embodiment, vision system 107 may be based on a multi stereoscopic vision system. In this exemplary embodiment, vision system 107 can receive inputs from cameras 168, 170, 172, which are coupled to a horizontal portion of roll bar 180. In an exemplary embodiment, cameras 168, 170, 172 are coupled to vehicle 102 in a secure manner to prevent cameras 168, 170, 172 from becoming dislodged during operation of vehicle 102. This may especially be a problem when vehicle 102 operates in an off-road environment.

In an exemplary embodiment, cameras 168, 170, 172 are coupled to vehicle 100 so that they are asymmetrically spaced apart from each other. As shown in FIG. 15, cameras 168, 172 are positioned about 1.5 meters apart from each other while camera 170 is positioned about 0.5 meters from camera 168. In one embodiment, cameras 168, 170, 172 may be video cameras that transmit images using ordinary light to vision system 107. In another embodiment, cameras 168, 170, 172 may be still cameras that periodically take pictures at the same time. The pictures may be transmitted to vehicle control system 100 where the pictures are processed to identify obstacles and/or find a path for vehicle 102. In yet another embodiment, cameras 168, 170, 172 may be infrared cameras (either video or still). In yet another embodiment, cameras 168, 170, 172 may be video cameras capable of providing video streams at 10 Hz (640×480, color with Bayer pattern).

In an exemplary embodiment, the orientation of cameras 168, 170, 172 may be calibrated using a graduated grid. This may be done to fix the three degrees of freedom specifying cameras 168, 170, 172 orientation to known values. In one embodiment, the yaw and roll angles of cameras 168, 170, 172 are fixed at zero. This may help to reduce the processing requirements of the images taken by cameras 168, 170, 172. In an exemplary embodiment, the pitch angle of cameras 168, 170, 172 may be chosen so that cameras 168, 170, 172 frame a small portion over the horizon (to limit direct sunlight) and frame the terrain at about four meters from vehicle 102.

It should be appreciated that cameras 168, 170, 172 may be coupled to vehicle 102 in any suitable fashion and location. For example, additional cameras may be coupled to the rear and side of vehicle 102 to facilitate backing and turning of vehicle 102. Also, the pitch, yaw, and roll of cameras 168, 170, 172 may be adjusted in any suitable fashion.

As shown in FIG. 13, cameras 168, 170, 172 send three video streams to vision system 107 via fire wire connections. In an exemplary embodiment, vision system 107 selects which stereo pair of video streams to use depending on the speed of vehicle 102. In an exemplary embodiment, by selecting different pairs of cameras, vision system 107 can obtain images from stereo pairs of cameras having different baselines (e.g., the distance between the cameras). It is desirable to have the ability to vary the baseline because when the baseline is wider, vision system 107 is able to more accurately determine the distance to an object, but as the baseline increases, it makes it more difficult to stereo match objects (especially close objects) in the images because the objects are viewed at very different angles. Therefore, vision system 107 is configured to receive the video streams from cameras 168, 172 when vehicle 102 is traveling at high speeds so that vision system 107 can accurately identify and measure the distance of obstacles that are a long distance away, according to an exemplary embodiment. In an exemplary embodiment, when vehicle 102 is traveling at medium speeds and obstacles are not approaching as quickly, vision system 107 is configured to receive the video streams from cameras 170, 172. In another exemplary embodiment, when vehicle 102 is traveling at slow speeds, vision system 107 is configured to receive the video streams from cameras 168, 170 in that order. This configuration allows vision system 107 to obtain images from cameras having a wide baseline when vehicle 102 is moving at high speeds, obtain images from cameras having a medium baseline when vehicle 102 is moving at medium speeds, and obtain images from cameras having a short baseline when vehicle 102 is moving at slow speeds.

In an exemplary embodiment, the use of at least three cameras 168, 170, 172 fixed in position provides a mechanically robust system that is capable of providing images from different combinations of cameras 168, 170, 172. In other embodiments, vision system 107 may be configured to receive input from two cameras where at least one of the cameras rotates and tilts as the speed of vehicle 102 changes instead of using the three camera configuration. In this exemplary embodiment, the moving cameras provide more accurate distance estimation and better object matching versus a two camera configuration where the cameras do not move. However, the configurations that use at least three fixed cameras allows vision system 107 to receive different combinations of video streams from cameras having different baselines and they do not rely on movement of the cameras—an area that is more prone to failure and/or that may introduce variations in the video streams.

It should be appreciated that vehicle control system 100 may include additional LIDAR systems or may combine first LIDAR system 103 and second LIDAR system 105 into a single LIDAR system. It should also be appreciated that the data from the LIDAR and vision systems may be processed by a single processor and/or single software program. It should also be appreciated that in other embodiments the data from each LIDAR system and vision system may be initially processed using a separate system. The output from each system may then be compared to create a database of obstacles. It should also be appreciated that each of these systems may be provided as a separate module that may optionally be included with the vehicle control system 100. Providing each system as a separate module may allow for greater flexibility in selecting the components of vehicle control system 100 to use with a particular type of vehicle.

In an exemplary embodiment, vision system 107 may be used to detect obstacles and detect a path of travel for vehicle 102. In an exemplary embodiment, the images provided by the video streams are subjected to V-disparity image analysis to determine the average terrain slope in front of vehicle 102. In an exemplary embodiment, slope information is then used for both obstacle detection and path detection. Any significant deviation from the average smooth slope detected previously is identified as an obstacle, according to an exemplary embodiment. The exact location of the obstacles is then obtained via stereo triangulation between the two views of the obstacle, according to this exemplary embodiment. This method provides a fairly precise position of the obstacle. However, vehicle control system 100 may also compare the position of the obstacle as determined by vision system 107 with the position of the obstacle as determined by first LIDAR system 103 and/or second LIDAR system 105 to provide an even more accurate position of the obstacle, according to an exemplary embodiment.

In this exemplary embodiment, vision system 107 can detect thin vertical posts such as fence posts. Although vision system 107 may be capable of detecting small obstacles, vision system 107 may be tuned with high thresholds to reduce the number of false positives, according to an exemplary embodiment. In other words, the capability of detecting small obstacles may be traded for a higher robustness of detection, according to an exemplary embodiment.

In an exemplary embodiment, vision system 107 may also uses image disparity analysis as the initial step in detecting a path for vehicle 102 to travel. Image disparity analysis is used to compute the area in front of vehicle 102 which features a smooth slope, which is known as the free-space, according to an exemplary embodiment. In an exemplary embodiment, free space is obtained using standard image warping to localize deviations from a smooth road surface.

In an exemplary embodiment, vision system 107 combines the free space with other features of the images such as similarity in texture, similarity in color, similarity in shape to construct a representation of a path to follow. The path detection algorithm of vision system 107 is also configured to indicate whether the path is straight so that vehicle 102 may increase speed, according to an exemplary embodiment. When a curved path is present, vehicle 102 is configured to slow down, according to an exemplary embodiment.

In an exemplary embodiment, cameras 168, 170, 172 may be configured to compensate for different lights levels using automatic gain control, which allows cameras 168, 170, 172 to sense the environment including direct sunlight into cameras 168, 170, 172. In an exemplary embodiment, obstacles may be detected up until they enter the oversaturated area. In an exemplary embodiment, cameras 168, 170, 172 may also be provided with sun shades 186 which reduce the amount of direct sunlight that hits cameras 168, 170, 172 to avoid oversaturation and reflections due to dirty glass. In an exemplary embodiment, vehicle 102 may also include shields or reflectors 188 that reflect sunlight away from the area of cameras 168, 170, 172 and LIDAR sensors 162, 164 to prevent these devices from becoming too hot. In one embodiment, shield 188 is a reflective diamond plating material (e.g., aluminum or steel). Additional shields 189 may be provided in the vicinity of LIDAR sensors 166, according to an exemplary embodiment.

In an exemplary embodiment, vehicle 102 may include a cleaning system that is configured to clean the lenses on cameras 168, 170, 172 and/or the lenses of LIDAR sensors 162, 164, 166. In an exemplary embodiment, the cleaning system may include one or more nozzles that are aimed at the lenses. The nozzles may be configured to dispense any suitable gas or liquid onto the lens to clean it, according to exemplary embodiments. In one embodiment, the cleaning system may be configured to include an air knife that directs high velocity bursts of air onto the lenses to remove any dust or other debris. The use of air may be desirable since liquids may attract dust and dirt and/or leave spots on the lenses. In another embodiment, the cleaning system may be configured to direct water or another liquid (e.g., windshield washer fluid, and so forth) towards the lens. The cleaning system may then direct air over the lens to quickly dry the lens and remove the water, according to an exemplary embodiment. The air may be supplied by a compressed air system that is included as part of vehicle 102, according to an exemplary embodiment. In another embodiment, the cleaning system may comprise a cleaning controller, one or more valves (e.g., an array of valves), and a washer tank. The cleaning controller may be configured to electronically control the valves to direct liquid and/or air through the nozzles and onto the lenses, according to another exemplary embodiment.

Referring to FIG. 13, vehicle management system 106 includes a path planning module 200, a vehicle control module 202, a navigation module 204, and an information database 206, according to an exemplary embodiment. In an exemplary embodiment, vehicle management system 106 is configured to receive input from terrain detection system 104 and control vehicle 102 to reach a desired location. Vehicle management system 106 may also include a modeling and simulation system that is used to determine the capabilities of vehicle 102 under different circumstances, according to an exemplary embodiment. The modeling and simulation system may be similar to that described in U.S. Prov. Pat. App. No. 60/723,363, entitled "Vehicle Control System and Method," filed on Oct. 4, 2005, which is hereby incorporated herein by reference in its entirety.

In an exemplary embodiment, navigation module 204 may be configured to compute the present position of vehicle 102 and perform dead reckoning navigation. Dead reckoning navigation may be needed when vehicle 102 is unable to receive GPS signals (e.g., when vehicle 102 is in a tunnel, etc.), according to an exemplary embodiment. In an exemplary embodiment, navigation module 204 may also include navigation related information such as maps (e.g., road maps, topographical maps, and the like), aerial photographs, a list of GPS waypoints, and the like. This information may be utilized by navigation module 204 to drive vehicle 102 to its destination, according to an exemplary embodiment. In one embodiment, each mission may be planned out by setting a plurality of GPS waypoints and a preferred path of travel that vehicle 102 should take until it reaches its final destination. The GPS waypoints and preferred path may be loaded into navigation module 204 prior to vehicle 102 embarking on the mission, according to an exemplary embodiment. During the mission, vehicle control system 100 is configured to drive vehicle 102 to successive waypoints while trying to stay on the preferred path as much as possible while still avoiding any obstacles that may present themselves, according to an exemplary embodiment.

In an exemplary embodiment, navigation module 204 receives input from position sensors 150. In the embodiment shown in FIG. 13, position sensors 150 include dual GPS/inertial measurement units (IMU) 152 and differential GPS unit 154. In an exemplary embodiment, GPS/IMU units 152 may include a six-axis inertial measurement system which includes three angular rate sensors (gyros) and three accelerometers. The three accelerometers are all mounted at 90 degrees to each other, and the three angular rate sensors are mounted at the same angles as their respective accelerometers, according to an exemplary embodiment. Together they give full 3D motion measurement of vehicle 102. In an exemplary embodiment, GPS/IMU units 152 are also capable of receiving GPS signals directly from GPS satellites and differential GPS information from differential GPS unit 154. The information provided to navigation module 204 is used to chart the course of vehicle 102 at a high level, according to an exemplary embodiment. In an exemplary embodiment, vehicle 102 attempts to follow the course as much as possible while avoiding obstacles and attempting to stay on a road or other path.

In an exemplary embodiment, input from the inertial measurement system may be used by vehicle control system 100 to perform dead reckoning navigation. The inertial position information provided to vehicle control system 100 may be supplemented with other data such as wheel speed and time traveled (e.g., to determine distance traveled during dead reckoning navigation), wheel speed and steering angle (e.g., to determine direction the vehicle 102 is going during dead reckoning navigation), or any other information that may be useful to determine the position of vehicle 102. Also, the inertial position information may be used to measure the pitch and roll of vehicle 102, according to an exemplary embodiment. In one embodiment, vehicle control system 100 may be configured to perform dead reckoning navigation using sensed wheel speed and wheel angle for those situations where the GPS and IMU units are not operational. In an exemplary embodiment, GPS/IMU units 152 may be positioned on the approximate centerline of vehicle 102 (e.g., in the floor of the cab). In one embodiment, GPS/IMU units 152 may be obtained from Oxford Technical Solutions, Ltd., having an office in Dearborn, Mich., as part number OXTS RT3100.

In the embodiment shown in FIG. 13, vehicle 102 includes two GPS/IMU units 152. In this exemplary embodiment, two of the units 152 may be provided so that the position information (both GPS and inertial) received from each unit can be averaged to provide a more accurate and robust calculation of the position of vehicle 102. Also, if one of GPS/IMU units 152 fails, remaining GPS/IMU unit 152 could still be used to provide position information to vehicle control system 100, according to an exemplary embodiment. In another exemplary embodiment, vehicle control system 100 may be able to determine that one of GPS/IMU units 152 has failed when, for example, unit 152 stops providing input or the input is so different from the position information provided by the other position sensors 150 and terrain sensors 160 that the input can no longer be trusted. If vehicle control system 100 determines that one of GPS/IMU units 152 has failed, vehicle control system 100 uses the remaining GPS/IMU unit 152, according to an exemplary embodiment.

In an exemplary embodiment, differential GPS unit 154 is configured to receive differential corrections and send them to GPS/IMU units 152. In an exemplary embodiment, differential GPS unit 154 may be configured to receive Beacon, SBS/WAAS, and/or Omnistar corrections, as well as any other suitable corrections. It should be appreciated that the combination of GPS units may be varied widely. For example, GPS/IMU units 152 may be capable of receiving the differential corrections directly without using a separate receiver. Likewise, GPS/IMU units 152 may be split into two units so that the GPS unit is separate from the IMU unit.

In an exemplary embodiment, vehicle control module 202 is configured to interface with vehicle subsystems 110 to allow the vehicle components to be controlled by vehicle management system 106. As shown in FIG. 13, vehicle subsystems 110 may include a steering system 112, a braking system 116, a throttle system 120, and a transmission system 124.

In an exemplary embodiment, steering system 112 may include a servo drive 113 and a corresponding servomotor 114 that is in communication with servo drive 113. Servo drive 113 may be configured to receive and process position commands from vehicle control system 100 and provide corresponding outputs (e.g., an analog voltage or current) to servomotor 114, according to an exemplary embodiment. In response, servomotor 114 may drive one or more associated wheels of vehicle 102 to a desired steering angle, according to an exemplary embodiment. In an exemplary embodiment, steering system 112 may also include one or more wheel angle sensors that are used to determine the steering angle of a wheel of vehicle 102 and provide feedback to vehicle control system 100 as to the current steering angle of the wheel. In another embodiment, servomotor 114 may include an integrated high-resolution encoder that is used to control the steering angle of vehicle 102. It should also be appreciated that the encoder may be coupled to steering system 112 at any location that is capable of providing a reliable and accurate measurement of the steering angle of the wheels (e.g., steering column, etc.).

In one embodiment, servomotor 114 is coupled directly to the steering gearbox of vehicle 102. The steering gearbox may be configured to have dual inputs so that servomotor 114 and the hand wheel can both be connected to the steering gear, according to an exemplary embodiment. This allows steering control of vehicle 102 to be switched between manual mode (operated by a driver) and autonomous mode without disassembling the steering system, according to an exemplary embodiment.

In an exemplary embodiment, steering system 112 may also be an all-wheel steering system, or in the case of 6×6 wheeled vehicles, 8×8 wheeled vehicles and so on, steering system 112 may be configured to steer one, two, three, four, or more sets of wheels. In an exemplary embodiment, steering system 112 may be configured similarly to any of the steering systems described in U.S. Pat. No. 6,882,917 (incorporated by reference herein previously).

In an exemplary embodiment, braking system 116 may include an anti-lock brake system. The anti-lock brake system may include an anti-lock brake control system and anti-lock brakes coupled to one or more wheels of vehicle 102, according to an exemplary embodiment. In an exemplary embodiment, braking system 116 may be configured to receive braking commands, such as a "brake ON" command, from vehicle control system 100. In response, braking system 116 may apply braking pressure to one or more wheels of vehicle 102 to, for example, reduce the speed of vehicle 102 or bring vehicle 102 to a stop. According to an exemplary embodiment, braking pressure for braking system 116 may be provided by a compressed-air system. The compressed-air system may include, for example, an air compressor coupled to the power train of vehicle 102 (such as via gears, v-belt, etc. to convey rotational mechanical energy to the air compressor to be converted to air pressure), and one or more air pressure tanks for storing compressed air from the air compressor.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

As shown in FIG. 13, vehicle control system 100 may be configured to communicate with braking system 116 via Ethernet to a proportional voltage to pressure valve, according to an exemplary embodiment. In an exemplary embodiment, braking system 116 may be configured to apply the service brakes in an amount that is proportional to the deviation between the actual speed of vehicle 102 and the desired speed of vehicle 102. It should be appreciated, however, that numerous other configurations may also be used to control braking system 116. For example, vehicle control system 100 may be configured to control braking system 116 using more mechanical components such as a hydraulic actuator that operates the brakes through the system, according to an exemplary embodiment.

In an exemplary embodiment, braking system 116 may also include an engine brake. Braking system 116 in combination with throttle system 120 may be used to control the speed of vehicle 102, according to an exemplary embodiment. Typically, the speed of vehicle 102 is controlled solely using the throttle. However, the service brakes and the engine brake may be used to control the speed of vehicle 102 on steep grades and/or to manage the speed that vehicle 102 decelerates.

In an exemplary embodiment, throttle system 120 may include an engine control module and a throttle actuator. The engine control module may be configured to receive and process throttle commands from vehicle control system 100 and provide corresponding outputs (e.g., an analog voltage or current) to the throttle actuator, according to an exemplary embodiment. In response, the throttle actuator may adjust the rotational speed of an engine coupled to the drive train of vehicle 102 to achieve a desired speed of vehicle 102, according to an exemplary embodiment. The engine control module may be configured to determine the speed of vehicle 102 (e.g., using a tachometer feedback signal) and provide feedback to vehicle control system 100 as to the current speed of vehicle 102, according to an exemplary embodiment. In other embodiments, the speed of vehicle 102 may be determined using feedback from transmission system 124 or by measuring the rotation of a drive shaft, or some other component of the power train of vehicle 102. In one embodiment, vehicle control system 100 and/or the engine control module may use a pulse width modulated (PWM) signal to provide very precise control of the throttle.

In an exemplary embodiment, throttle system 120 may be configured so that reset conditions to the throttle position are provided for transmission up shift and down shift and to activate the engine brake. In an exemplary embodiment, since the engine brakes are activated when the engine is idling, throttle position overrides are used whenever the engine brakes are active. Throttle position faders are used to reactivate the throttle position control when the engine brake is disabled, according to an exemplary embodiment.

In an exemplary embodiment, transmission system 124 may include the engine control module and a transmission mechanically coupled to the engine of vehicle 102. In combination, transmission system 124 and the engine of vehicle 102 form the power train of vehicle 102. The engine control module may be configured to receive and process gear change commands from vehicle control system 100 and provide corresponding outputs (e.g., an analog voltage or current) to transmission system 124. In response, the transmission may change gears to achieve a desired rotational speed of the power train of vehicle 102. In another embodiment, transmission system 124 may include a transmission control module that is separate from the engine control module. The transmission control module may be in communication with the engine control module so that information required for shifting gears and so forth can be communicated between the transmission control module and the engine control module.

As shown in FIG. 13, vehicle subsystems 110 may also include an emergency stop functionality 127, according to an exemplary embodiment. In an exemplary embodiment, emergency stop functionality 127 may be any suitable switch configured to provide, for example, stop, pause, or run commands to vehicle control system 100 to either stop, temporarily interrupt, or initiate the operation of vehicle 102. In one embodiment, emergency stop functionality 127 may cause a full brake command to be provided to braking system 116. The full brake command results in the service brakes being applied in full to stop vehicle 102 as quickly as possible, according to an exemplary embodiment.

In an exemplary embodiment, vehicle subsystems 110 may also include an odometer 128. In this exemplary embodiment, odometer 128 may be used to provide information regarding the movement of vehicle 102 (e.g., distance traveled) to vehicle control system 100 in order to enhance the ability of vehicle control system 100 to determine the position or movement of vehicle 102. In an exemplary embodiment, odometer 128 may also be used by vehicle control system 100 to perform dead reckoning navigation.

In an exemplary embodiment, path planning module 200 is configured to determine the desired trajectory of vehicle 102 and provide that trajectory to vehicle management system 106. In an exemplary embodiment, the trajectory of vehicle 102 includes a desired path along the ground as well as the desired speeds and boundary area. The desired trajectory may be determined using path and speed constraints defined before vehicle 102 begins operating autonomously (e.g., pre-mission planning stage), according to an exemplary embodiment. As mentioned above in connection with navigation module 204, the route that vehicle 102 follows may be defined beforehand and loaded into vehicle control system 100, according to an exemplary embodiment. For example, the route may be defined in terms of a series of waypoints that define a path along the ground, a path boundary, and/or speed constraints for each section of the path. In an exemplary embodiment, path planning module 200 provides reactive path corrections to this nominal path to account for current conditions, such as vehicle dynamic limits, obstacles (positive obstacles such as large rocks, trees, etc. and negative obstacles such as road edges, drop-offs, and cliffs), terrain grade, and so forth.

In one embodiment, path planning module 200 may be configured to use a tree algorithm that branches from the base at the current waypoint. The tree build function may be constrained by the pre-defined path boundary and/or speed so that the resulting tree is not too large to process. Branches of the tree are computed using a model of vehicle 102 (e.g., steering system and vehicle dynamics) to ensure that the candidate paths are drivable. One potentially suitable model is described in U.S. Prov. Pat. App. No. 60/723,363, entitled "Vehicle Control System and Method," filed on Oct. 4, 2005, which is hereby incorporated herein by reference in its entirety. The tree algorithm may be derived from the Rapidly-exploring Random Tree (RRT) path planner where the growth of the tree is limited to a fixed number of branches (levels), according to an exemplary embodiment.

In an exemplary embodiment, the tree represents a series of candidate paths for vehicle 102 to travel along. In an exemplary embodiment, vehicle control system 100 selects a path from the various candidate paths based on a scoring algorithm that considers distance from the route centerline, path curvature, obstacle avoidance, boundary area constraints, and so forth. Path planning module 200 may generate at least 100 candidate paths, at least 1000 candidate paths, or at least about 2000 candidate paths each planning cycle, according to exemplary embodiments. In an exemplary embodiment, path planning module 200 performs a path analysis each time a waypoint is reached. Path planning module 200 may also be configured to adjust the maximum speed of vehicle 102 to account for path geometry and current conditions, according to an exemplary embodiment. Path planning module may further be configured to adjust the maximum speed of at least one of a single vehicle, a few vehicles, multiple vehicles, and/or a plurality of vehicles to account for at least one of a single vehicle, a few vehicles, multiple vehicles, and/or a plurality of vehicles attempting to reenter the convoy.

In an exemplary embodiment, the initial desired speed may be set to the maximum determined during the pre-mission planning stage. The speed management component of path planning module 200 may be configured to adjust the initial set speed depending on conditions, according to various exemplary embodiments. In one embodiment, the speed management component of path planning module 200 may be configured to reduce the maximum speed of each section of the path depending on the current conditions (e.g., obstacles, complex terrain, hazardous terrain, at least one vehicle has separated from the convoy, a threat being detected and/or any combination thereof.).

In another embodiment, path planning module 200 may be configured to continually calculate and adjust the path while vehicle 102 is traveling (e.g., real-time path planning). In yet another embodiment, path planning module 200 may be configured to reevaluate the path if vehicle 102 encounters a situation that prevents vehicle 102 from continuing on the original path (e.g., a washed out road, fallen tree, rock slide, etc.). In this situation, path planning module 200 may be configured to determine the best way for vehicle 102 to proceed to the waypoint. Path planning module 200 may include or have access to some of the same information that may be included in navigation module 204 such as topographical maps, road maps, aerial or satellite images, and so forth, to allow path planning module 200 to determine the best path for vehicle 102. It should be noted that the various embodiments with a vehicle could be utilized with one vehicle, a few vehicles, multiple vehicles, a plurality of vehicle or a convoy of vehicles.

Figure 24:
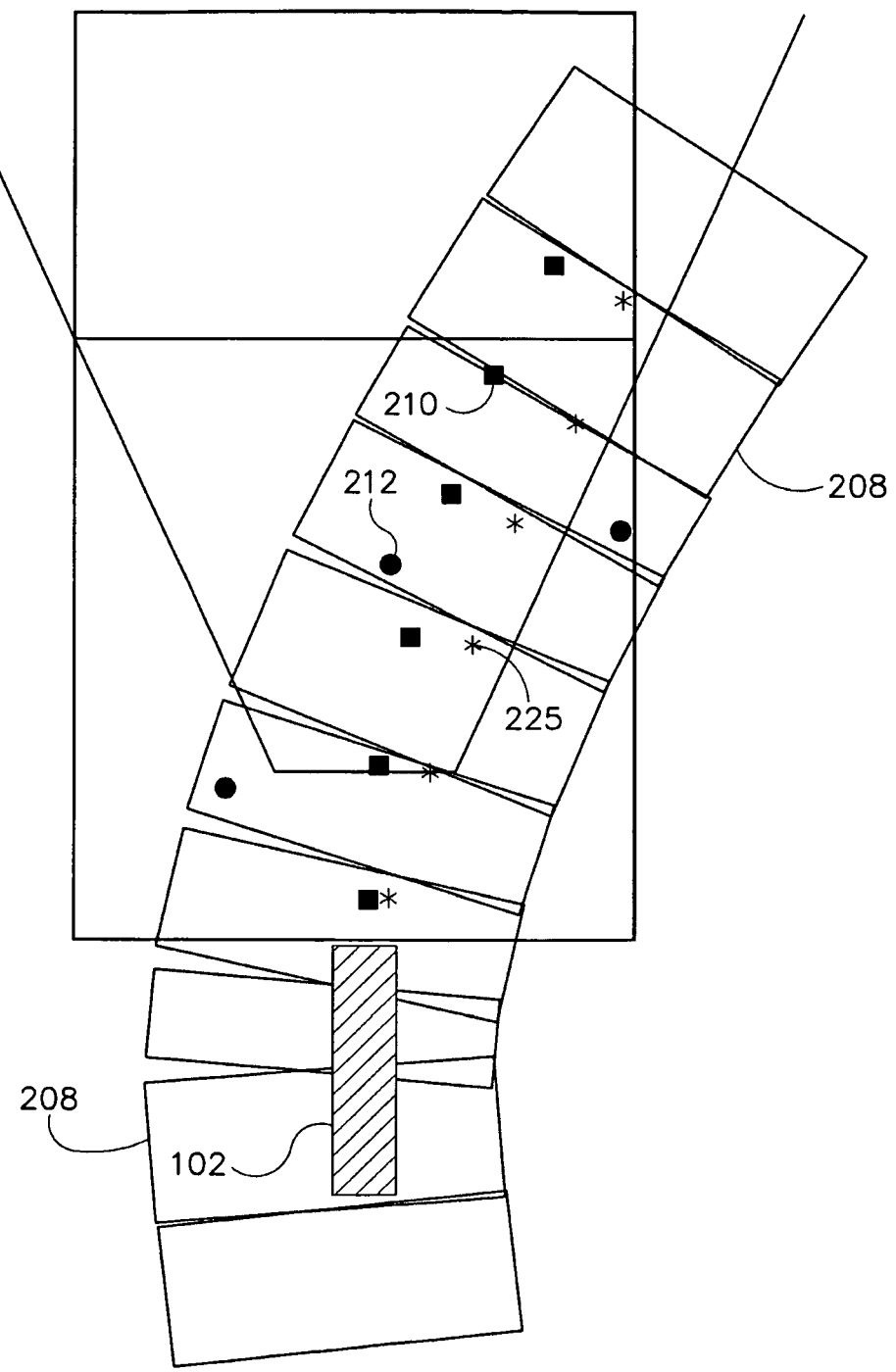
FIGS. 24-26 are illustrations of the path planning, obstacle detection, and obstacle avoidance capabilities of another embodiment of an autonomous and/or semi-autonomous vehicle.

FIG. 24 shows a graphical representation of a path generated by path planning module 200, according to an exemplary embodiment. In FIG. 24, vehicle 102 is represented by the long rectangular box. In an exemplary embodiment, a sequence of boxes 208 represents the path that is loaded into vehicle management system 106 before vehicle 102 begins operating autonomously. In an exemplary embodiment, a first real-time path 210 generated by path planning module 200 is shown. FIG. 24 also shows obstacles 212 detected by terrain detection system 104. As shown in FIG. 24, first real-time path 210 of vehicle 102 is adjusted to an actual path 225 by moving to the right the center of the pre-loaded path to avoid obstacles in the turn. The data boxes (e.g., control data, command response, state data, path data) in FIG. 24 show data associated with first real-time path 210, actual path 225, vehicle state, and control state of vehicle 102.

Figure 26:
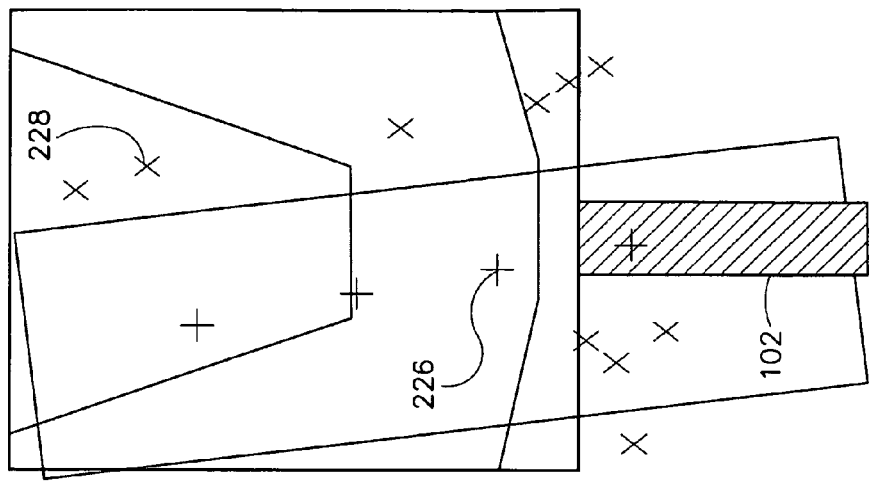
Figure 25:
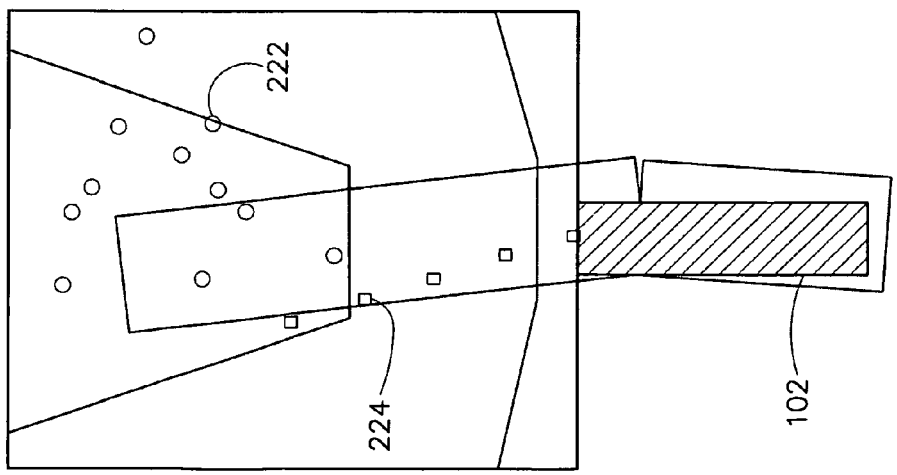

In FIG. 25, an illustration of a second real-time path 224 generated by path planning module 200, which shows obstacles 222 detected using first LIDAR system 103. Similarly, FIG. 26 is an illustration of a third real-time path generated by path planning module 200, which shows obstacles 228 detected using second LIDAR system 105.

In an exemplary embodiment, vehicle management system 106 controls the movement of vehicle 102 along the path by providing wheel angle commands to steering system 112. In an exemplary embodiment, the wheel angle commands move vehicle 102 along the path defined by path planning module 200. This may be accomplished by computing deviations from the desired path and converting the deviations into steer angle commands that are sent to the steering servo, according to an exemplary embodiment.

In an exemplary embodiment, vehicle management system 106 may include a capture steering mode and a track steering mode. The capture steering mode refers to the steering mode that is used based on the pre-loaded path data, according to an exemplary embodiment. The track steering mode refers to the steering mode that is used during normal operation, according to an exemplary embodiment. Capture and track steering modes may be automatically selected based on current conditions, according to an exemplary embodiment.

In an exemplary embodiment, the capture steering mode uses course error as the control parameter. In another exemplary embodiment, vehicle management system 106 creates a steer angle command that aligns the ground track of vehicle 102 with the direct bearing to the next waypoint. This type of control may be referred to as homing control. In an exemplary embodiment, capture steering mode will be used when vehicle 102 first begins autonomous operation.

The track steering mode uses linear cross track deviation and cross track deviation rate to align vehicle's 102 path along the ground with the waypoint course, according to an exemplary embodiment. Track angle error and steer angle command limiters may be used to limit the commanded steer angle to values that are achievable by vehicle 102, according to an exemplary embodiment. In another exemplary embodiment, the command limiters incorporate vehicle 102 dynamic limits with margins built in to ensure that vehicle 102 does not get into an unsafe condition. This may also mean that vehicle 102 operates at levels below its maximum dynamic capability when in autonomous mode, according to this exemplary embodiment. In another exemplary embodiment, vehicle management system 106 may also anticipate turns so that the transition between traveling between waypoints may be accomplished without overshoots.

In an exemplary embodiment, vehicle management system 106 is configured to monitor and dynamically change to conditions using information from path planning module 200, navigation module 204, vehicle control module 202, and information database 206. In another exemplary embodiment, vehicle management system 106 may be configured to handle a number of situations that may arise during autonomous operation. When the situation occurs, vehicle management system 106 is configured to proceed through certain operations to address the situation.

In exemplary embodiments, examples of situations that may arise include:
(1) transition to and from e-stop state—when the e-stop is activated, vehicle management system 106 is configured to stop vehicle 102. When the e-stop is deactivated, vehicle management system 106 is configured to initiate normal operation;
(2) no valid path ahead—vehicle 102 is commanded to stop and wait for vehicle management system 106 to obtain a valid path. If no valid path is found vehicle management system 106 will back vehicle 102 up and try again;
(3) obstacle detected behind vehicle 102 while backing up—vehicle management system 106 stops vehicle 102 and initiates normal operation of vehicle 102 to find a valid path ahead;
(4) a large course change requiring a back up maneuver—vehicle management system 106 operates vehicle 102 around a three point turn;
(5) narrow tunnel—vehicle management system 106 guides vehicle 102 through the tunnel primarily using LIDAR systems 103, 105; and
(6) stuck between obstacles—vehicle management system 106 implements the stuck behavior when vehicle 102 cannot make progress along the route because it is continually going back and forth so that it is stuck between obstacles. Vehicle management system 106 positions vehicle 102 at different angles to search for a valid path. If no valid path is found, then vehicle management system 106 ignores low confidence obstacles in an attempt to eliminate low confidence obstacles. The last resort is to go forward along the pre-loaded route ignoring all obstacles.

In an exemplary embodiment, vehicle control system 100 may also be configured to detect a collision involving vehicle 102. Upon detection of a collision, vehicle control system 100 may be configured to run a diagnostic check on each input and output device that is part of vehicle control system 100 to determine if all of them are online and functional, according to an exemplary embodiment.

In an exemplary embodiment, the functionality of vehicle management system 106 may be similar to the Distributed Architecture for Mobile Navigation (DAMN) where vehicle 102 ordinarily follows the path generated by path planning module 200 but the path can be overwritten depending on the current conditions. However, in some embodiments, the DAMN architecture may be modified to use a rules-based decision logic (instead of a complex voting scheme) to determine when the path should be overwritten. The use of rules-based decision logic may be more deterministic and robust than other solutions, which may render itself more useful in fleet applications.

In an exemplary embodiment, system manager 108 is the module of vehicle control system 100 that allows a user to interface with vehicle control system 100 to execute control commands and review the status of various systems and devices. In this exemplary embodiment, system manager 108 is also configured to continuously monitor the status of the various applications included in vehicle control system 100. If system manager 108 determines that an application is no longer functioning normally, system manager 108 is configured to stop and restart the application to return normal functionality, according to an exemplary embodiment. In another exemplary embodiment, vehicle control system 100 may be configured so that if system manager 108 fails, vehicle control system 100 can continue operating.

In the context of a convoy of vehicles 102, first vehicle 102 in the convoy may be configured to operate autonomously. The remainder of vehicles 102 may operate autonomously as well, but instead of actively sensing and avoiding obstacles, each of the remaining vehicles 102 may be configured to follow the one in front of it. This way there are not a large number of vehicles 102 in the convoy operating to independently find the best path to a destination, according to an exemplary embodiment. In an exemplary embodiment, vehicles 102 may be configured so that if the lead vehicle 102 is disabled, vehicle 102 behind the lead vehicle 102 may take over leading the convoy.

In an exemplary embodiment, in the context of a convoy of vehicles 102, any vehicle 102 can be the lead vehicle 102. In an exemplary embodiment, the remainder of vehicles 102 may operate autonomously and actively sense obstacles to avoid. In this exemplary embodiment, all of data obtain by the sensors of the plurality of vehicles 102 can be combined to generate a composite image, analysis, control signal, command signal, reporting signal, status signal and/or report.

Figure 21:
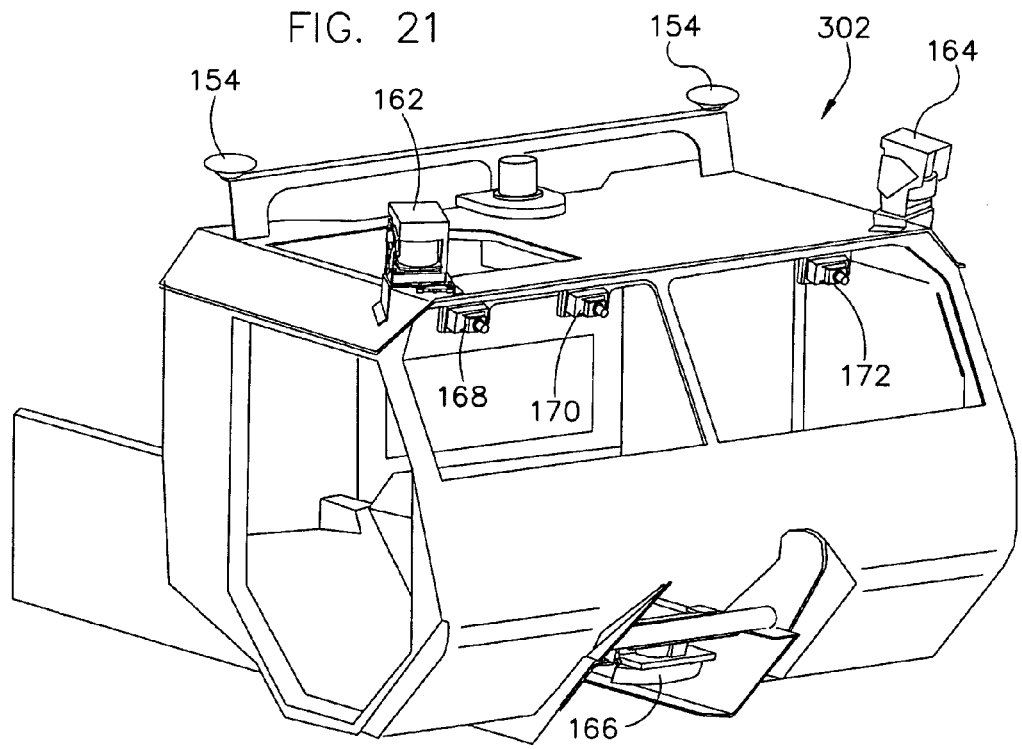
FIG. 21 is another perspective view of an autonomous and/or semi-autonomous vehicle, according to an exemplary embodiment.
Figure 22:
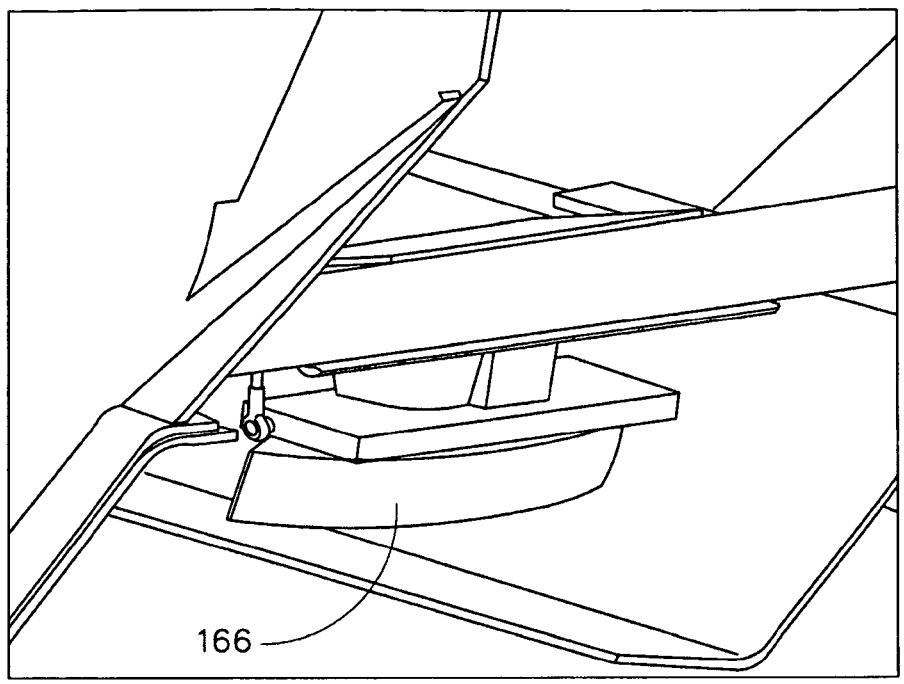
FIG. 22 is a perspective view of the vehicle in FIG. 21 showing sensors positioned near the lower front section of the vehicle, according to an exemplary embodiment.

In FIGS. 21-23, a second vehicle 302 which includes vehicle control system 100 is shown, according to an exemplary embodiment. In an exemplary embodiment, second vehicle 302 may be a heavy duty tactical military vehicle. Second vehicle 302 may be configured to function as a cargo truck (e.g., multiple configurations of a cargo truck that can carry different types and amounts of cargo), a fuel servicing truck, a load handling system truck (e.g., includes a lift arm that loads pallets onto the vehicle), a bridge transport vehicle, and a recovery vehicle (e.g., wrecker vehicle) with cranes and winches, according to exemplary embodiments. In an exemplary embodiment, second vehicle 302 may be configured so that it is capable of being transported by a C130 airplane.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., consensus definitions from widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "e.g.," use of the word "invention," etc., are not meant to invoke exception (b) or otherwise restrict the scope of the recited claim terms. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (e.g., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the autonomous and/or semi-autonomous vehicle and/or the convoy as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. A convoy of vehicles comprising:
   a leader vehicle in communication with a plurality of autonomous follower vehicles, the leader vehicle configured to receive a first autonomous follower vehicle data from a first autonomous follower vehicle, the leader vehicle configured to compare the first autonomous follower vehicle data to at least one of a leader vehicle data, a second autonomous follower vehicle data from a second autonomous follower vehicle, and a threshold value;
   wherein the first autonomous follower vehicle data, the leader vehicle data, the second autonomous follower vehicle data and the threshold value relate to a vehicle performance characteristic,
   wherein the leader vehicle is configured to transmit a first command to the first autonomous follower vehicle, wherein the first autonomous follower vehicle is configured to transmit a second command to the second autonomous follower vehicle, and wherein the first autonomous follower vehicle is configured to transmit the first autonomous follower vehicle data to the leader vehicle, and
   wherein the first autonomous follower vehicle and the second autonomous follower vehicle are configured to receive the first command from the leader vehicle and the second command from the first autonomous follower vehicle, respectively, compare the first command and the second command, respectively, to a predetermined tolerance range, follow the first command and the second command, respectively, if the first command and the second command, respectively, are within the predetermined tolerance range, and disregard the first command and the second command, respectively, if the first command and the second command, respectively, are not within the predetermined tolerance range, the predetermined tolerance range including at least one of a cargo load capacity, a speed, a turning radius, a number of revolutions per minute, a temperature maximum value, and a temperature minimum value.

2. The convoy of vehicles in claim 1, wherein at least one of the first autonomous follower vehicle data, the leader vehicle data and the second autonomous follower vehicle data is generated by an on-board diagnostics system.

3. The convoy of vehicles in claim 1, wherein a discrepancy report is generated based on a detected disparity between a comparison of the first autonomous follower vehicle data to at least one of the leader vehicle data, the second autonomous follower vehicle data and the threshold value.

4. The convoy of vehicles in claim 3, wherein a maintenance schedule is generated based on the discrepancy report.

5. The convoy of vehicles of claim 1, wherein the first autonomous follower vehicle is adjacent to the leader vehicle and the second autonomous follower vehicle is adjacent to the first autonomous follower vehicle, but not adjacent to the leader vehicle.

6. The convoy vehicles of claim 1, wherein the first autonomous follower vehicle is within a first transmission range of the leader vehicle and the second autonomous follower vehicle is within a second transmission range of the second autonomous follower vehicle, but outside of the first transmission range of the leader vehicle.

7. A convoy of vehicles comprising:
   a leader vehicle in communication with a plurality of autonomous follower vehicles, the leader vehicle configured to receive autonomous follower vehicle data, the leader vehicle configured to transmit at least one command signal to the plurality of autonomous follower vehicles;
   wherein the plurality of autonomous follower vehicles are configured to compare a command value associated with the command signal to a predetermined tolerance range, and wherein the plurality of autonomous follower vehicles are configured to implement the at least one command signal when the command value is within the predetermined tolerance range and not implement the at least one command signal when the command value is not within the predetermined tolerance range,
   wherein the leader vehicle is movable at least one of physically by moving the leader vehicle to another location and electronically by switching a leader vehicle command function from the leader vehicle to at least one of the plurality of autonomous follower vehicles, and
   wherein the leader vehicle comprises an override mode configured to force the plurality of autonomous follower vehicles to implement the command signal regardless of whether the command value is within the predetermined tolerance range.

8. The convoy of vehicles in claim 7, wherein an off-course follower vehicle receives a course data to rejoin the convoy.

9. The convoy of vehicles in claim 7, wherein the leader vehicle and the plurality of autonomous follower vehicles obtain data related to at least one of a terrain, an obstacle, an enemy installation and enemy personnel.

10. The convoy of vehicles in claim 9, wherein the obtained data is utilized to generate a first representative image of an area surrounding the convoy.

11. The convoy of vehicles in claim 10, wherein the leader vehicle is configured to receive a second representative image of the area surrounding the convoy from a terrain database.

12. The convoy of vehicles in claim 11, wherein the leader vehicle further comprises a control center configured to display a composite image of the first representative image of the area surrounding the convoy and the second representative image of the area surrounding the convoy.

13. The convoy of vehicles in claim 12, wherein the control center includes a screen configured to facilitate selecting a subset of the convoy in the composite image and changing the location of the subset of the convoy in the composite image; and wherein the leader vehicle is configured to transmit a command signal to maneuver the subset of the convoy to correspond to a change in location of the subset of the convoy in the composite image.

14. The convoy of vehicles of claim 7, wherein the predetermined tolerance range is a mission specific tolerance range received by the plurality of autonomous follower vehicles prior to starting a current mission.

15. The convoy of vehicles of claim 7, wherein the predetermined tolerance range is a tolerance range programmed into the plurality of autonomous follower vehicles during a manufacturing process of the plurality of autonomous follower vehicles.

16. The convoy of vehicles of claim 7, wherein the plurality of autonomous follower vehicles are configured to determine, based on the comparison of the command value to the predetermined tolerance range, that at least one of the plurality of autonomous follower vehicles may be damaged if the command signal is implemented by the at least one autonomous follower vehicle, and wherein the at least one autonomous follower vehicle is configured to not implement the command signal based on the determination that doing so may cause the at least one autonomous follower vehicle to be damaged.

* * * * *